United States Patent
Bowman

(10) Patent No.: US 6,725,399 B1
(45) Date of Patent: Apr. 20, 2004

(54) REQUIREMENTS BASED SOFTWARE TESTING METHOD

(75) Inventor: John Bowman, Dallas, TX (US)

(73) Assignee: Compuware Corporation, Farmington Hills, MI (US)

( * ) Notice: Subject to any disclaimer, the term of this patent is extended or adjusted under 35 U.S.C. 154(b) by 0 days.

(21) Appl. No.: 09/353,872

(22) Filed: Jul. 15, 1999

(51) Int. Cl.$^7$ ................................. H02H 3/05
(52) U.S. Cl. ........................ 714/38; 717/124
(58) Field of Search ............................ 714/38; 717/124

(56) References Cited

U.S. PATENT DOCUMENTS

| | | | | |
|---|---|---|---|---|
| 5,600,789 A | * | 2/1997 | Parker et al. ................. | 714/38 |
| 5,651,111 A | * | 7/1997 | McKeeman et al. .......... | 714/38 |
| 5,742,754 A | * | 4/1998 | Tse .............................. | 714/38 |
| 5,758,061 A | * | 5/1998 | Plum ........................... | 714/35 |
| 5,892,947 A | * | 4/1999 | DeLong et al. ............... | 703/22 |
| 5,905,856 A | * | 5/1999 | Ottensooser ................. | 714/38 |
| 5,949,999 A | * | 9/1999 | Song et al. ................... | 717/125 |
| 6,226,784 B1 | * | 5/2001 | Holmes et al. .............. | 717/100 |

OTHER PUBLICATIONS

Humphrey, Watts. Managing the Software Process. New York: Addison–Wesley Publishing Comapny, 1989. 192–204.*

* cited by examiner

Primary Examiner—Robert Beausoleil
Assistant Examiner—Yolanda L. Wilson
(74) Attorney, Agent, or Firm—Fenwick & West LLP

(57) ABSTRACT

A method for testing computer software is described. The method is intended for operation on software which may or may not have been previously subjected to unit and integration tests, to determine if it will meet the specific requirements of an end user. The method is applicable to internally developed, contractor developed, or vendor supplied software. The method includes application in six key process areas. The six key process areas are development of a test plan, development of test cases to support the plan, development of an environment to simulate the technical environment in which the program will operate, test execution in which the tests are executed in a technical environment, compiling and analyzing the results and finally reporting the results in a form whereby the end user can determine both the feasibility of the software system for the specific requirements and any areas where additional testing or modifications are necessary.

9 Claims, 19 Drawing Sheets

Software Test Process Overview

Test Planning Process  FIG. 2

Test Case Development Process

Environment Preparation Process

Test Execution Process

Management Reporting Process

Results Analysis Process

FIG. 10

Project: Test Execution Example
Date: Thu 4/29/99

Test Execution Schedule Example

| ID | ⓘ | Task Name | Duration | Start | | | | | | | May 2, '99 | | | | | | | May 9, '99 | | | | | | | May 16 | |
|---|---|---|---|---|---|---|---|---|---|---|---|---|---|---|---|---|---|---|---|---|---|---|---|---|---|---|
| | | | | | T | F | S | S | | | S | M | T | W | T | F | S | S | M | T | W | T | F | S | S | M |
| 43 | | Backup Database | 1 day | Wed 6/2/99 | | | | | | | | | | | | | | | | | | | | | | |
| 44 | | Perform Database Tuning | 1 day | Thu 6/3/99 | | | | | | | | | | | | | | | | | | | | | | |
| 45 | | Performance Testing | 19.5 days | Wed 6/2/99 | | | | | | | | | | | | | | | | | | | | | | |
| 46 | | Identify pay period dates | 0.5 days | Wed 6/2/99 | | | | | | | | | | | | | | | | | | | | | | |
| 47 | | Test Run 1 – Biweekly | 11.5 days | Thu 6/3/99 | | | | | | | | | | | | | | | | | | | | | | |
| 48 | | Data Input | 3 days | Thu 6/3/99 | | | | | | | | | | | | | | | | | | | | | | |
| 49 | | Batch Processing | 4 days | Tue 6/8/99 | | | | | | | | | | | | | | | | | | | | | | |
| 50 | | Data Verification | 3 days | Fri 6/11/99 | | | | | | | | | | | | | | | | | | | | | | |
| 51 | | Secure Results | 0.5 days | Tue 6/15/99 | | | | | | | | | | | | | | | | | | | | | | |
| 52 | | Backup Database | 1 day | Tue 6/15/99 | | | | | | | | | | | | | | | | | | | | | | |
| 53 | | Test Run 2 – SemiMonthly | 13 days | Wed 6/2/99 | | | | | | | | | | | | | | | | | | | | | | |
| 54 | | Data input | 3 days | Tue 6/8/99 | | | | | | | | | | | | | | | | | | | | | | |
| 55 | | Batch Processing | 4 days | Fri 6/11/99 | | | | | | | | | | | | | | | | | | | | | | |
| 56 | | Data Verification | 3 days | Tue 6/15/99 | | | | | | | | | | | | | | | | | | | | | | |
| 57 | | Secure Results | 0.5 days | Tue 6/15/99 | | | | | | | | | | | | | | | | | | | | | | |
| 58 | | Backup Database | 1 day | Fri 6/11/99 | | | | | | | | | | | | | | | | | | | | | | |
| 59 | | Test Run 3 – Off Cycle | 7.5 days | Fri 6/11/99 | | | | | | | | | | | | | | | | | | | | | | |
| 60 | | Data Input | 2 days | Mon 6/14/99 | | | | | | | | | | | | | | | | | | | | | | |
| 61 | | Batch Processing | 3 days | Wed 6/16/99 | | | | | | | | | | | | | | | | | | | | | | |
| 62 | | Data Verification | 2 days | Fri 6/18/99 | | | | | | | | | | | | | | | | | | | | | | |
| 63 | | Secure Results | 0.5 days | | | | | | | | | | | | | | | | | | | | | | | |

Task   Summary   Rolled Up Progress
Split   Rolled Up Task   External Tasks
Progress   Rolled Up Split   Project Summary
Milestone ◇   Rolled Up Milestone ◇

Test Execution Schedule Example

| ID | Task Name | Duration | Start |
|---|---|---|---|
| 64 | Refresh Database | 1 day | Fri 6/18/99 |
| 65 | Backup Database | 1 day | Mon 6/21/99 |
| 66 | Perform Database Tuning | 1 day | Tue 6/22/99 |
| 67 | Acceptance Testing | 19.5 days | Tue 6/22/99 |
| 68 | Identify pay periods | 0.5 days | Tue 6/22/99 |
| 69 | Test Run 1 – Biweekly | 9.5 days | Wed 6/23/99 |
| 70 | Data Input | 2 days | Wed 6/23/99 |
| 71 | Batch Processing | 3 days | Thu 6/24/99 |
| 72 | Data Verification | 3 days | Mon 6/28/99 |
| 73 | Secure Results | 0.5 days | Thu 7/1/99 |
| 74 | Backup Database | 1 day | Thu 7/1/99 |
| 75 | Test Run 2 –SemiMonthly | 10 days | Tue 6/22/99 |
| 76 | Data input | 2 days | Tue 6/22/99 |
| 77 | Batch Processing | 3 days | Thu 6/24/99 |
| 78 | Data Verification | 3 days | Mon 6/28/99 |
| 79 | Secure Results | 0.5 days | Thu 7/1/99 |
| 80 | Backup Database | 1 day | Thu 7/1/99 |
| 81 | Test Run 3 –Off Cycle | 8.5 days | Mon 6/28/99 |
| 82 | Data Input | 2 days | Mon 6/28/99 |
| 83 | Batch Processing | 3 days | Wed 6/30/99 |
| 84 | Data Verification | 2 days | Fri 7/2/99 |

Project: Test Execution Example
Date: Thu 4/29/99

Test Execution Schedule Example

| ID | ⊙ | Task Name | Duration | Start |
|---|---|---|---|---|
| 85 | | Secure Results | 0.5 days | Wed 7/7/99 |
| 86 | | Backup Database | 1 day | Wed 7/7/99 |
| 87 | | Test Run 4 —Interfaces | 5.5 days | Fri 7/2/99 |
| 88 | | Validate Initial data | 1 day | Fri 7/2/99 |
| 89 | | Batch Processing | 2 days | Tue 7/6/99 |
| 90 | | Data Verification | 2 days | Wed 7/7/99 |
| 91 | | Secure Results | 0.5 days | Fri 7/9/99 |
| 92 | | Refresh Database | 1 day | Fri 7/9/99 |
| 93 | | Backup Database | 1 day | Mon 7/12/99 |
| 94 | | Perform Database Tuning | 1 day | Tue 7/13/99 |
| 95 | | Regression Testing | 17.5 days | Tue 7/13/99 |
| 96 | | Identify pay periods | 1 day | Tue 7/13/99 |
| 97 | | Test Run 1 – Biweekly | 9.5 days | Tue 7/13/99 |
| 98 | | Data Input | 2 days | Tue 7/13/99 |
| 99 | | Batch Processing | 3 days | Thu 7/15/99 |
| 100 | | Data Verification | 3 days | Mon 7/19/99 |
| 101 | | Secure Results | 0.5 days | Wed 7/21/99 |
| 102 | | Backup Database | 1 day | Thu 7/22/99 |
| 103 | | Test Run 2 —SemiMonthly | 9.5 days | Tue 7/13/99 |
| 104 | | Data input | 2 days | Tue 7/13/99 |
| 105 | | Batch Processing | 3 days | Thu 7/15/99 |

Project: Test Execution Example
Date: Thu 4/29/99

Test Execution Schedule Example

| ID | | Task Name | Duration | Start |
|---|---|---|---|---|
| 106 | | Data Verification | 3 days | Mon 7/19/99 |
| 107 | | Secure Results | 0.5 days | Wed 7/21/99 |
| 108 | | Backup Database | 1 day | Thu 7/22/99 |
| 109 | | Test Run 3 – Off Cycle | 6.5 days | Mon 7/19/99 |
| 110 | | Data Input | 1 day | Mon 7/19/99 |
| 111 | | Batch Processing | 2 days | Tue 7/20/99 |
| 112 | | Data Verification | 2 days | Wed 7/21/99 |
| 113 | | Secure Results | 0.5 days | Fri 7/23/99 |
| 114 | | Backup Database | 1 day | Fri 7/23/99 |
| 115 | | Test Run 4 – Interfaces | 7.5 days | Wed 7/21/99 |
| 116 | | Validate Initial data | 1 day | Wed 7/21/99 |
| 117 | | Batch Processing | 3 days | Thu 7/22/99 |
| 118 | | Data Verification | 3 days | Mon 7/26/99 |
| 119 | | Secure Results | 0.5 days | Thu 7/29/99 |
| 120 | | Backup Database | 1 day | Thu 7/29/99 |

Project: Test Execution Example
Date: Thu 4/29/99

REQUIREMENTS BASED SOFTWARE TESTING METHOD

BACKGROUND OF THE INVENTION

1. Field of the Invention

This invention relates to a method of testing computer software and in particular to a non invasive method for evaluating the effectiveness of computer software to perform the functions desired by the business user. The testing method of this invention is particularly suited for determining the level of effectiveness achieved by a computer program or software when tailored to a business requirement.

2. Description of the Prior Art

Within the advent of computer software for many different domestic, commercial and industrial uses a need has grown to test that software to determine whether it will achieve its intended or desired purpose. Certain software programs are sufficiently complex that separate computer software is needed to test and evaluate whether a special purpose program will perform satisfactorily under the conditions present in a specific user situation.

For example, in U.S. Pat. No. 5,651,111 there is described a procedure where the program source code is invaded to generate a complementary source code which includes external dependencies. The testing method, then, translates the source code and complementary code to produce a machine-executable program for testing the source code.

In U.S. Pat. No. 5,758,061 an automatic testing technique generates an incremental coverage report for portions of the program that have been unreached by previous testing procedures. In that patent there is described a procedure whereby a computer program is "parsed" and instrument code is inserted in appropriate parts of the program. When the program is executed, the instrument code causes coverage results to be generated and stored. The output then is used to specify the value of a current test.

These types of procedures require access to the source code. However, when computer software is purchased the seller often does not provide access to source code because such code is proprietary. Therefore the purchaser must rely on testing procedures performed by the seller.

In unit testing, test data and various inputs to simulate various conditions under which the unit of software may operate are used. Test data are developed and a corrective action may be taken in response to test results. In integration testing software units are incrementally combined until the complete software system and the resulting integrated machine-executable programs are tested. Integration testing may involve integration of data, executable code and test result. As described in U.S. Pat. No. 5,651,111, in integration testing as in unit testing a machine-executable program is executed and the run time output or results are examined as a way to verify the correct functioning of the program being tested. Therefore, the external dependency problem of unit testing also exists for integration testing. In other words, in such testing, it is necessary to duplicate business external conditions under which the software may be expected to be called upon to function.

In U.S. Pat. No. 5,600,789 a method for automated testing of computer application programs using a Graphic User Interface is described. Simulated user events such as keyboard or mouse actions are automatically inputted into the interface which is then monitored to observe changes in response to the input.

In that method, inputs to the interface that simulate user events, such as keyboard or mouse action, are provided and the changes to the interface in response to the input are observed. The simulated user input is described as appearing exactly as if the input came from the user. A test script is written in a high level programming language and contains the events to be simulated. The script is then executed and a driver is used to take specific references and perform the actual interface to Graphical User Interface objects: Logical Screen Elements are identified and are the objects used to interface with the user. The simulated user input is sent to the graphical user interface directed at a particular Logical Screen Element. Validation, then, concerns whether the Logical Screen Element has accepted the user and entered the expected state.

The test script is described as being written in a language called "T", although any appropriate programming language could be used.

There remains a need however for a procedure for testing both new and revised computer application programs which is independent of any specific testing tool, operating system or technical platform to direct testing activity to determine the feasibility or practicality of the use of a specific program at the user level. There is a need for determining whether a program which has been cleared by the vendor through unit and integration or other testing will adequately meet the end users needs when subjected to realistic, rather than technical, conditions.

SUMMARY OF THE INVENTION

It has been discoverd that the end user requirements for a software program can be efficiently and reliably evaluated against a software program using actual production measurements and related information. The procedure of this invention, then, not only can determine how well a product has been tested by the vendor and/or creator, but rather if the product will reliably meet the user requirements in performing specific functions, and the quality of the performance. The process of this invention provides evaluation in a succession of six key process areas leading from creation of an initial test plan through a management report on the readiness of the software under test for production service.

In the first key process area a test plan is created which defines the scope of the software test, the approach to complete the test, resources required and the acceptance criteria for the test.

The second key process area is test case development where in the test cases that support the plan are created to validate software functions.

Third key process area is test environment preparation which is used to establish a controlled technical environment for the application of the test cases. The controlled environment simulates a business environment in which the application programs will operate so that results are not skewed by technical environment variables.

The fourth key process area is test execution wherein the test cases defined in the second key process area are executed in the technical environments defined in the third key process area.

The fifth key process area is results analysis wherein a review identifies the areas of the software that need to be repaired and ultimately re-tested and the collection and analysis of metrics used to measure the software system's readiness as defined in the test plan are collected.

Finally, the sixth key process area is a management reporting function, wherein the readiness of the software system as measured by the test results collected in the fifth key process area is communicated to management.

The proper combination of the above key process areas will provide the information necessary for an organization to identify and potentially eliminate defects from software before it is implemented in a production environment.

Accordingly, it is an object of this invention to produce a non-invasive procedure for software testing to determine efficiently whether the software will meet the end user's requirements.

It is another object of this invention to provide a method for testing software wherein previously designed software is evaluated against a user's specific requirements and a determination made based upon testing specific activities on a percentage pass/fail basis to determine if a software program is suitable for a specific set of requirements.

It is yet another object of this invention to provide a software testing methodology wherein specific functions to be performed can be evaluated without altering source code or rewriting the same whereby a requirement based evaluation process is used.

These and other objects will be becoming readily apparent with reference to the drawings and following description, wherein:

BRIEF DESCRIPTION OF THE DRAWINGS

FIGS. 8–20 are schematic representations of an example of a test execution schedule.

DETAILED DESCRIPTION OF THE INVENTION

Before implementing the method of this invention an assessment of the nature of the client's software testing requirements is necessary. A test process assessment, then, is an opportunity to review, evaluate, and recommend changes to the testing processes of the end user-client. In many cases the client base has not had testing processes that can be effectively automated. Test processes need to be documented and repeatable. Additionally, requirements based testing dictates that there be clearly defined business and test requirements established and the results of tests evaluated against those requirements.

The information necessary to perform a test process assessment will need to be collected from several sources and both formal and informal test processes need to be identified, documented and evaluated. A combination of the following methods will be used to extract the required information in this assessment:

Interviews with key personnel

Existing test plan reviews

Review of test execution phase

Test results review from the last test cycle

Application development process review

Technical environment review

A management report typically would be developed which contains descriptions and recommendations for improvement. This report will be substantiated by a complete, detailed, set of working papers. The report should include but is not limited to the following:

A complete description of the current testing process

An identification of problem areas in the testing processes currently employed.

Recommendation for test process improvement

The method of testing of the present invention is composed of six key process areas which together function to provide the end process analysis on a requirements basis wherein the end user's needs are supported by an independent vendor software program or by software developed or tested by the customer or a contractor. When such a program is developed by an independent software vendor it may have been subjected to unit and integration testing by the vendor before implementation of the requirements based evaluation of the method of this invention to determine feasibility of the implementation of the vendor's program to the end user's need.

Figure 1:
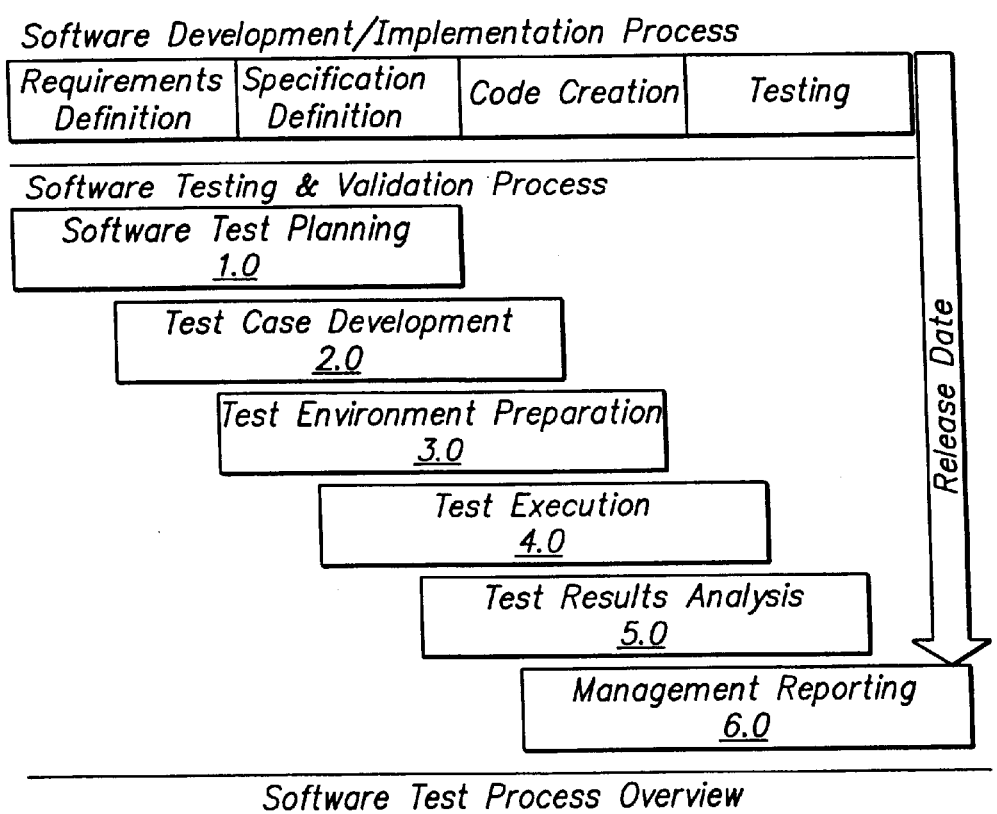
FIG. 1 is a schematic representation of the software testing process of this invention.
Figure 2:
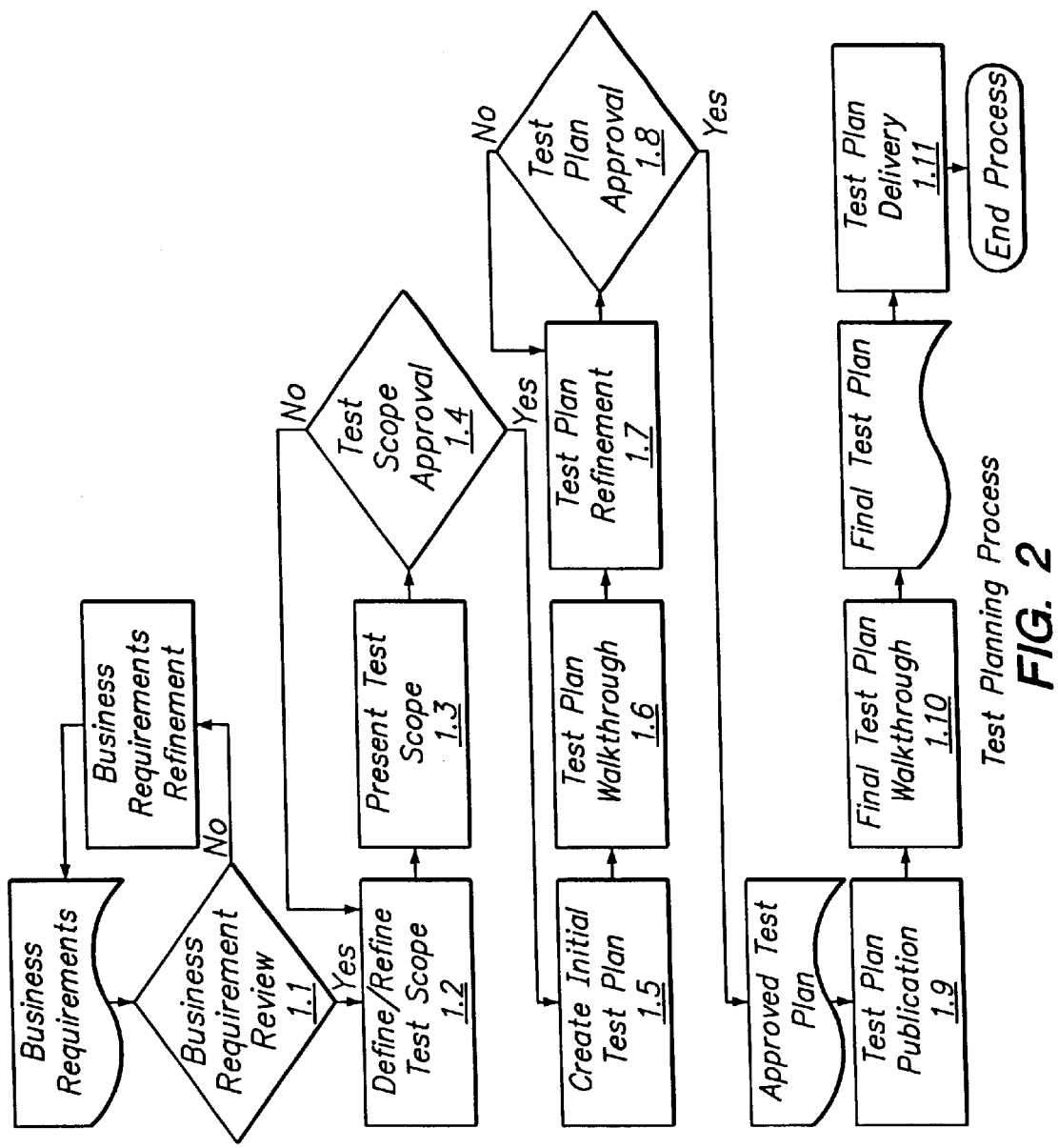
FIG. 2 is a schematic representation of the test planning process.

The need of this invention is initiated by a first key process area which deals with test planning. The test planning directs the creation of the software plan that represents the foundation of the software testing activities of this invention. This plan defines the scope of the software test, the approach to complete the test, resources required for completing tests and acceptance criteria for the software test. The test planning process is shown schematically in FIG. 2. The test planning process contains steps that utilize generally accepted quality assurance practices and requires the resultant test plan adequately support the reasons that caused the development of the software system in the first place.

Figure 3:
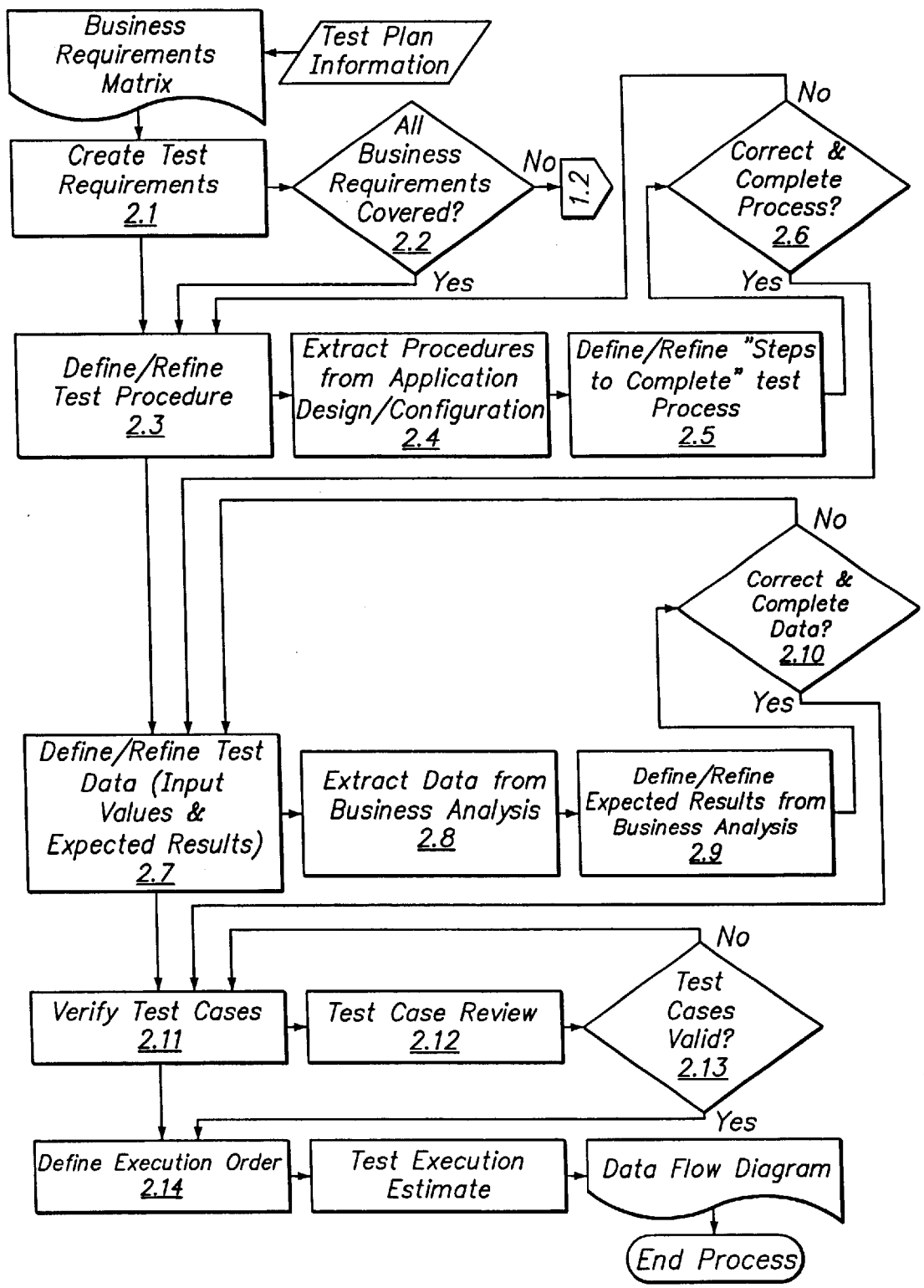
FIG. 3 is a schematic view of the test case development process.

The second key process area, as shown in FIG. 3, represents test case development. In this area, test cases are created which support the test plan that was established by the first key process area. The test case contains the test procedures and test data to complete the test procedure. Additionally, test cases are designed to validate the software functions that that are in the software. The test cases are shaped by the test approaches defined in the test plan. The test case development process is shown schematically in FIG. 3.

Figure 4:
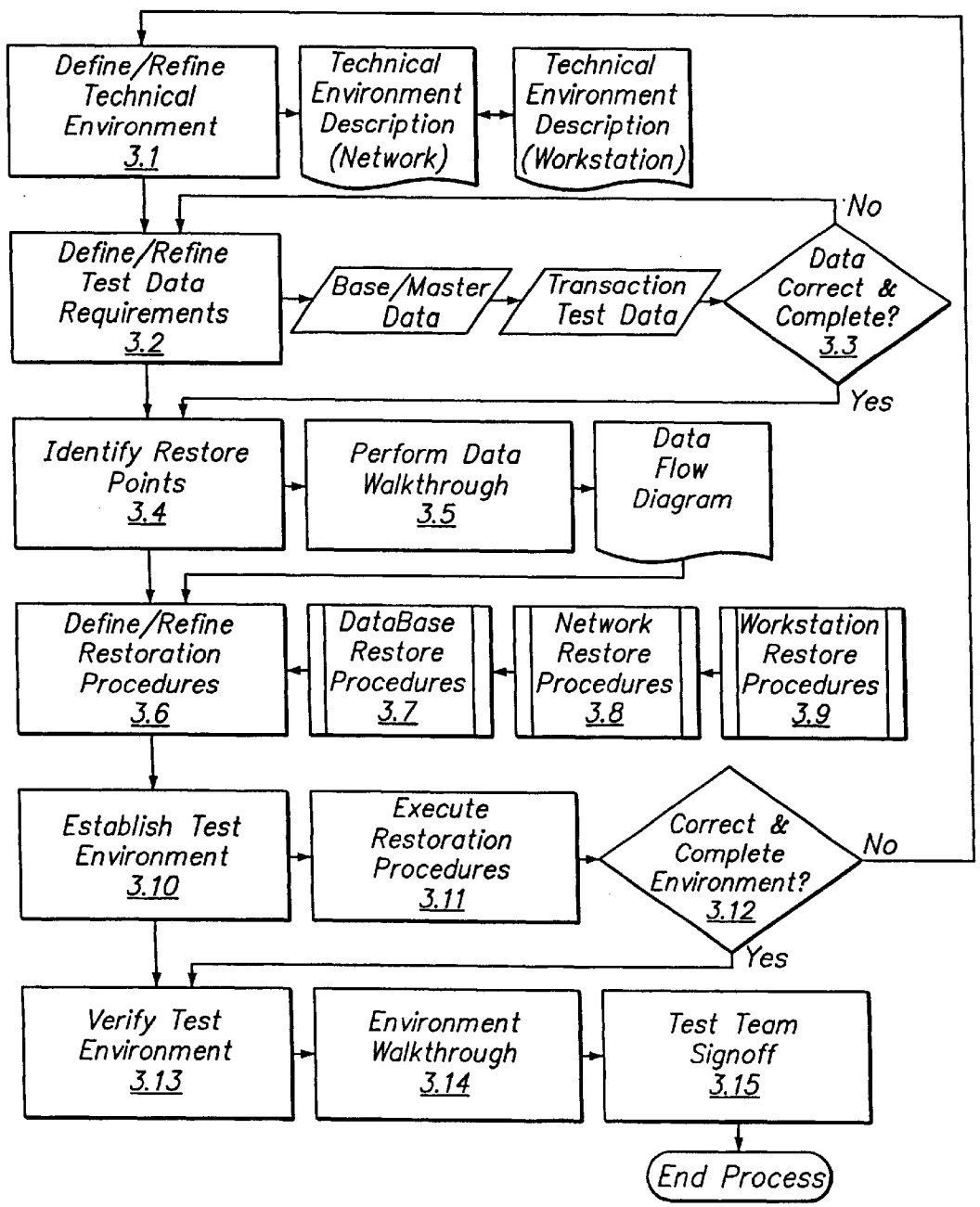
FIG. 4 is a schematic view of the test environment preparation process.

The third key process area, involves test environment preparation. In this key process area a controlled technical environment for the application of the test cases is established. A controlled test environment is required to simulate the production technical environment in which the application programs will operate. The basic principle of most testing is to execute the tests in a defined, controlled environment so that the results reflect the behavior of the tested item and are not skewed by technical environment variables. The test environment preparation process is shown in FIG. 4.

Figures 5, 7:
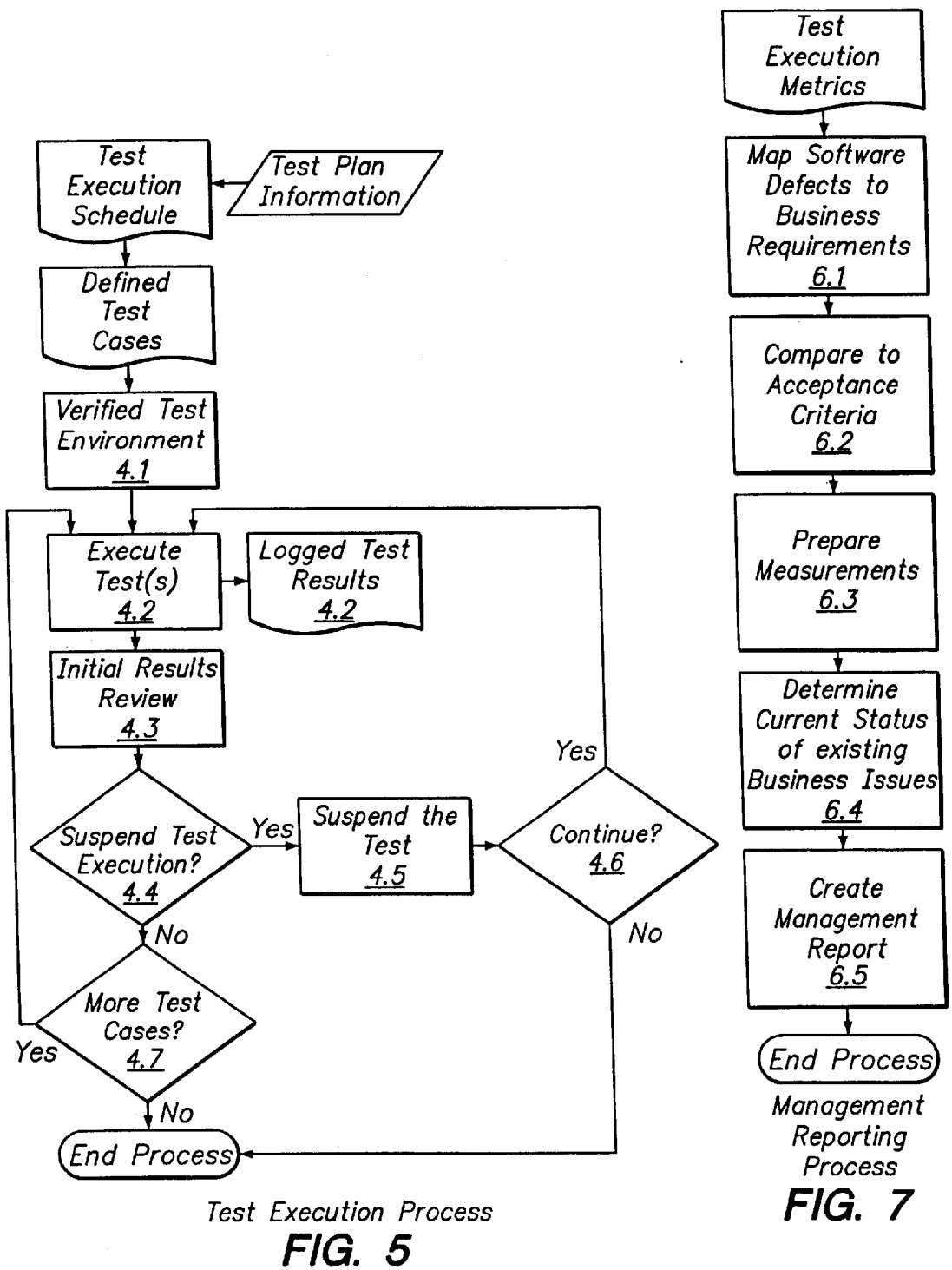
FIG. 5 is a schematic of the test execution process.
FIG. 7 is a schematic of the management reporting process.

The fourth key process area is test execution. In this area the application of the test cases defined in key process area 2 in the technical environment defined in key process area 3 is applied. Correct test case execution dependencies must be established and used to control the flow of the tests as they are executed. Additionally, criteria that could suspend testing activity are constantly reviewed. The results of the tests are logged for review at a later time. The test execution process is shown schematically in FIG. 5.

Figure 6:
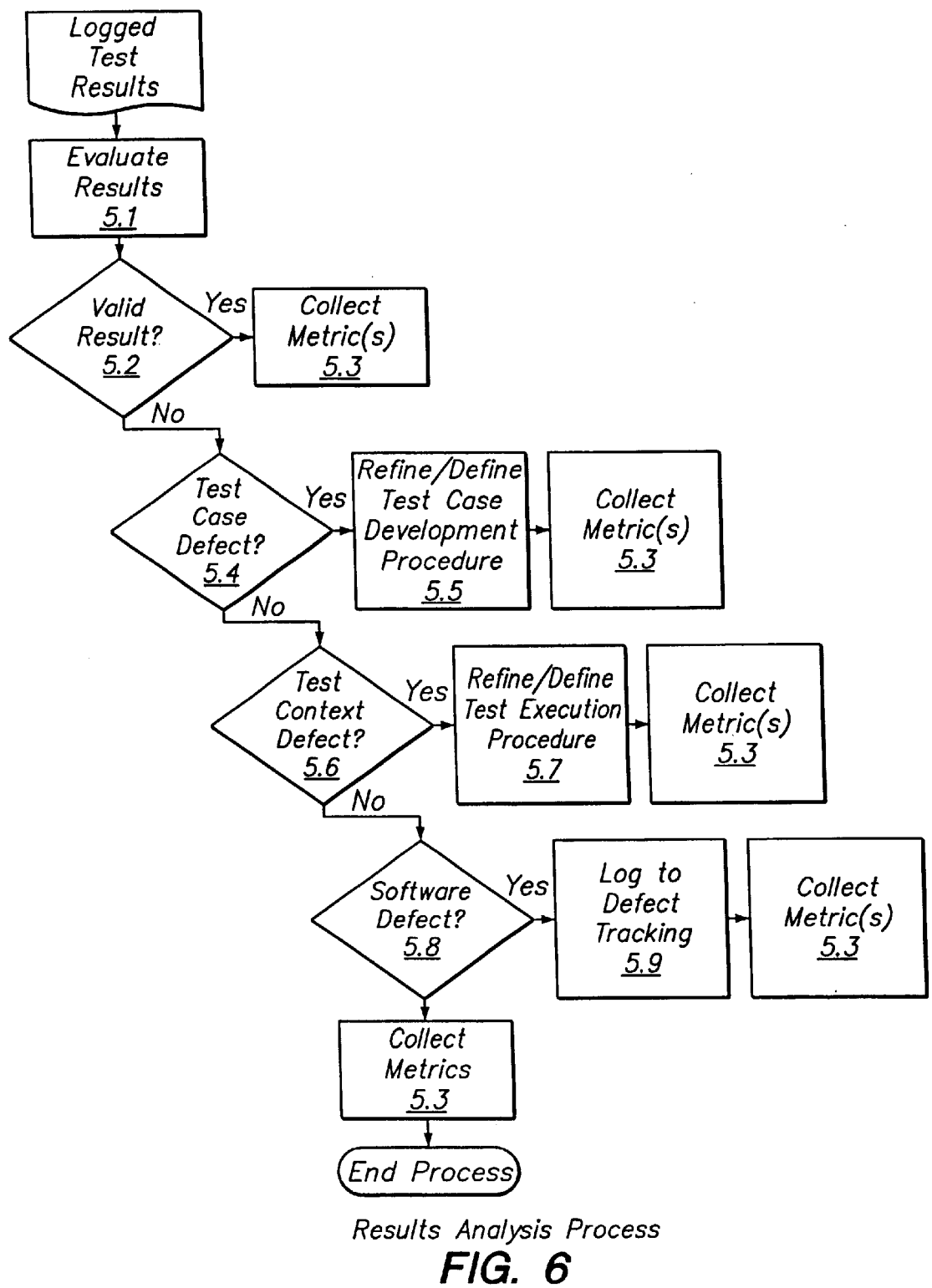
FIG. 6 is a schematic of the results analysis process.
Figure 8:
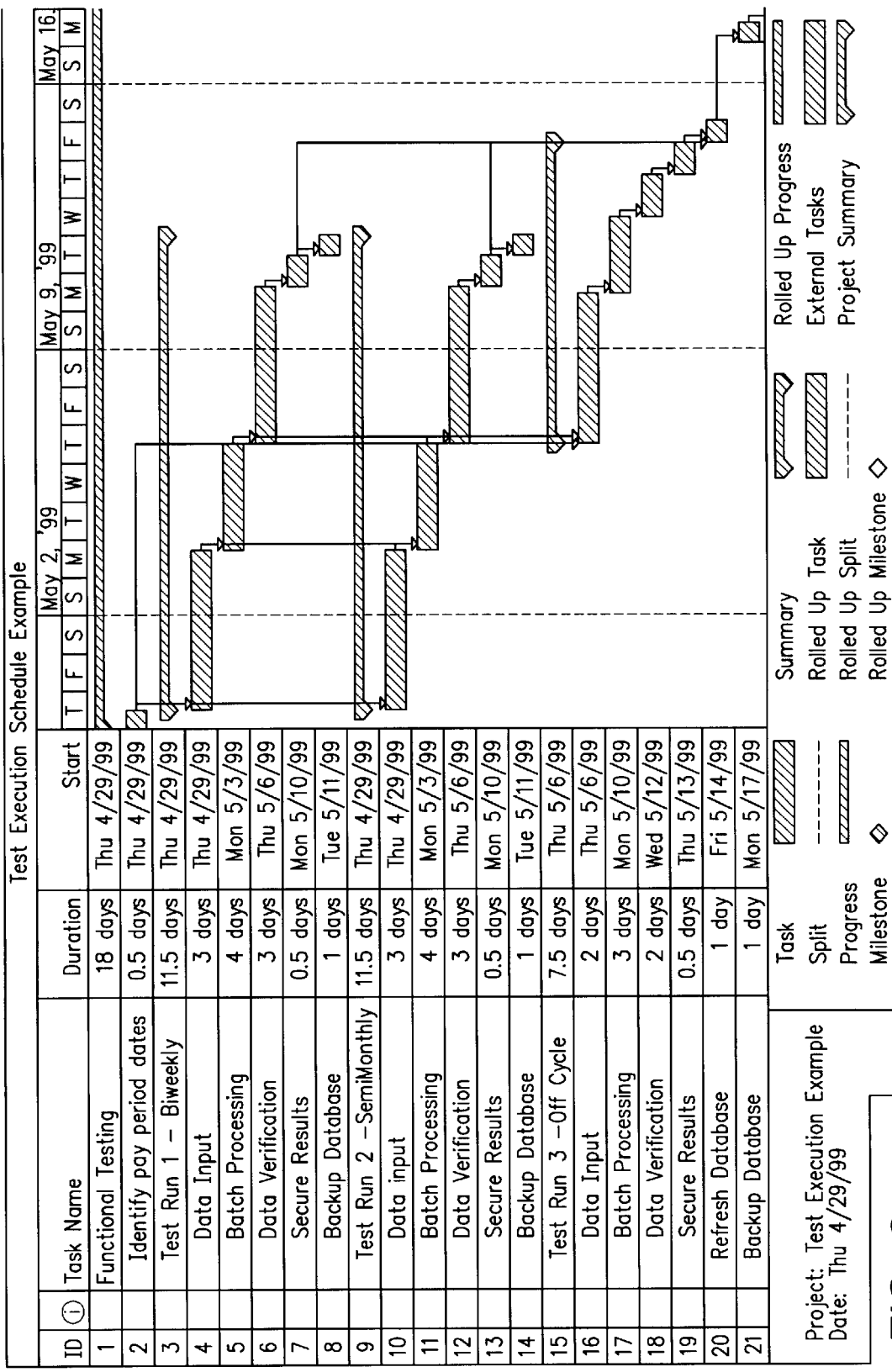
Figure 9:
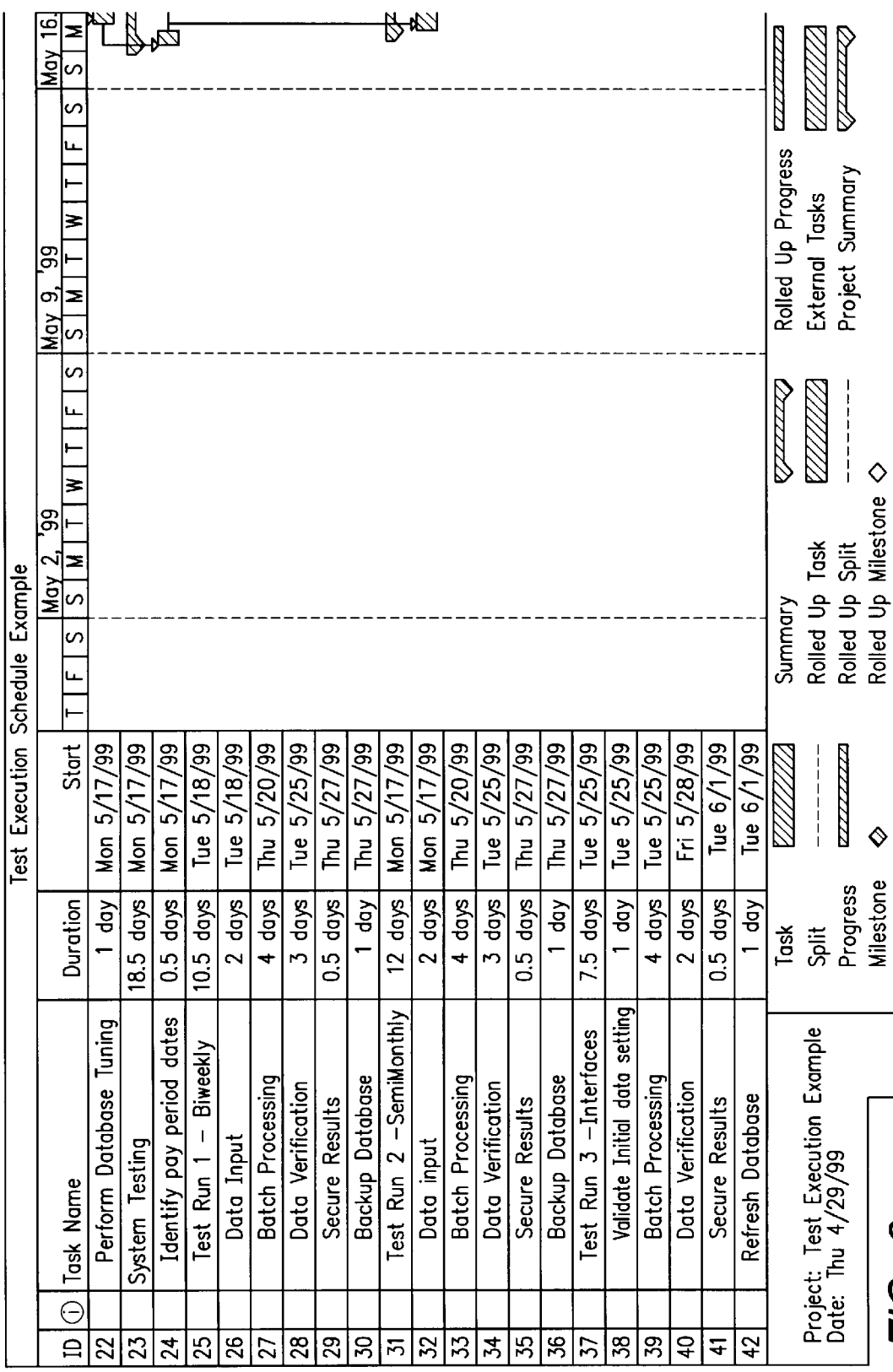
Figure 15:
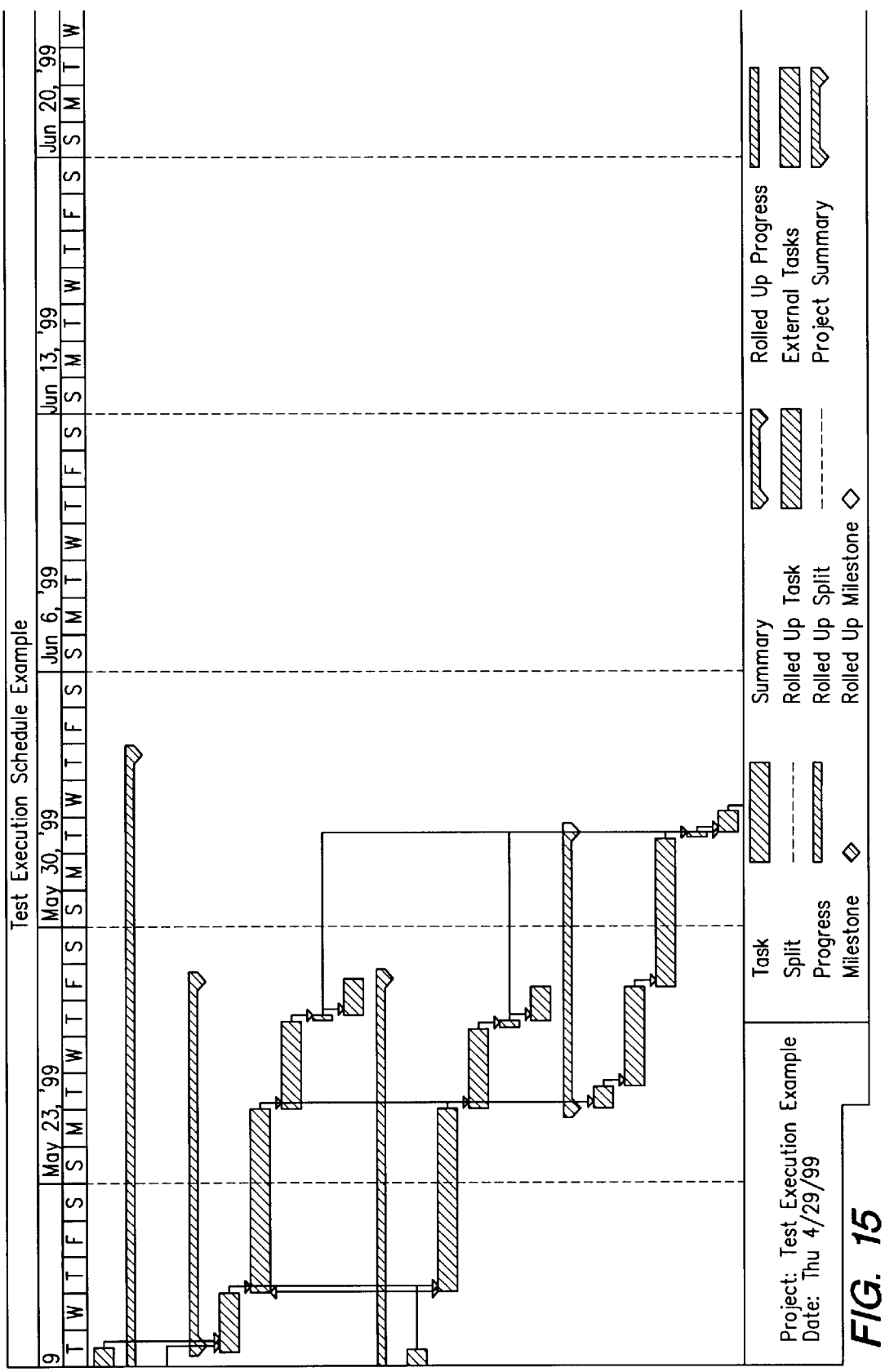
Figure 16:
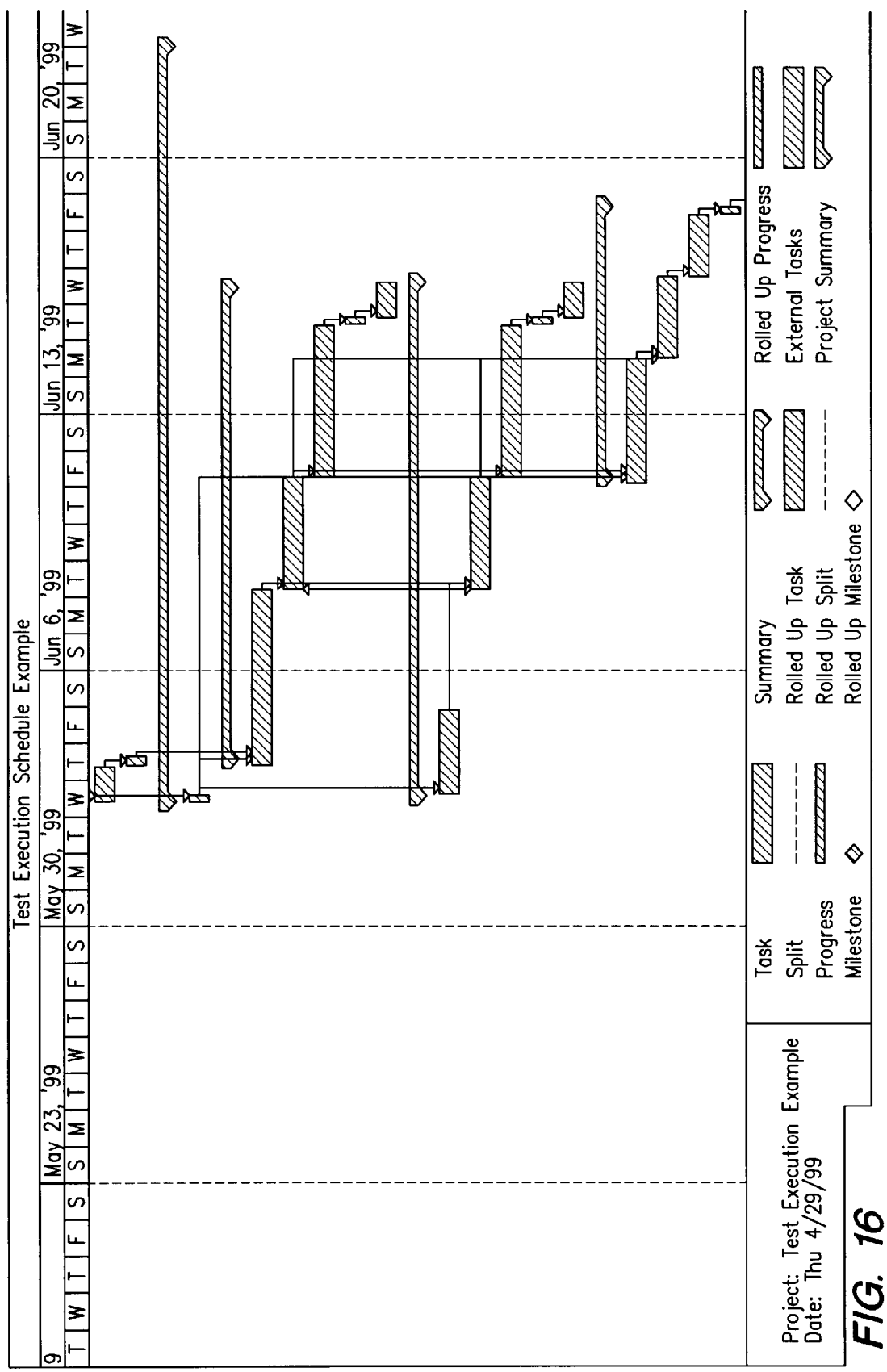
Figure 17:
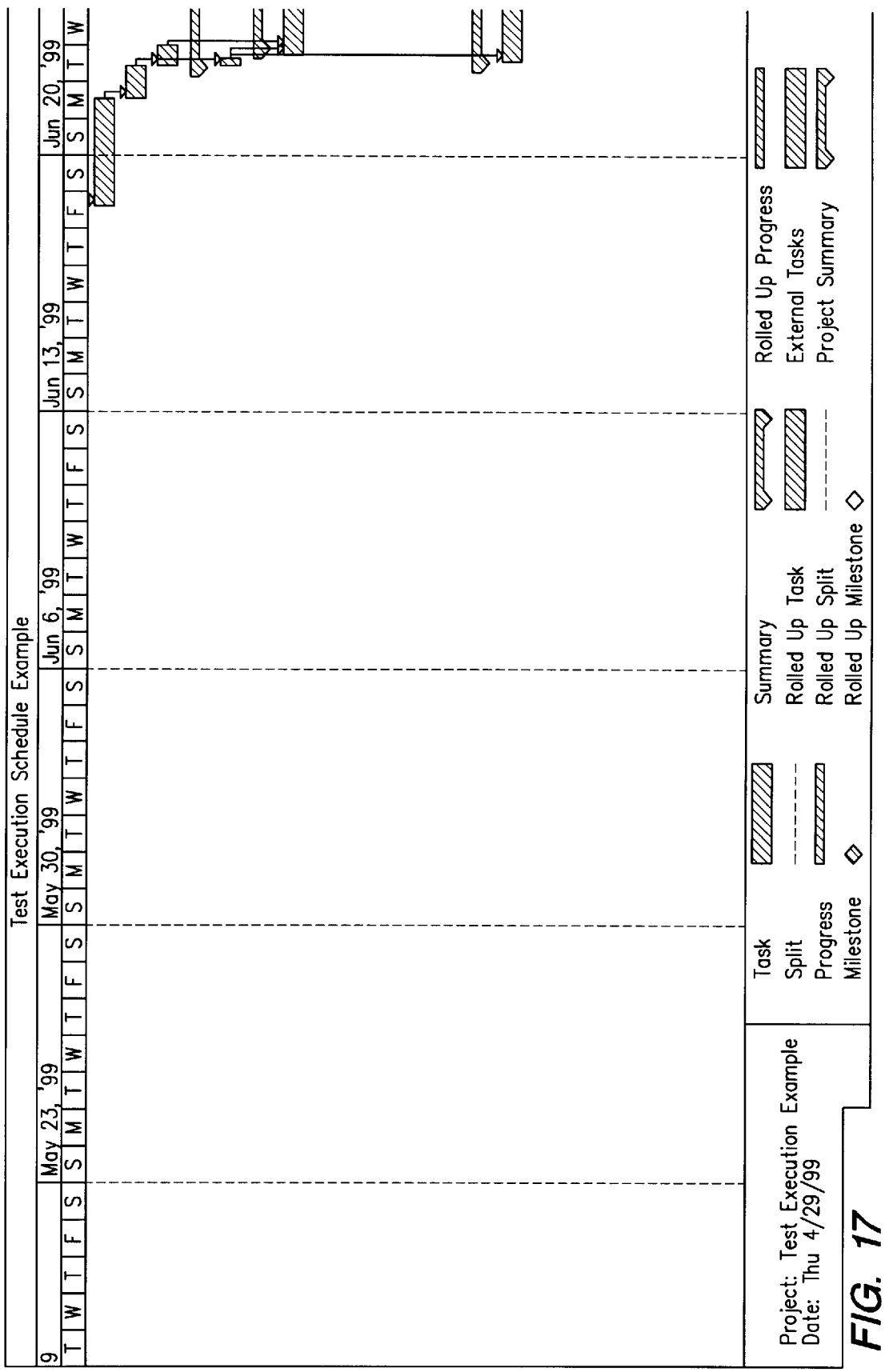
Figure 18:
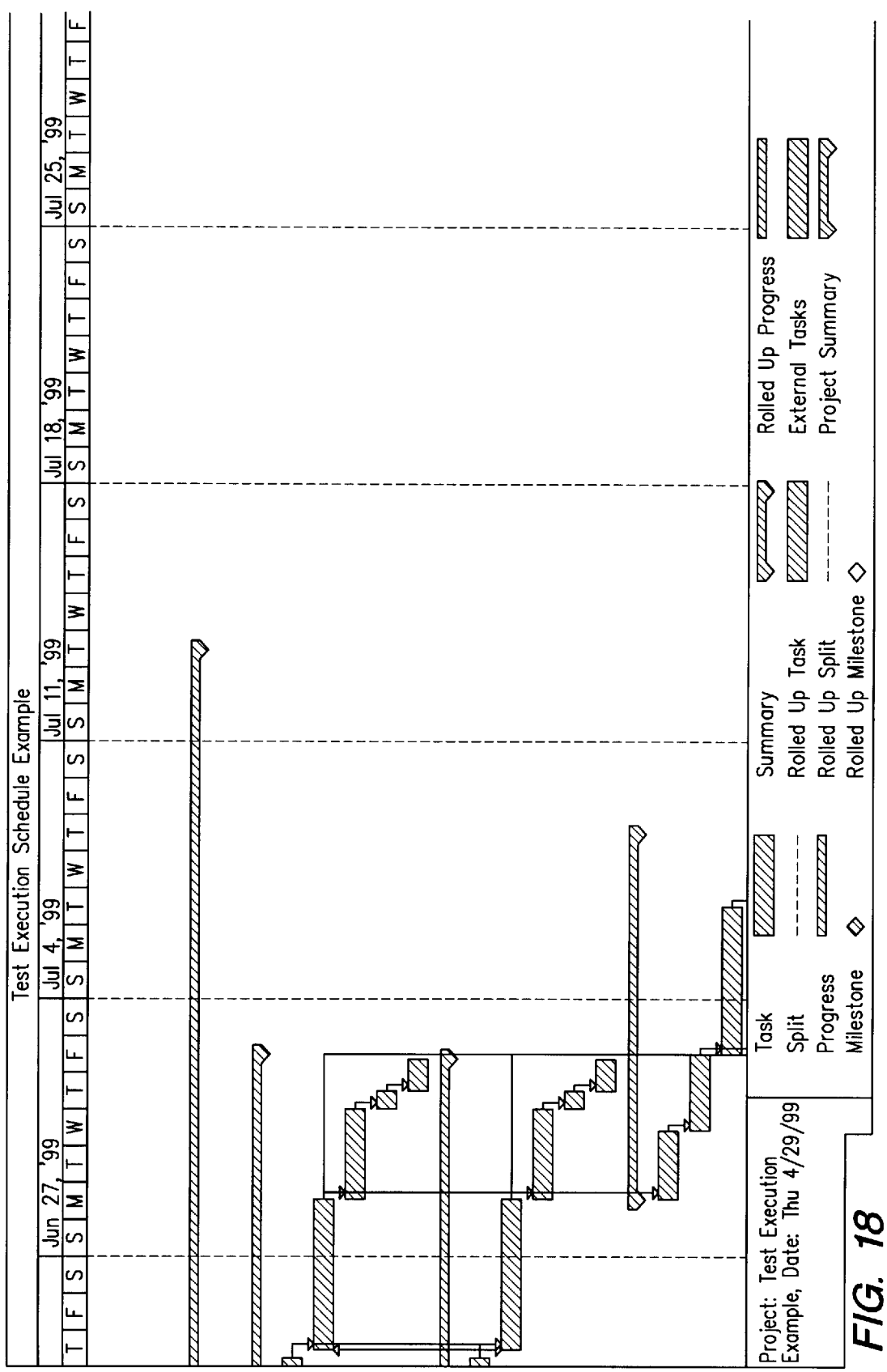
Figure 19:
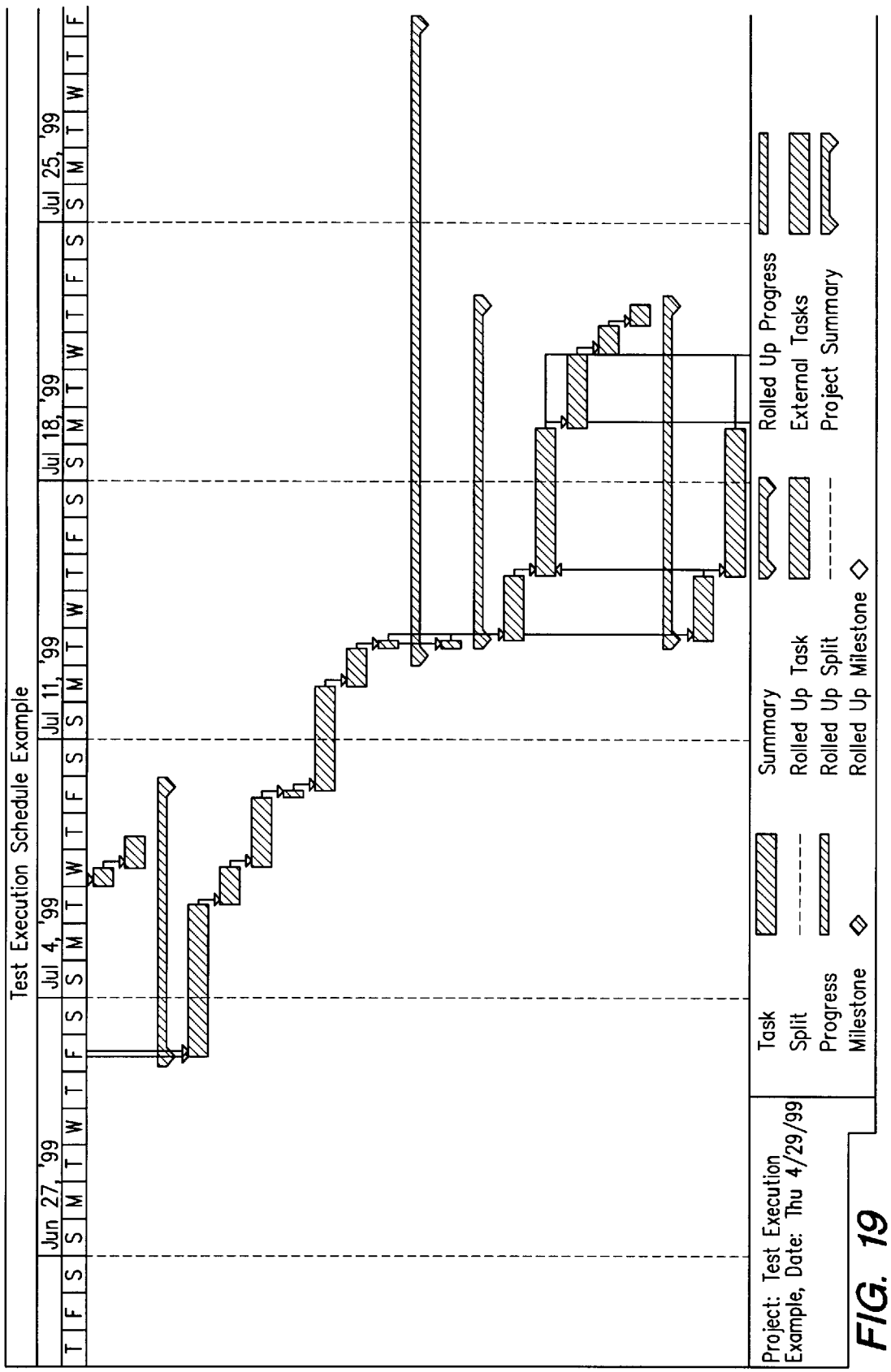
Figure 20:
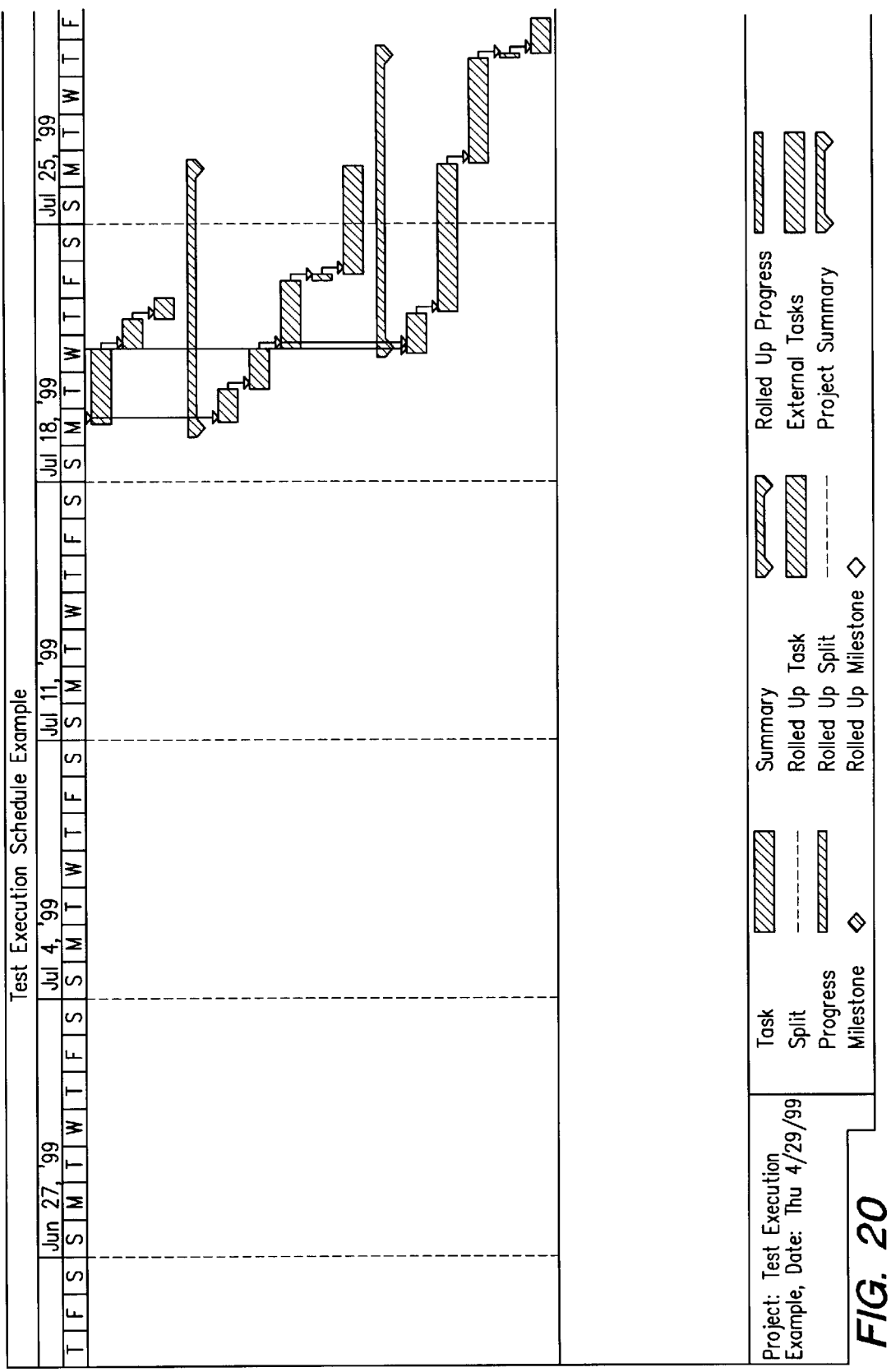

The fifth key process area is test results analysis, wherein test results logged in key process area 4 are reviewed. The review identifies the area of the software and/or tests that need to be repaired and ultimately re-executed. Additionally, the metrics that are used to measure the software system's readiness as defined by the test plan created in key process area 1 are collected. The test results analysis process is shown schematically in FIG. 6.

Finally, the sixth key process area is management reporting, wherein the readiness of the software system is measured by the test results is communicated to the client-end user. This communication provides information regarding the operation and operability of the software, thus estimating its effectiveness when in production service. This management reporting process is shown schematically in FIG. 7.

The proper combination of these key process areas provides the information necessary to identify and potentially eliminate defects in software before it is implemented in a production environment. The activities that support this become measurable and therefore become a baseline on which subsequent processes may be improved.

In order to illustrate the method of this invention the following is an example dealing with a fictitious company, ABC Hardware, Inc. and its equally fictitious payroll software product. Each of the six key process areas identified above are implemented relative to the software testing process of this invention.

EXAMPLE 1

Test Plan for Payroll

ABC HARDWARE, INC.

"YOUR NEIGHBORHOOD HARDWARE STORE"

TEST PLAN FOR PAYROLL PROJECT

I. Test Plan Identifier

This is a comprehensive test plan for the Payroll project

II. Introduction

A. Application Description

The payroll Project ("project") has been created to establish a Payroll Processing system ("application") that will support the growth plans of the Company. In the initial release, the application will process the entire Payroll processing for the company. This includes the following:

Definition and maintenance of employee information

Calculation of payroll values

Disbursement of payroll

Reporting on payroll processing

Graphical user Interface operation

Performance validation

Functionality to support additional Human Resources (HR) and Payroll processes will be added during subsequent releases of the application.

An independent software vendor (ISV), Payroll Systems, Inc., specializing in creating customized Payroll solutions for companies in the retail industry is developing the application. ABC HR specialist working conjunction with analyst personnel from the ISV will define both the application and technical requirements for the application.

The application will operate from a Windows 95 workstation. The technical structure of the application will be determined in the Application Functional Specification document produced by the ISV.

III. Goals of the Software Test Effort

The overall goal of this test is to adequately test the new Payroll software to determine its ability to support the employee growth expected as part of the Company's Business Plan. In support of this goal, there are five specific goals that will be used.

1. Quantify the degree to which the application supports the Business Requirements that drove its development.

2. Provide recommendations for a release decision based on the quantified results.

3. Provide a baseline measurement system for all software testing processes at the Company. This will be done so that a continuous process improvement program can be begun to increase the efficiency of software testing efforts at the company.

4. Complete Software Testing Activity within project schedule parameters.

5. Complete Software Testing Activity within project cost parameters.

IV. Test Scope

The scope of the effort is the implementation of new software and the deployment of that software to multiple sites.

Since this is a new software implementation, program fixes are not applicable.

Since this is a new software implementation, regression testing of existing functions in not applicable.

A. Business Requirements to be validated:

Validate that the Payroll system will be able to do the following:

Add new employees, both US and Non-US citizens

Update the name, insurance, salary, department, and benefits fields in the employee record Delete both individual employee records as well as purge all employee records from the database Display employee records in detailed and list views Find individual employee records in the databases using an ID number or the employee name The system should be available at all stores B. Business Requirements not to be validated:

Since this is an initial release of the application, all business requirements will be validated.

C. Business Requirements which cannot be validated:

Year end billing report. The specifications for this report have not been defined yet.

Addition of contractors. The procedure has not been defined yet.

V. Test Approach

A. Type of Testing to Be Employed

This test plan assumes that the application will have Unit and Integration testing performed by the ISV before the application is delivered to ABC Hardware testing personnel.

The approach employed in this test plan will focus on the validation of the application and technical functions identified in the application requirements. To achieve this, the following test types will be used:

Functional Test

System Test

Performance Test

Acceptance Test

Regression Test

The Function, System, Acceptance and Regression Testing activities necessary to complete this test plan have direct and severe dependencies on the function requirement and functional design of the application. The Performance Testing activities necessary to complete this test plan have direct and server dependencies on the technical requirements and technical design of the application.

Brief descriptions of each test type are as provided for reference as follows:

Functional Test

Provides a systematic demonstration that functions tested are available as specified by the business requirements, system documentation, and user manuals. A key distinction of functional testing is that it is oriented from the application specialist's perspective. Functional (Business) testing is centered around the following items:

Valid Input—identified classes of valid input must be accepted.

Invalid Input—identified class of invalid input must be rejected.

Functions—identified classes of application outputs must be exercised.

Systems/Procedures—interfacing systems or procedures must be invoked.

Organization and preparation of function tests is focused on requirement, key functions or special test cases. All test cases are documented, include predictable results, and exist in a repetitive testing environment. In addition, systematic coverage pertaining to identified business process flows, data fields that integrate to other business systems, pre-defined processes and successive processes must be considered for testing. Before functional testing is complete, additional tests are identified and the effective value of current test is determined.

System Test

Systems testing is the tasting of a configuration to ensure known and predictable results. String testing is an excellent example of a type of system testing. Another example of system testing is the configuration oriented system integration test. System testing is based on process descriptions and flows, emphasizing pre-driven process links and integration points. System testing ensure that the entire integrated software system meets requirements. It consists of bringing together and exercising all elements of the product in a real world, or accurately simulated, environment.

Performance Test

Performance testing determines the runtime performance of the application and its supporting infrastructure under certain conditions. Performance testing is also used to measure several system characteristics, such as processing speed, response time, resource consumption, throughput, and efficiency. Stress testing is a subset of performance testing.

Acceptance Test

Acceptance testing is the formal testing performed before the application is implemented into the production environment. Acceptance testing is generally developed and performed by the client or application specialist and is conducted to determined whether a system satisfies its acceptance criteria by validating that requirements have been met, including the documentation and business processes. Based on the results of the Acceptance Test, the customer determines whether to accept or decline the system.

Regression Test

The regression test is a series of tests to ensure that no adverse changes are introduced to the application during maintenance changes, upgrades, or other changes. Regression testing is composed of a suite of components that are rerun when a single application component has been modified. This provides confidence that the system will function with newly implemented requirements. Regression testing is often a repeating process a testing cycle.

B. Pass/Fail Criteria

Error Discovery Rate trend for test case defects. 80% Test Case Pass on final Test Run 0% unresolved critical software defects 100% Business Requirement Coverage 100% Declining Error Discovery Rate trend for software defects Declining Error Discovery Rate trend for test case defects Test Discrepancy Reporting Procedure Errors that are found during testing are documented by each tester and then sent to the testing manager for review. If the test manager determines that the problem is an application defect the issue is logged into the defect tracking system.

Each discrepancy is logged into one of the following categories:

Valid

Test Case Defect

Application Context Defect

Application Defect

Each week all of the reported defect are reviewed for their completion status. A report from the meeting is then sent to all test team member through e-mail.

C. Suspension Criteria and Resumption Results

Suspension Criteria—Any test run will be suspended if the following criteria is met or exceeded.

75% or higher test case failure rate on a given test run based on the execution of the first 50 test cases executed for that test run 10 or more General Protection Faults (GPF's) or application failures per test run (Application Failure is defined as the user interface refusing to accept input, or display values or failing and being canceled by the relevant Windows operating systems.)

Resumption Criteria—The suspended test run will not be re-executed until the following criteria is met or exceeded:

Closed incidents the defect tracking system indicating repair of issues that contributed to triggering suspension of the test.

D. Test Deliverables

The following items will be delivered from the test effort:

Test Plan

Test Case Inventory

Test Cases

Test Environment Schedule

Test Execution Results

Application Readiness Report

Environment Needs

Configuration:

| | Application Server Requirements |
|---|---|
| Operating System | Windows NT Server version 4.0 |
| RAM | 4 GB |
| System/CPU Type | Application: Compaq ProLiant 6500R |
| Disk Space for Installation | 200 MB Minimum (Additional space required for report data) |
| Additional Requirements | Network access to Payroll database Payroll Version 1.0b |

-continued

| | |
|---|---|
| Video | VGA or better |
| CD-ROM Drive | Required |
| Mouse | Required |

| Database Server Requirements | |
|---|---|
| Operating System | Windows NT Server version 4.0 |
| RAM | 8 GB |
| System/CPU Type | Application: Compaq ProLiant 7000R |
| Disk Space for Installation | 500 MB Minimum |
| Additional Requirements | Available to appropriate network resources Oracle 7.0 of Sybase 11 |
| Video | VGA or better |
| CD-Rom Drive | Required |
| Mouse | Required |

| Workstation Requirements | |
|---|---|
| Operating System | Windows NT Workstation 4.0 or Windows 95 |
| RAM | 32 MB |
| System/CPU Type | Pentium or better |
| Disk Space for Installation | 5 MB Minimum (Additional space required for report data) |
| Additional Requirements | Network access to main database |
| Video | VGA or better |
| CD-ROM Drive | Required |
| Mouse | Required |

Communications:

Data communication will take place over the existing private IP network and security will be handled using an existing online security database. No special activities are anticipated.

Data:

Controlled data (data that will yield predictable results) needs to be available for testing. The process used to obtain this data should be documented for use in future projects. A process should be developed and documented for restoring the database.

F. Roles and Responsibilities

Personnel

Vendor: Payroll Systems, Inc.

Human Resources Manager: John Eigenvalue

IS Manager: Hannah Boughman

Project Manager: I. M. Bored

IS Technician: Allan Rich

QA Lead: Martin Kenneth

Test Manager: Scottie Pippen

Business Analyst: Karen Wellworth

Testers: Jake Swift, Teri Jones, Cathy Norton, Jeff Briggs, John Smith

G. Staffing and Training Needs

Entire project team needs training on the Payroll Applicant

Business Analysts need training on the basis of Functional and Performance testing.

Tools to be Used

No automated testing tools will be used to assist with the execution of this test plan.

The Microsoft Office products will be used to assist the test team in completing this test plan The DCS/Tracker defect tracking toll will be utilized to log/track and report on the defects identified during this project.

VI. Test Effort Schedule

| Test Step Description | Estimated Start Date | Estimated Completion Date |
|---|---|---|
| Test Planning | Mar. 1, 1999 | Mar. 5, 1999 |
| Test Case Development | Mar. 29, 1999 | Apr. 9, 1999 |
| Test Environment Preparation | Apr. 12, 1999 | Apr. 16, 1999 |
| Test Execution | Apr. 19, 1999 | Jul. 31, 1999 |
| Test Results Analysis | Aug. 1, 1999 | Aug. 10, 1999 |
| Management Reporting | Aug. 10, 1999 | Aug. 18, 1999 |

VII. Risks and Contingencies

| Risk | Mitigation | Contingency |
|---|---|---|
| There is a risk that the appropriate resources will not be available at the time and for the amount of time needed. | This risk can be controlled by steady, consistent support from ABC Hardware management. | Reduce the scope of the testing effort. |
| There is a risk that the vendor product chosen for the new Payroll system will not be accepted and not utilized. | The involvement of the HR Management and Business Analyst personnel on the project will mitigate this risk. | 1) Delay Payroll Release & begin a search for a commercial, off the shelf package that can be customized to meet ABC's needs. 2) Delay Payroll Release & contract with ADP for the next 12 month period while final solution can be created. |
| Additional risks arise primarily in the area of Project Control. | The control of this risk comes in the consistent communication between the Project Manager and Management. | This risk is ongoing and will need to be mitigated throughout the project. |

VIII. Approvals

| Project Role | Name | Initials | Date |
|---|---|---|---|
| Project Sponsor | | | |
| Project Manager | | | |
| Lead Project Business Analyst | | | |
| Lead Quality Assurance Analyst | | | |
| Lead Software Developer | | | |

EXAMPLE 2

Decision Tree for Payroll

ABC Hardware, Inc.
"Your Neighborhood Hardware Store"

| Business Requirements | Test Requirement/Test Case | Test Requirement/Test Case | Test Requirement/Test Case | Test Condition(s) | # of Case |
|---|---|---|---|---|---|
| Employee Processing - 1.0 | | | | | 2 |
| | Add Employees 1.1 | | | | 1 |
| | | Add US - 1.1.1 | | | |
| | | | Add US - 1.1.1.1 | Valid,None,Admin,None | |
| | | | Add US - 1.1.1.2 | Valid,None,Finance,None | |
| | | | Add US - 1.1.1.3 | Valid,None,Marketing,None | |
| | | | Add US - 1.1.1.4 | Valid,None,QA,None | |
| | | | Add US - 1.1.1.5 | Valid,None,R&D,None | |
| | | | Add US - 1.1.1.6 | Valid,None,Sales,None | |
| | | | Add US - 1.1.1.7 | Valid,None,Sales,Basic Plan | |
| | | | Add US - 1.1.1.8 | Valid,Self,Admin,Basic Plan | |
| | | | Add US - 1.1.1.9 | Valid,Self,Finance,Basic Plan | |
| | | | Add US - 1.1.1.10 | Valid,Self,Marketing,Basic Plan | |
| | | | Add US - 1.1.1.11 | Valid,Self,QA,Basic Plan | |
| | | | Add US - 1.1.1.12 | Valid,Self,R&D,Basic Plan | |
| | | | Add US - 1.1.1.13 | Valid,Self,Sales,Basic Plan | |
| | | | Add US - 1.1.1.14 | Valid,Self,Admin,Custom Plan A | |
| | | | Add US - 1.1.1.15 | Valid,Self,Finance,Custom Plan A | |
| | | | Add US - 1.1.1.16 | Valid,Self,Marketing,Custom Plan A | |
| | | | Add US - 1.1.1.17 | Valid,Self,QA,Custom Plan A | |
| | | | Add US - 1.1.1.18 | Valid,Self,R&D,Custom Plan A | |
| | | | Add US - 1.1.1.19 | Valid,Self,Sales,Custom Plan A | |
| | | | Add US - 1.1.1.20 | Valid,Self,Admin,Custom Plan B | |
| | | | Add US - 1.1.1.21 | Valid,Self,Finance,Custom Plan B | |
| | | | Add US - 1.1.1.22 | Valid,Self,Marketing,Custom Plan B | |
| | | | Add US - 1.1.1.23 | Valid,Self,QA,Custom Plan B | |
| | | | Add US - 1.1.1.24 | Valid,Self,R&D,Custom Plan B | |
| | | | Add US - 1.1.1.25 | Valid,Self,Sales,Custom Plan B | |
| | | | Add US - 1.1.1.26 | Valid,Self,Admin,Custom Plan C | |
| | | | Add US - 1.1.1.27 | Valid,Self,Finance,Custom Plan C | |
| | | | Add US - 1.1.1.28 | Valid,Self,Marketing,Custom Plan C | |
| | | | Add US - 1.1.1.29 | Valid,Self,QA,Custom Plan C | |
| | | | Add US - 1.1.1.30 | Valid,Self,R&D,Custom Plan C | |
| | | | Add US - 1.1.1.31 | Valid,Self,Sales,Custom Plan C | |
| | | | Add US - 1.1.1.32 | Valid,Self,Admin,Custom Plan D | |
| | | | Add US - 1.1.1.33 | Valid,Self,Finance,Custom Plan D | |
| | | | Add US - 1.1.1.34 | Valid,Self,Marketing,Custom Plan D | |
| | | | Add US - 1.1.1.35 | Valid,Self,QA,Custom Plan D | |
| | | | Add US - 1.1.1.36 | Valid,Self,R&D,Custom Plan D | |
| | | | Add US - 1.1.1.37 | Valid,Self,Sales,Custom Plan D | |
| | | | Add US - 1.1.1.38 | Valid,Self,Admin,Extended Plan | |
| | | | Add US - 1.1.1.39 | Valid,Self,Finance,Extended Plan | |
| | | | Add US - 1.1.1.40 | Valid,Self,Marketing,Extended Plan | |
| | | | Add US - 1.1.1.41 | Valid,Self,QA,Extended Plan | |
| | | | Add US - 1.1.1.42 | Valid,Self,R&D,Extended Plan | |
| | | | Add US - 1.1.1.43 | Valid,Self,Sales,Extended Plan | |

-continued

ABC Hardware, Inc.
"Your Neighborhood Hardware Store"

| Business Requirements | Test Requirement/Test Case | Test Requirement/Test Case | Test Condition(s) | # of Case |
|---|---|---|---|---|
| | | Add US - 1.1.1.44 | Valid,Self,Admin,Full Plan | |
| | | Add US - 1.1.1.45 | Valid,Self,Finance,Full Plan | |
| | | Add US - 1.1.1.46 | Valid,Self,Marketing,Full Plan | |
| | | Add US - 1.1.1.47 | Valid,Self,QA,Full Plan | |
| | | Add US - 1.1.1.48 | Valid,Self,R&D,Full Plan | |
| | | Add US - 1.1.1.49 | Valid,Self,Sales,Full Plan | |
| | | Add US - 1.1.1.50 | Valid,Self,Admin,HMO | |
| | | Add US - 1.1.1.51 | Valid,Self,Finance,HMO | |
| | | Add US - 1.1.1.52 | Valid,Self,Marketing,HMO | |
| | | Add US - 1.1.1.53 | Valid,Self,QA,HMO | |
| | | Add US - 1.1.1.54 | Valid,Self,R&D,HMO | |
| | | Add US - 1.1.1.55 | Valid,Self,Sales,HMO | |
| | | Add US - 1.1.1.56 | Valid,Family,Admin,Basic Plan | |
| | | Add US - 1.1.1.57 | Valid,Family,Finance,Basic Plan | |
| | | Add US - 1.1.1.58 | Valid,Family,Marketing,Basic Plan | |
| | | Add US - 1.1.1.59 | Valid,Family,QA,Basic Plan | |
| | | Add US - 1.1.1.60 | Valid,Family,R&D,Basic Plan | |
| | | Add US - 1.1.1.61 | Valid,Family,Sales,Basic Plan | |
| | | Add US - 1.1.1.62 | Valid,Family,Admin,Custom Plan A | |
| | | Add US - 1.1.1.63 | Valid,Family,Finance,Custom Plan A | |
| | | Add US - 1.1.1.64 | Valid,Family,Marketing,Custom Plan A | |
| | | Add US - 1.1.1.65 | Valid,Family,QA,Custom Plan A | |
| | | Add US - 1.1.1.66 | Valid,Family,R&D,Custom Plan A | |
| | | Add US - 1.1.1.67 | Valid,Family,Sales,Custom Plan A | |
| | | Add US - 1.1.1.68 | Valid,Family,Admin,Custom Plan B | |
| | | Add US - 1.1.1.69 | Valid,Family,Finance,Custom Plan B | |
| | | Add US - 1.1.1.70 | Valid,Family,Marketing,Custom Plan B | |
| | | Add US - 1.1.1.71 | Valid,Family,QA,Custom Plan B | |
| | | Add US - 1.1.1.72 | Valid,Family,R&D,Custom Plan B | |
| | | Add US - 1.1.1.73 | Valid,Family,Sales,Custom Plan B | |
| | | Add US - 1.1.1.74 | Valid,Family,Admin,Custom Plan C | |
| | | Add US - 1.1.1.75 | Valid,Family,Finance,Custom Plan C | |
| | | Add US - 1.1.1.76 | Valid,Family,Marketing,Custom Plan C | |
| | | Add US - 1.1.1.77 | Valid,Family,QA,Custom Plan C | |
| | | Add US - 1.1.1.78 | Valid,Family,R&D,Custom Plan C | |
| | | Add US - 1.1.1.79 | Valid,Family,Sales,Custom Plan C | |
| | | Add US - 1.1.1.80 | Valid,Family,Admin,Custom Plan D | |
| | | Add US - 1.1.1.81 | Valid,Family,Finance,Custom Plan D | |
| | | Add US - 1.1.1.82 | Valid,Family,Marketing,Custom Plan D | |
| | | Add US - 1.1.1.83 | Valid,Family,QA,Custom Plan D | |
| | | Add US - 1.1.1.84 | Valid,Family,R&D,Custom Plan D | |
| | | Add US - 1.1.1.85 | Valid,Family,Sales,Custom Plan D | |
| | | Add US - 1.1.1.86 | Valid,Family,Admin,Extended Plan | |
| | | Add US - 1.1.1.87 | Valid,Family,Finance,Extended Plan | |
| | | Add US - 1.1.1.88 | Valid,Family,Marketing,Extended Plan | |
| | | Add US - 1.1.1.89 | Valid,Family,QA,Extended Plan | |
| | | Add US - 1.1.1.90 | Valid,Family,R&D,Extended Plan | |

-continued

ABC Hardware, Inc.
"Your Neighborhood Hardware Store"

| Business Requirements | Test Requirement/Test Case | Test Requirement/Test Case | Test Condition(s) | # of Case |
|---|---|---|---|---|
| | | Add US - 1.1.1.91 | Valid,Family,Sales,Extended Plan | |
| | | Add US - 1.1.1.92 | Valid,Family,Admin,Full Plan | |
| | | Add US - 1.1.1.93 | Valid,Family,Finance,Full Plan | |
| | | Add US - 1.1.1.94 | Valid,Family,Marketing, Full Plan | |
| | | Add US - 1.1.1.95 | Valid,Family,QA,Full Plan | |
| | | Add US - 1.1.1.96 | Valid,Family,R&D,Full Plan | |
| | | Add US - 1.1.1.97 | Valid,Family,Sales,Full Plan | |
| | | Add US - 1.1.1.98 | Valid,Family,Admin,HMO | |
| | | Add US - 1.1.1.99 | Valid,Family,Finance,HMO | |
| | | Add US - 1.1.1.100 | Valid,Family,Marketing,HMO | |
| | | Add US - 1.1.1.101 | Valid,Family,QA,HMO | |
| | | Add US - 1.1.1.102 | Valid,Family,R&D,HMO | |
| | | Add US - 1.1.1.103 | Valid,Family,Sales,HMO | |
| | | Add US - 1.1.1.104 | None,None,Admin,None | |
| | | Add US - 1.1.1.105 | None,None,None,Admin,None (Nan | |
| | Add Non-US - 1.1.2 | | | |
| | | Add Non-US - 1.1.2.1 | Valid,None,Admin,None | 10 |
| | | Add Non-US - 1.1.2.2 | Valid,None,Finance,None | |
| | | Add Non-US - 1.1.2.3 | Valid,None,Marketing,None | |
| | | Add Non-US - 1.1.2.4 | Valid,None,QA,None | |
| | | Add Non-US - 1.1.2.5 | Valid,None,R&D,None | |
| | | Add Non-US - 1.1.2.6 | Valid,None,Sales,None | |
| | | Add Non-US - 1.1.2.7 | Valid,None,Sales,Basic Plan | |
| | | Add Non-US - 1.1.2.8 | Valid,Self,Admin,Basic Plan | |
| | | Add Non-US - 1.1.2.9 | Valid,Self,Finance,Basic Plan | |
| | | Add Non-US - 1.1.2.10 | Valid,Self,Marketing,Basic Plan | |
| | | Add Non-US - 1.1.2.11 | Valid,Self,QA,Basic Plan | |
| | | Add Non-US - 1.1.2.12 | Valid,Self,R&D,Basic Plan | |
| | | Add Non-US - 1.1.2.13 | Valid,Self,Sales,Basic Plan | |
| | | Add Non-US - 1.1.2.14 | Valid,Self,Admin,Custom Plan A | |
| | | Add Non-US - 1.1.2.15 | Valid,Self,Finance,Custom Plan A | |
| | | Add Non-US - 1.1.2.16 | Valid,Self,Marketing,Custom Plan A | |
| | | Add Non-US - 1.1.2.17 | Valid,Self,QA,Custom Plan A | |
| | | Add Non-US - 1.1.2.18 | Valid,Self,R&D,Custom Plan A | |
| | | Add Non-US - 1.1.2.19 | Valid,Self,Sales,Custom Plan A | |
| | | Add Non-US - 1.1.2.20 | Valid,Self,Admin,Custom Plan B | |
| | | Add Non-US - 1.1.2.21 | Valid,Self,Finance,Custom Plan B | |
| | | Add Non-US - 1.1.2.22 | Valid,Self,Marketing,Custom Plan B | |
| | | Add Non-US - 1.1.2.23 | Valid,Self,QA,Custom Plan B | |
| | | Add Non-US - 1.1.2.24 | Valid,Self,R&D,Custom Plan B | |
| | | Add Non-US - 1.1.2.25 | Valid,Self,Sales,Custom Plan B | |
| | | Add Non-US - 1.1.2.26 | Valid,Self,Admin,Custom Plan B | |
| | | Add Non-US - 1.1.2.27 | Valid,Self,Finance,Custom Plan C | |
| | | Add Non-US - 1.1.2.28 | Valid,Self,Marketing,Custom Plan C | |
| | | Add Non-US - 1.1.2.29 | Valid,Self,QA,Custom Plan C | |
| | | Add Non-US - 1.1.2.30 | Valid,Self,R&D,Custom Plan C | |
| | | Add Non-US - 1.1.2.31 | Valid,Self,Sales,Custom Plan C | |

-continued

ABC Hardware, Inc.
"Your Neighborhood Hardware Store"

| Business Requirements | Test Requirement/Test Case | Test Requirement/Test Case | Test Condition(s) | # of Case |
|---|---|---|---|---|
| | | Add Non-US - 1.1.2.32 | Valid,Self,Admin,Custom Plan D | |
| | | Add Non-US - 1.1.2.33 | Valid,Self,Finance,Custom Plan D | |
| | | Add Non-US - 1.1.2.34 | Valid,Self,Marketing,Custom Plan D | |
| | | Add Non-US - 1.1.2.35 | Valid,Self,QA,Custom Plan D | |
| | | Add Non-US - 1.1.2.36 | Valid,Self,R&D,Custom Plan D | |
| | | Add Non-US - 1.1.2.37 | Valid,Self,Sales,Custom Plan D | |
| | | Add Non-US - 1.1.2.38 | Valid,Self,Admin,Extended Plan | |
| | | Add Non-US - 1.1.2.39 | Valid,Self,Finance,Extended Plan | |
| | | Add Non-US - 1.1.2.40 | Valid,Self,Marketing,Extended Plan | |
| | | Add Non-US - 1.1.2.41 | Valid,Self,QA,Extended Plan | |
| | | Add Non-US - 1.1.2.42 | Valid,Self,R&D,Extended Plan | |
| | | Add Non-US - 1.1.2.43 | Valid,Self,Sales,Extended Plan | |
| | | Add Non-US - 1.1.2.44 | Valid,Self,Admin,Full Plan | |
| | | Add Non-US - 1.1.2.45 | Valid,Self,Finance,Full Plan | |
| | | Add Non-US - 1.1.2.46 | Valid,Self,Marketing,Full Plan | |
| | | Add Non-US - 1.1.2.47 | Valid,Self,QA,Full Plan | |
| | | Add Non-US - 1.1.2.48 | Valid,Self,R&D,Full Plan | |
| | | Add Non-US - 1.1.2.49 | Valid,Self,Sales,Full Plan | |
| | | Add Non-US - 1.1.2.50 | Valid,Self,Admin,HMO | |
| | | Add Non-US - 1.1.2.51 | Valid,Self,Finance,HMO | |
| | | Add Non-US - 1.1.2.52 | Valid,Self,Marketing,HMO | |
| | | Add Non-US - 1.1.2.53 | Valid,Self,QA,HMO | |
| | | Add Non-US - 1.1.2.54 | Valid,Self,R&D,HMO | |
| | | Add Non-US - 1.1.2.55 | Valid,Self,Sales,HMO | |
| | | Add Non-US - 1.1.2.56 | Valid,Family,Admin,Basic Plan | |
| | | Add Non-US - 1.1.2.57 | Valid,Family,Finance,Basic Plan | |
| | | Add Non-US - 1.1.2.58 | Valid,Family,Marketing,Basic Plan | |
| | | Add Non-US - 1.1.2.59 | Valid,Family,QA,Basic Plan | |
| | | Add Non-US - 1.1.2.60 | Valid,Family,R&D,Basic Plan | |
| | | Add Non-US - 1.1.2.61 | Valid,Family,Sales,Basic Plan | |
| | | Add Non-US - 1.1.2.62 | Valid,Family,Admin,Custom Plan A | |
| | | Add Non-US - 1.1.2.63 | Valid,Family,Finance,Custom Plan A | |
| | | Add Non-US - 1.1.2.64 | Valid,Family,Marketing,Custom Plan A | |
| | | Add Non-US - 1.1.2.65 | Valid,Family,QA,Custom Plan A | |
| | | Add Non-US - 1.1.2.66 | Valid,Family,R&D,Custom Plan A | |
| | | Add Non-US - 1.1.2.67 | Valid,Family,Sales,Custom Plan A | |
| | | Add Non-US - 1.1.2.68 | Valid,Family,Admin,Custom Plan B | |
| | | Add Non-US - 1.1.2.69 | Valid,Family,Finance,Custom Plan B | |
| | | Add Non-US - 1.1.2.70 | Valid,Family,Marketing,Custom Plan B | |
| | | Add Non-US - 1.1.2.71 | Valid,Family,QA,Custom Plan B | |
| | | Add Non-US - 1.1.2.72 | Valid,Family,R&D,Custom Plan B | |
| | | Add Non-US - 1.1.2.73 | Valid,Family,Sales,Custom Plan B | |
| | | Add Non-US - 1.1.2.74 | Valid,Family,Admin,Custom Plan C | |
| | | Add Non-US - 1.1.2.75 | Valid,Family,Finance,Custom Plan C | |
| | | Add Non-US - 1.1.2.76 | Valid,Family,Marketing,Custom Plan C | |
| | | Add Non-US - 1.1.2.77 | Valid,Family,QA,Custom Plan C | |
| | | Add Non-US - 1.1.2.78 | Valid,Family,R&D,Custom Plan C | |

-continued

ABC Hardware, Inc.
"Your Neighborhood Hardware Store"

| Business Requirements | Test Requirement/Test Case | Test Requirement/Test Case | Test Requirement/Test Case | Test Condition(s) | # of Case |
|---|---|---|---|---|---|
| | | | Add Non-US - 1.1.2.79 | Valid,Family,Sales,Custom Plan C | |
| | | | Add Non-US - 1.1.2.80 | Valid,Family,Admin,Custom Plan D | |
| | | | Add Non-US - 1.1.2.81 | Valid,Family,Finance,Custom Plan D | |
| | | | Add Non-US - 1.1.2.82 | Valid,Family,Marketing,Custom Plan D | |
| | | | Add Non-US - 1.1.2.83 | Valid,Family,QA,Custom Plan D | |
| | | | Add Non-US - 1.1.2.84 | Valid,Family,R&D,Custom Plan D | |
| | | | Add Non-US - 1.1.2.85 | Valid,Family,Sales,Custom Plan D | |
| | | | Add Non-US - 1.1.2.86 | Valid,Family,Admin,Extended Plan | |
| | | | Add Non-US - 1.1.2.87 | Valid,Family,Finance,Extended Plan | |
| | | | Add Non-US - 1.1.2.88 | Valid,Family,Marketing,Extended Plan | |
| | | | Add Non-US - 1.1.2.89 | Valid,Family,QA,Extended Plan | |
| | | | Add Non-US - 1.1.2.90 | Valid,Family,R&D,Extended Plan | |
| | | | Add Non-US - 1.1.2.91 | Valid,Family,Sales,Extended Plan | |
| | | | Add Non-US - 1.1.2.92 | Valid,Family,Admin,Full Plan | |
| | | | Add Non-US - 1.1.2.93 | Valid,Family,Finance,Full Plan | |
| | | | Add Non-US - 1.1.2.94 | Valid,Family,Marketing,Full Plan | |
| | | | Add Non-US - 1.1.2.95 | Valid,Family,QA,Full Plan | |
| | | | Add Non-US - 1.1.2.96 | Valid,Family,R&D,Full Plan | |
| | | | Add Non-US - 1.1.2.97 | Valid,Family,Sales,Full Plan | |
| | | | Add Non-US - 1.1.2.98 | Valid,Family,Admin,HMO | |
| | | | Add Non-US - 1.1.2.99 | Valid,Family,Finance,HMO | |
| | | | Add Non-US - 1.1.2.100 | Valid,Family,Marketing,HMO | |
| | | | Add Non-US - 1.1.2.101 | Valid,Family,QA,HMO | |
| | | | Add Non-US - 1.1.2.102 | Valid,Family,R&D,HMO | |
| | | | Add Non-US - 1.1.2.103 | Valid,Family,Sales,HMO | |
| | | | Add Non-US - 1.1.2.104 | None,None,Admin,None | |
| | | | Add Non-US - 1.1.2.105 | None,None,None,Admin,None (Na | |
| | Find Employees 1.2 | Find by Emp. Num. 1.2.1 | Find Employee 1.2.1.1 | Partial Employee Number | |
| | | | Find Employee 1.2.1.2 | Complete Employee Number | |
| | | Find by Emp. Name 1.2.2 | Find Employee 1.2.2.1 | Partial Employee Name | |
| | | | Find Employee 1.2.2.2 | Complete Employee Name | |
| | Update Employees 1.3 | Update US 1.3.1 | Update US 1.3.1.1 | Update Name | |
| | | | Update US 1.3.1.2 | Update Salary | |
| | | | Update US 1.3.1.3 | Update Citzenship | |
| | | | Update US 1.3.1.4 | Update Insurance | |
| | | | Update US 1.3.1.5 | Update Department | |
| | | | Update US 1.3.1.6 | Update Benefits | |
| | | | Update US 1.3.1.7 | Update Insurance & Benefits | 7 |
| | | Update Non-US 1.3.2 | Update Non-US 1.3.2.1 | Update Name | |
| | | | Update Non-US 1.3.2.2 | Update Salary | |
| | | | Update Non-US 1.3.2.3 | Update Citzenship | |

-continued

ABC Hardware, Inc.
"Your Neighborhood Hardware Store"

| Business Requirements | Test Requirement/Test Case | Test Requirement/Test Case | Test Requirement/Test Case | Test Condition(s) | # of Case |
|---|---|---|---|---|---|
| | | | Update Non-US 1.3.2.4 | Update Insurance | |
| | | | Update Non-US 1.3.2.5 | Update Department | |
| | | | Update Non-US 1.3.2.6 | Update Benefits | |
| | | | Update Non-US 1.3.2.7 | Update Insurance & Benefits | 2 |
| | Delete Employee 1.4 | Delete Single Employee 1.4.1 | Del Single US 1.4.1.1 | | |
| | | | Del Single Non-US 1.4.1.2 | | 1 |
| | | Delete All Employees 1.4.2 | Del. All Employees 1.4.2.1 | | |
| Payroll Calculation - 2.0 | Calculate Payroll 2.1 | | | | 0 |
| | Adjust Payroll 2.2 | | | | 0 |
| Payroll Disbursement - 3.0 | Check Processing 3.1 | | | | 0 |
| | ACH Processing 3.2 | | | | 0 |
| | Withholdings Processing 3.3 | | | | 0 |
| Payroll Reporting - 4.0 | Regulatory Reporting 4.1 | | | | |
| | Financial Reporting 4.2 | | | | |
| | Management Reporting 4.3 | | | | |
| Graphical User Interface - 5.0 | Microsoft Windows Std 5.1 | | | | |
| | Context Sensitive Help 5.2 | | | | |
| System Performance - 6.0 | Response Time 6.1 | | | | |
| | Database Perforance 6.2 | | | | |
| | Network Performance 6.3 | | | | |

EXAMPLE 3

Test Cases for Payroll

| | |
|---|---|
| Date | 31 MAR. 1999 |
| Tester | Jake Swift |
| Test Case ID | Add US - 1.1.1.1 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Admin. Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Doe, John in the Name field | Data - Valid condition |
| 5 | Enter 1000 for the Salary choice. | Data |
| 6 | Select the None radio button for the Insurance choice. | Data - None condition |
| 7 | Select Admin for the Department choice. | Data - Admin condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Doe is listed as an employee | Data |
| 14 | Select Doe, John. | |
| 15 | Select the View pull-down menu. | |
| 16 | Select Detail from the pull-down menu. | |
| 17 | Verify that John Doe's salary is 1000 | Data |
| 18 | Verify that John Doe's Insurance choice is None. | Data |
| 19 | Verify that John Doe's Department choice is Admin. | Data |
| 20 | Verify that John Doe's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.2 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Finance, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull down menu | |
| 4 | Enter Doe, Jane in the Name field | Data - Valid condition |
| 5 | Enter 1000 for the Salary choice. | Data |
| 6 | Select the None radio button for the Insurance choice | Data - None condition |
| 7 | Select Finance for the Department choice. | Data - Finance condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane Doe is listed as an employee | Data |
| 14 | Select Doe, Jane. | |
| 15 | Select the View pull-down menu. | |
| 16 | Select Detail from the pull-down menu. | |
| 17 | Verify that Jane Doe's salary is 1000 | Data |
| 18 | Verify that Jane Doe's Insurance choice is None. | Data |
| 19 | Verify that Jane Doe's Department choice is Finance. | Data |
| 20 | Verify that Jane Doe's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.3 |
| Bus. Req. ID | Employee Processing |
| System | Pentium 233 w/MMX, 128 MB RAM |
| Function | Add Employees |
| Version | Payro11 1.0, Payroll GUI 1.0b, Payroll Server 1.0b |
| Environment | Windows NT 4.0 (Service Pack 4) |
| Conditions | Name - Valid, Insurance - None, Department - Marketing, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter DeBord, Jane in the Name field | Data - Valid condition |
| 5 | Enter 1000 for the Salary choice. | Data |
| 6 | Select the None radio button for the Insurance choice. | Data - None condition |
| 7 | Select Marketing for the Department choice. | Data - Marketing condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane DeBord is listed as an employee | Data |
| 14 | Select DeBord, Jane. | |
| 15 | Select the View pull-down menu. | |
| 16 | Select Detail from the pull-down menu. | |
| 17 | Verify that Jane DeBord's salary is 1000 | Data |
| 18 | Verify that Jane DeBord's Insurance choice is None. | Data |
| 19 | Verify that Jane DeBord's Department choice is Marketing. | Data |
| 20 | Verify that Jane DeBord's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.4 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - QA, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter DeBord, John in the Name field | Data - Valid condition |
| 5 | Enter 1000 for the Salary choice. | Data |
| 6 | Select the None radio button for the Insurance choice. | Data - None condition |
| 7 | Select QA for the Department choice. | Data - QA condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John DeBord is listed as an employee | Data |
| 14 | Select DeBord, John. | |
| 15 | Select the View pull-down menu. | |
| 16 | Select Detail from the pull-down menu. | |
| 17 | Verify that John DeBord's salary is 1000 | Data |
| 18 | Verify that John DeBord's Insurance choice is None. | Data |
| 19 | Verify that John DeBord's Department choice is QA. | Data |
| 20 | Verify that John DeBord's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.5 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - R&D, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Botz, John in the Name field | Data - Valid condition |
| 5 | Enter 1000 for the Salary choice. | Data |
| 6 | Select the None radio button for the Insurance choice. | Data - None condition |
| 7 | Select R&D for the Department choice. | Data - R&D condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Botz is listed as an employee | Data |
| 14 | Select Botz, John. | |
| 15 | Select the View pull-down menu. | |
| 16 | Select Detail from the pull-down menu. | |
| 17 | Verify that John Botz's salary is 1000 | Data |
| 18 | Verify that John Botz's Insurance choice is None. | Data |
| 19 | Verify that John Botz's Department choice is R&D. | Data |
| 20 | Verify that John Botz's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.6 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Botz, Jane in the Name field | Data - Valid condition |
| 5 | Enter 1000 for the Salary choice. | Data |
| 6 | Select the None radio button for the Insurance choice. | Data - None condition |
| 7 | Select Sales for the Department choice. | Data - Sales condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane Botz is listed as an employee | Data |
| 14 | Select Botz, Jane. | |
| 15 | Select the View pull-down menu. | |
| 16 | Select Detail from the pull-down menu. | |
| 17 | Verify that Jane Botz's salary is 1000 | Data |
| 18 | Verify that Jane Botz's Insurance choice is None. | Data |
| 19 | Verify that Jane Botz's Department choice is Sales. | Data |
| 20 | Verify that Jane Botz's Benefits choice is None. | Data |
| 21 | Return to the main payroll screen. | |

| | |
|---|---|
| Date | 31 MAR. 1999 |
| Tester | Jake Swift |
| Test Case ID | Add US - 1.1.1.1 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |

-continued

| | Environment Conditions | Windows NT 4.0 (Service Pack 4) Name - Valid, Insurance - None, Department - Sales, Benefits - Basic Plan | |
|---|---|---|---|
| Step # | Steps to Perform | | Comment |
| 1 | Verify that the basic company employee data is loaded in the list view on the main payroll screen. | | Data |
| 2 | Select the Employee pull-down menu. | | |
| 3 | Select Add from the pull-down menu | | |
| 4 | Enter Bradford, Jane in the Name field | | Data - Valid condition |
| 5 | Enter 1000 for the Salary choice. | | Data |
| 6 | Select the None radio button for the Insurance choice. | | Data - None condition |
| 7 | Select Sales for the Department choice. | | Data - Sales condition |
| 8 | Select Basic Plan for the Benefits choice. | | Data - Basic Plan condition |
| 9 | Select OK to Add the employee. | | |
| 10 | Close the Payroll application. | | |
| 11 | Reopen the Payroll application | | |
| 12 | Verify that the basic company employee data is loaded in the list view on the main payroll screen. | | |
| 13 | Verify that Jane Bradford is listed as an employee | | Data |
| 14 | Select Bradford, Jane. | | |
| 15 | Select the View pull-down menu. | | |
| 16 | Select Detail from the pull-down menu. | | |
| 17 | Verify that Jane Bradford's salary is 1000 | | Data |
| 18 | Verify that Jane Bradford's Insurance choice is None. | | Data |
| 19 | Verify that Jane Bradford's Department choice is Sales. | | Data |
| 20 | Verify that Jane Bradford's Benefits choice is Basic Plan. | | Data |
| 21 | Return to the main payroll screen. | | |

| | | |
|---|---|---|
| Date | 31 MAR. 1999 | |
| Tester | Jake Swift | |
| Test Case ID | Add US - 1.1.1.8 | |
| Bus. Req. ID | Employee Processing | |
| System | Pentium 233 w/MMX, 128 MB RAM | |
| Function | Add Employees | |
| Version | Payroll 1.0, Payroll GUI 1.0b, Payroll Server 1.0b | |
| Environment | Windows NT 4.0 (Service Pack 4) | |
| Conditions | Name - Valid, Insurance - Self, Department - Admin, Benefits - Basic Plan | |
| Step # | Steps to Perform | Comment |
| 1 | Verify that the basic company employee data is loaded in the list view on the main payroll screen. | Data |
| 2 | Select the Employee pull-down menu. | |
| 3 | Select Add from the pull-down menu | |
| 4 | Enter Bradford, John in the Name field | Data - Valid condition |
| 5 | Enter 1000 for the Salary choice. | Data |
| 6 | Select the Self radio button for the Insurance choice. | Data - Self condition |
| 7 | Select Admin for the Department choice. | Data - Admin condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Bradford is listed as an employee | Data |
| 14 | Select Bradford, John. | |
| 15 | Select the View pull-down menu. | |

-continued

| 16 | Select Detail from the pull-down menu. | |
|---|---|---|
| 17 | Verify that John Bradford's salary is 1000 | Data |
| 18 | Verify that John Bradford's Insurance choice is Self. | Data |
| 19 | Verify that John Bradford's Department choice is Admin. | Data |
| 20 | Verify that John Bradford's Benefits choice is Basic Plan. | Data |
| 21 | Return to the main payroll screen. | |

| | | |
|---|---|---|
| Date | 31 MAR. 1999 | |
| Tester | Jake Swift | |
| Test Case ID | Add US - 1.1.1.9 | |
| Bus. Req. ID | Employee Processing | |
| System | Pentium 233 w/MMX, 128 MB RAM | |
| Function | Add Employees | |
| Version | Payroll 1.0, Payroll GUI 1.0b, Payroll Server 1.0b | |
| Environment | Windows NT 4.0 (Service Pack 4) | |
| Conditions | Name - Valid, Insurance - Self, Department - Finance, Benefits - Basic Plan | |
| Step # | Steps to Perform | Comment |
| 1 | Verify that the basic company employee data is loaded in the list view on the main payroll screen. | Data |
| 2 | Select the Employee pull-down menu. | |
| 3 | Select Add from the pull-down menu | |
| 4 | Enter Randall, Kate in the Name field | Data - Valid condition |
| 5 | Enter 1000 for the Salary choice. | Data |
| 6 | Select the Self radio button for the Insurance choice. | Data - Self condition |
| 7 | Select Finance for the Department choice. | Data - Finance condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Kate Randall is listed as an employee | Data |
| 14 | Select Randall, Kate. | |
| 15 | Select the View pull-down menu. | |
| 16 | Select Detail from the pull-down menu. | |
| 17 | Verify that Kate Randall's salary is 1000 | Data |
| 18 | Verify that Kate Randall's Insurance choice is Self. | Data |
| 19 | Verify that Kate Randall's Department choice is Finance. | Data |
| 20 | Verify that Kate Randall's Benefits choice is Basic Plan. | Data |
| 21 | Return to the main payroll screen. | |

| | |
|---|---|
| Date | 31 MAR. 1999 |
| Tester | Jake Swift |
| Test Case ID | Add US - 1.1.1.10 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Marketing, Benefits - Basic Plan |

-continued

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Randall, Robert in the Name field | Data - Valid condition |
| 5 | Enter 1000 for the Salary choice. | Data |
| 6 | Select the Self radio button for the Insurance choice. | Data - Self condition |
| 7 | Select Marketing for the Department choice. | Data - Marketing condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Robert Randall is listed as an employee | Data |
| 14 | Select Randall, Robert. | |
| 15 | Select the View pull-down menu. | |
| 16 | Select Detail from the pull-down menu. | |
| 17 | Verify that Robert Randall's salary is 1000 | Data |
| 18 | Verify that Robert Randall's Insurance choice is Self. | Data |
| 19 | Verify that Robert Randall's Department choice is Marketing. | Data |
| 20 | Verify that Robert Randall's Benefits choice is Basic Plan. | Data |
| 21 | Return to the main payroll screen. | |

EXAMPLE 4

Test Environment Description for Payroll

ABC HARDWARE, INC.

"YOUR NEIGHBORHOOD HARDWARE STORE"

Test Environment
Test Server Requirements
Quantity
  Single, dedicated server
Hardware Configuration

| Model | Compaq ProLiant 6500R or equivalent |
|---|---|
| Processor | Two Intel Pentium II processor, 450 MHz, 512 KB Cache |
| Memory | 256 MB SDRAM |
| Operating System | Windows NT 4.0 Server |
| Keyboard | Required - no preference |
| Monitor | Minimum 15" |
| Video Card | 4 MB PCI or AGP |
| Hard Drive | Two 4.0 GB (operating system) |
| Floppy Drive | 1.44 MB |
| Mouse | Required - no preference |
| Network Card | 3COM PCI 10/100 twisted pair Ethernet |
| CD ROM Drive | Required - no preference |

Software
  Payroll Version 1.0
  Payroll GUI (front end) version 1.0b
  Payroll server software (back end) version 1.0b
Database
  Microsoft SQL Server 6.5
Disk Space/Storage
  Database Size and Space Requirements (need to ensure that enough server space is being allocated for rollbacks, table sizing, backups, etc.)
  Five 9.0 G Hard Drives
  Hardware RAID compatible
Communication
  10MB Network Connection, minimum.
  TCP/IP protocol
Protection
  Uninterruptible Power Supply
Tape Backup
  DLT 35/70 (Digital Linear Tape)

ABC HARDWARE, INC.

"YOUR NEIGHBORHOOD HARDWARE STORE"

Test Client Workstation Requirements
Quantity
  5 Windows NT Users
  15 Windows 95 Users

| Processor | Intel Pentium II processor, 350 MHz, 512 KB Cache |
|---|---|
| Memory | 64 MB SDRAM |
| Operating System | Windows NT 4.0 or Windows 95 |
| Keyboard | Required - no preference |
| Monitor | Minimum 17" |
| Video Card | 8 MB AGP |
| Hard Drive | 8.0 GB or greater |
| Floppy Drive | 1.44 MB |
| Mouse | Required - no preference |
| Network Card | 10/100 twisted pair Ethernet |
| Modem | Minimum 56k v.90 3COM USR modem for remote access |
| CD ROM Drive | Required - no preference |
| Sound Card | Required - no preference |

Software
  Payroll version 1.0
  Microsoft Excel 8.0 or greater
  Microsoft Word 8.0 or greater
  Internet Explorer 4.0
Communications
  10MB Network Connections, minimum.
  TCP/IP protocol
Peripheral Requirements
  Printing Device: Laser Printer
Physical Access
  Servers located in a controlled-access environment.
  Access limited to systems support personnel.
Naming Convention
  Server(s): Unique computer name, with a test identifier, within its own domain, i.e., QPTEST
  Database(s): Systems and Acceptance Test Database: STAT

ABC HARDWARE, INC.

"YOUR NEIGHBORHOOD HARDWARE STORE"

General Environment Preparation Process
  The initial STAT database will be a copy of the 'vanilla' payroll application.

Before testing begins, approved changes from the development database will be migrated and duplicated within the STAT database. The systems administrator may perform either a selective upgrade or a full upgrade between the development database and the STAT database. A selective upgrade incorporates only those files, tables, etc. that have changed; a full upgrade is a complete copy of the development environment to the STAT environment.

Before each test cycle, a backup of STAT is taken.

The test team then executes the test cases per the schedule for that particular test cycle.

At the end of each testing cycles, a backup of STAT is taken.

Before each test cycle, a decision is made to restore from a backup or to reload the entire database.

Environment Preparation Procedures to be defined and documented:

Performing a selective upgrade between the source (i.e., development) and the target (i.e., STAT) database.

Performing a full upgrade between the source and the target database.

Access to the test database requires the test database name, a login identification number, and a password.

Each login identification number is unique.

The password must be alphanumeric, and contain 6–10 characters.

The STAT's systems administrator is responsible for setting up an employee's initial access to the system; however, the employee is responsible for changing their password and maintaining the confidentiality of their access information.

Audit and Traceability

Log access and system performance.

Hardware Protection Requirements

Both surge protectors and uninterruptible power supplies (UPS) are installed on the servers to manage power failures, fluctuations, surges, etc.

Security protections requiring both a login to the identification code and a password are required to access the servers, login to the STAT database, and login to the associated network. The site and systems administrators are responsible for setting up the accounts with the applicable access privileges.

AntiVirus software programs are setup to run at a time that minimizes the impact to the server's performance. If a virus is identified, both an e-mail and a page are sent to the systems administrator, notifying them of the virus.

Backup Processes

Identify and Document Backup Procedures

Initiate, complete, and validate a normal backup of the STAT Database

Initiate, complete, and validate an incremental backup of the STAT Database

Security

The systems administrator and an appointed backup have the access and control privileges required to backup the database as well as to restore the database.

Backup Method(s)

The following backups will be taken throughout test execution:

Normal: A backup of the entire system, to include all selected drives, directories, and files, regardless of whether or not they have been changed.

Incremental: Backup of only the files that have been created or changed since the last Normal or incremental backup.

Media Rotation Scheme

Incremental backups will be done for every day of the workweek except the last day. On the last day, a normal backup is done. On the last of the month, a disaster recover backup is done, but these media are kept offsite. The incremental backup media is reused each week. The normal backups are not reused until after completion of the implementation.

Backup Chart

Each time a backup is completed, the person making the backup must complete the information associated with the test environment's backup chart. The data that must be input includes the date, time and the contents of each backup media, who initiated the backup, and who verified that the backup was acceptable.

Location of Backup Media

Incremental backups are normal, weekly backups are kept in a secured area, within the project's computer lab; the systems administrator and their appointed backup have access to the backups.

Backups are stored away from magnetic fields and electronic devices such as video monitors, analog telephones, etc.

Remote Backup Administration

Backup processes can only be done onsite, at the location of the applications server.

Restoration Processes

Security

The systems administrator and an appointed backup have the access and control privileges required to initiate and a validate a restoration.

Restoration Procedures

Restoring data to its original location.

Identify Date State to be Restores

Select appropriate Media containing most recent backup of the requested Data State Restore the STAT database to the desired Data State Validate the restored Data State Notify Test Tam of valid Data State Restoration Archiving Process Security The systems administrator and an appointed backup have the access and control privileges required to initiate and validate any test data archive.

Identify and Document Restoration Procedure

Identify and document data archiving procedures

Identify and document how archives are verified.

EXAMPLE 5

Test Execution Schedule for Payroll

See FIGS. 8–20

EXAMPLE 6

Test Results for Payroll Test Cases

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.1 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Admin, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Doe, John in the Name field | Y | | | |
| 5 | Enter 1000 for the Salary choice. | Y | | | |
| 6 | Select the None radio button for the Insurance choice. | Y | | | |
| 7 | Select Admin for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John Doe is listed as an employee | Y | | | |
| 14 | Select Doe, John. | Y | | | |
| 15 | Select the View pull-down menu. | Y | | | |
| 16 | Select Detail from the pull-down menu. | Y | | | |
| 17 | Verify that John Doe's salary is 1000 | Y | | | |
| 18 | Verify that John Doe's Insurance choice is None. | Y | | | |
| 19 | Verify that John Doe's Department choice is Admin. | Y | | | |
| 20 | Verify that John Doe's Benefits choice is None. | Y | | | |
| 21 | Return to the main payroll screen. | Y | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.2 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Finance, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Doe, Jane in the Name field | Y | | | |
| 5 | Enter 1000 for the Salary choice. | Y | | | |
| 6 | Select the None radio button for the Insurance choice. | Y | | | |
| 7 | Select Finance for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane Doe is listed as an employee | Y | | | |
| 14 | Select Doe, Jane. | Y | | | |
| 15 | Select the View pull-down menu. | Y | | | |
| 16 | Select Detail from the pull-down menu. | Y | | | |
| 17 | Verify that Jane Doe's salary is 1000 | Y | | | |
| 18 | Verify that Jane Doe's Insurance choice is None. | Y | | | |
| 19 | Verify that Jane Doe's Department choice is Finance. | Y | | | |
| 20 | Verify that Jane Doe's Benefits choice is None. | Y | | | |
| 21 | Return to the main payroll screen. | Y | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.3 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Marketing, Benefits - None |

-continued

| Step # | Steps to Perform | Valid | Test error | Con- text | Soft- ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter DeBord, Jane in the Name field | Y | | | |
| 5 | Enter 1000 for the Salary choice. | Y | | | |
| 6 | Select the None radio button for the Insurance choice. | Y | | | |
| 7 | Select Marketing for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane DeBord is listed as an employee | Y | | | |
| 14 | Select DeBord, Jane. | Y | | | |
| 15 | Select the View pull-down menu. | Y | | | |
| 16 | Select Detail from the pull-down menu. | Y | | | |
| 17 | Verify that Jane DeBord's salary is 1000 | Y | | | |
| 18 | Verify that Jane DeBord's Insurance choice is None. | Y | | | |
| 19 | Verify that Jane DeBord's Department choice is Marketing. | Y | | | |
| 20 | Verify that Jane DeBord's Benefits choice is None. | Y | | | |
| 21 | Return to the main payroll screen. | Y | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.4 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - QA, Benefits - None |

| Step # | Steps to Perform | Valid | Test error | Con- text | Soft- ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter DeBord, John in the Name field | Y | | | |
| 5 | Enter 1000 for the Salary choice. | Y | | | |
| 6 | Select the None radio button for the Insurance choice. | Y | | | |
| 7 | Select QA for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John DeBord is listed as an employee | Y | | | |
| 14 | Select DeBord, John. | Y | | | |
| 15 | Select the View pull-down menu. | Y | | | |
| 16 | Select Detail from the pull-down menu. | Y | | | |
| 17 | Verify that John DeBord's salary is 1000 | Y | | | |
| 18 | Verify that John DeBord's Insurance choice is None. | Y | | | |
| 19 | Verify that John DeBord's Department choice is QA. | Y | | | |
| 20 | Verify that John DeBord's Benefits choice is None. | Y | | | |
| 21 | Return to the main payroll screen. | Y | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.5 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - R&D, Benefits - None |

| Step # | Steps to Perform | Valid | Test error | Con- text | Soft- ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |

-continued

| | | |
|---|---|---|
| 4 | Enter Botz, John in the Name field | Y |
| 5 | Enter 1000 for the Salary choice. | Y |
| 6 | Select the None radio button for the Insurance choice. | Y |
| 7 | Select R&D for the Department choice. | Y |
| 8 | Select None for the Benefits choice. | Y |
| 9 | Select OK to Add the employee. | Y |
| 10 | Close the Payroll application. | Y |
| 11 | Reopen the Payroll application | Y |
| 12 | Verify that the basic company employee data is loaded in the list view on the main payroll screen. | Y |
| 13 | Verify that John Botz is listed as an employee | Y |
| 14 | Select Botz, John. | Y |
| 15 | Select the View pull-down menu. | Y |
| 16 | Select Detail from the pull-down menu. | Y |
| 17 | Verify that John Botz's salary is 1000 | Y |
| 18 | Verify that John Botz's Insurance choice is None. | Y |
| 19 | Verify that John Botz's Department choice is R&D. | Y |
| 20 | Verify that John Botz's Benefits choice is None. | Y |
| 21 | Return to the main payroll screen. | Y |

Summary:
Are the test case results Valid?    Yes/No
If not,
    Is there a Test Case Error?    Yes/No
    Is there a Test Execution Context Error?    Yes/No
    Is there a Software (AUT) Error:    Yes/No
        If yes,
            Has the defect been logged?    Yes/No
            Has the Test Case be flagged for re-execution?    Yes/No
            Has the Test Manager been notified?    Yes/No
Have the Metrics been logged?    Yes/No

| | | |
|---|---|---|
| Date | Execution Date | Test Run # |
| 31 MAR. 1999 | 08 JUN. 1999 | 5 |

| | |
|---|---|
| Tester | Jake Swift |
| Test Case ID | Add US - 1.1.1.6 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Botz, Jane in the Name field | Y | | | |
| 5 | Enter 1000 for the Salary choice. | Y | | | |
| 6 | Select the None radio button for the Insurance choice. | Y | | | |
| 7 | Select Sales for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane Botz is listed as an employee | Y | | | |
| 14 | Select Botz, Jane. | Y | | | |
| 15 | Select the View pull-down menu. | Y | | | |
| 16 | Select Detail from the pull-down menu. | Y | | | |
| 17 | Verify that Jane Botz's salary is 1000 | Y | | | |
| 18 | Verify that Jane Botz's Insurance choice is None. | Y | | | |
| 19 | Verify that Jane Botz's Department choice is Sales. | Y | | | |
| 20 | Verify that Jane Botz's Benefits choice is None. | Y | | | |
| 21 | Return to the main payroll screen. | Y | | | |

Summary:
Are the test case results Valid?    Yes/No
If not,
    Is there a Test Case Error?    Yes/No
    Is there a Test Execution Context Error?    Yes/No
    Is there a Software (AUT) Error:    Yes/No
        If yes,
            Has the defect been logged?    Yes/No
            Has the Test Case be flagged for re-execution?    Yes/No
            Has the Test Manager been notified?    Yes/No
Have the Metrics been logged?    Yes/No

| | | |
|---|---|---|
| Date | Execution Date | Test Run # |
| 31 MAR. 1999 | 08 JUN. 1999 | 5 |

| | |
|---|---|
| Tester | Jake Swift |
| Test Case ID | Add US - 1.1.1.7 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - Basic Plan |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Bradford, Jane in the Name field | Y | | | |
| 5 | Enter 1000 for the Salary choice. | Y | | | |
| 6 | Select the None radio button for the Insurance choice. | Y | | | |
| 7 | Select Sales for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |

-continued

| | | | | Test error | Context | Software Error |
|---|---|---|---|---|---|---|
| 12 | Verify that the basic company employee data is loaded in the list view on the main payroll screen. | Y | | | | |
| 13 | Verify that Bradford, Jane is listed as an employee | Y | | | | |
| 14 | Select Bradford, Jane. | Y | | | | |
| 15 | Select the View pull-down menu. | Y | | | | |
| 16 | Select Detail from the pull-down menu. | Y | | | | |
| 17 | Verify that Jane Bradford's salary is 1000 | Y | | | | |
| 18 | Verify that Jane Bradford's Insurance choice is None. | Y | | | | |
| 19 | Verify that Jane Bradford's Department choice is Sales. | Y | | | | |
| 20 | Verify that Jane Bradford's Benefits choice is Basic Plan. | Y | | | | |
| 21 | Return to the main payroll screen. | Y | | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | Execution Date | Test Run # |
|---|---|---|
| 31 MAR. 1999 | 08 JUN. 1999 | 5 |

| | |
|---|---|
| Tester | Jake Swift |
| Test Case ID | Add US - 1.1.1.8 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Admin, Benefits - Basic Plan |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Bradford, John in the Name field | Y | | | |
| 5 | Enter 1000 for the Salary choice. | Y | | | |
| 6 | Select the Self radio button for the Insurance choice. | Y | | | |
| 7 | Select Admin for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John Bradford is listed as an employee | Y | | | |
| 14 | Select Bradford, John. | Y | | | |
| 15 | Select the View pull-down menu. | Y | | | |
| 16 | Select Detail from the pull-down menu. | Y | | | |
| 17 | Verify that John Bradford's salary is 1000 | Y | | | |
| 18 | Verify that John Bradford's Insurance choice is Self. | Y | | | |
| 19 | Verify that John Bradford's Department choice is Admin. | Y | | | |
| 20 | Verify that John Bradford's Benefits choice is Basic Plan. | Y | | | |
| 21 | Return to the main payroll screen. | Y | | | |

Summary:
Are the test case results Valid? Yes/No
If not,
    Is there a Test Case Error? Yes/No
    Is there a Test Execution Context Error? Yes/No
    Is there a Software (AUT) Error: Yes/No
        If yes,
            Has the defect been logged? Yes/No
            Has the Test Case be flagged for re-execution? Yes/No
            Has the Test Manager been notified? Yes/No
Have the Metrics been logged? Yes/No

| Date | 31 MAR 99 | Execution Date | 08 JUN 99 | Test Run # | 5 |
|---|---|---|---|---|---|

| | |
|---|---|
| Tester | Jake Swift |
| Test Case ID | Add US - 1.1.1.9 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Finance, Benefits - Basic Plan |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Randall, Kate in the Name field | Y | | | |
| 5 | Enter 1000 for the Salary choice. | Y | | | |
| 6 | Select the Self radio button for the Insurance choice. | Y | | | |
| 7 | Select Finance for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Kate Randall is listed as an employee | Y | | | |
| 14 | Select Randall, Kate. | Y | | | |
| 15 | Select the View pull-down menu. | Y | | | |

-continued

| | | | |
|---|---|---|---|
| 16 | Select Detail from the pull-down menu. | Y | |
| 17 | Verify that Kate Randall's salary is 1000 | Y | |
| 18 | Verify that Kate Randall's Insurance choice is Self. | Y | |
| 19 | Verify that Kate Randall's Department choice is Finance. | Y | |
| 20 | Verify that Kate Randall's Benefits choice is Basic Plan. | Y | |
| 21 | Return to the main payroll screen. | Y | |

Summary:

| | |
|---|---|
| Are the test case results Valid? If not, | Yes/No |
| Is there a Test Case Error? | Yes/No |
| Is there a Test Execution Context Error? | Yes/No |
| Is there a Software (AUT) Error: If yes, | Yes/No |
| Has the defect been logged? | Yes/No |
| Has the Test Case be flagged for re-execution? | Yes/No |
| Has the Test Manager been notified? | Yes/No |
| Have the Metrics been logged? | Yes/No |

| | | | |
|---|---|---|---|
| Date | 31 MAR 99 | Execution Date | 08 JUN 99 Test Run # 5 |
| Tester | Jake Swift | | |
| Test Case ID | Add US-1.1.1.10 | | |
| Bus. Req. ID | Employee Processing | | |
| System | Pentium 233 w/MMX, 128 MB RAM | | |
| Function | Add Employees | | |
| Version | Payroll 1.0, Payroll GUI 1.0b, Payroll Server 1.0b | | |
| Environment Conditions | Windows NT 4.0 (Service Pack 4) Name - Valid, Insurance - Self, Department - Marketing, Benefits - Basic Plan | | |

| Step # | Steps to Perform | Valid | Test error | Con-text | Soft-ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Randall, Robert in the Name field | Y | | | |
| 5 | Enter 1000 for the Salary choice. | Y | | | |
| 6 | Select the Self radio button for the Insurance choice. | Y | | | |
| 7 | Select Marketing for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Robert Randall is listed as an employee | Y | | | |
| 14 | Select Randall, Robert. | Y | | | |
| 15 | Select the View pull-down menu. | Y | | | |
| 16 | Select Detail from the pull-down menu. | Y | | | |
| 17 | Verify that Robert Randall's salary is 1000 | Y | | | |

-continued

| | | | |
|---|---|---|---|
| 18 | Verify that Robert Randall's Insurance choice is Self. | Y | |
| 19 | Verify that Robert Randall's Department choice is Marketing. | Y | |
| 20 | Verify that Robert Randall's Benefits choice is Basic Plan. | Y | |
| 21 | Return to the main payroll screen. | Y | |

Summary:

| | |
|---|---|
| Are the test case results Valid? If not, | Yes/No |
| Is there a Test Case Error? | Yes/No |
| Is there a Test Execution Context Error? | Yes/No |
| Is there a Software (AUT) Error: If yes, | Yes/No |
| Has the defect been logged? | Yes/No |
| Has the Test Case be flagged for re-execution? | Yes/No |
| Has the Test Manager been notified? | Yes/No |
| Have the Metrics been logged? | Yes/No |

EXAMPLE 7

Summarized Metrics from Payroll Execution

| Test Case ID | Test Run 1 | Test Run 2 | Test Run 3 | Test Run 4 | Test Run 5 |
|---|---|---|---|---|---|
| Add US - 1.1.1.7 | Fail | Fail | Fail | Pass | Pass |
| Add Non-US - 1.1.2.7 | Fail | Pass | Pass | Pass | Pass |
| Find Employee 1.2.2.1 | Fail | Pass | Pass | Pass | Pass |
| Find Employee 1.2.1.2 | Fail | Pass | Pass | Pass | Pass |
| Del. All Employees 1.4.2.1 | Pass | Pass | Pass | Pass | Pass |
| Add US - 1.1.1.3 | Fail | Pass | Pass | Pass | Pass |
| Add US - 1.1.1.4 | Fail | Pass | Pass | Fail | Fail |
| Add US - 1.1.1.5 | Fail | Pass | Pass | Pass | Pass |
| Add US - 1.1.1.10 | Fail | Pass | Pass | Pass | Pass |
| Add US - 1.1.1.11 | Fail | Pass | Pass | Pass | Pass |
| Add US - 1.1.1.12 | Fail | Pass | Pass | Pass | Pass |
| Add US - 1.1.1.16 | Fail | Pass | Pass | Pass | Pass |
| Add US - 1.1.1.17 | Fail | Pass | Pass | Pass | Pass |
| Add US - 1.1.1.18 | Fail | Pass | Pass | Pass | Pass |
| Add US - 1.1.1.22 | Fail | Pass | Pass | Pass | Pass |
| Add US - 1.1.1.23 | Fail | Pass | Pass | Pass | Pass |
| Add US - 1.1.1.24 | Fail | Pass | Pass | Pass | Pass |
| Add US - 1.1.1.28 | Fail | Pass | Pass | Pass | Pass |
| Add US - 1.1.1.29 | Fail | Pass | Pass | Pass | Pass |
| Add US - 1.1.1.30 | Fail | Pass | Pass | Pass | Pass |
| Add US - 1.1.1.34 | Fail | Pass | Pass | Pass | Pass |
| Add US - 1.1.1.35 | Fail | Pass | Pass | Pass | Pass |
| Add US - 1.1.1.36 | Fail | Pass | Pass | Pass | Pass |
| Add US - 1.1.1.40 | Fail | Pass | Pass | Pass | Pass |
| Add US - 1.1.1.41 | Fail | Pass | Pass | Pass | Pass |
| Add US - 1.1.1.42 | Fail | Pass | Pass | Pass | Pass |
| Add US - 1.1.1.46 | Fail | Pass | Pass | Pass | Pass |
| Add US - 1.1.1.47 | Fail | Pass | Pass | Pass | Pass |
| Add US - 1.1.1.48 | Fail | Pass | Pass | Pass | Pass |
| Add US - 1.1.1.52 | Fail | Pass | Pass | Pass | Pass |
| Add US - 1.1.1.53 | Fail | Pass | Pass | Pass | Pass |
| Add US - 1.1.1.54 | Fail | Pass | Pass | Pass | Pass |
| Add US - 1.1.1.58 | Fail | Pass | Pass | Pass | Pass |
| Add US - 1.1.1.59 | Fail | Pass | Pass | Pass | Pass |
| Add US - 1.1.1.60 | Fail | Pass | Pass | Pass | Pass |
| Add US - 1.1.1.64 | Fail | Pass | Pass | Pass | Pass |
| Add US - 1.1.1.65 | Fail | Pass | Pass | Pass | Pass |
| Add US - 1.1.1.66 | Fail | Pass | Pass | Pass | Pass |
| Add US - 1.1.1.70 | Fail | Pass | Pass | Pass | Pass |
| Add US - 1.1.1.71 | Fail | Pass | Pass | Pass | Pass |
| Add US - 1.1.1.72 | Fail | Pass | Pass | Pass | Pass |
| Add US - 1.1.1.76 | Fail | Pass | Pass | Pass | Pass |

-continued

| Test Case ID | Test Run 1 | Test Run 2 | Test Run 3 | Test Run 4 | Test Run 5 |
|---|---|---|---|---|---|
| Add US - 1.1.1.77 | Fail | Pass | Pass | Pass | Pass |
| Add US - 1.1.1.78 | Fail | Pass | Pass | Pass | Pass |
| Add US - 1.1.1.82 | Fail | Pass | Pass | Pass | Pass |
| Add US - 1.1.1.83 | Fail | Pass | Pass | Pass | Pass |
| Add US - 1.1.1.84 | Fail | Pass | Pass | Pass | Pass |
| Add US - 1.1.1.88 | Fail | Pass | Pass | Pass | Pass |
| Add US - 1.1.1.89 | Fail | Pass | Pass | Pass | Pass |
| Add US - 1.1.1.90 | Fail | Pass | Pass | Pass | Pass |
| Add US - 1.1.1.94 | N/A | Pass | Pass | Pass | Pass |
| Add US - 1.1.1.95 | N/A | Pass | Pass | Pass | Pass |
| Add US - 1.1.1.96 | N/A | Pass | Pass | Pass | Pass |
| Add US - 1.1.1.100 | N/A | Pass | Pass | Pass | Pass |
| Add US - 1.1.1.101 | N/A | Pass | Pass | Pass | Pass |
| Add US - 1.1.1.102 | N/A | Pass | Pass | Pass | Pass |
| Add Non-US - 1.1.2.3 | N/A | Fail | Pass | Fail | Pass |
| Add Non-US - 1.1.2.4 | N/A | Fail | Fail | Fail | Fail |
| Add Non-US - 1.1.2.5 | N/A | Fail | Pass | Fail | Pass |
| Add Non-US - 1.1.2.10 | N/A | Fail | Fail | Pass | Fail |
| Add Non-US - 1.1.2.11 | N/A | Fail | Fail | Fail | Pass |
| Add Non-US - 1.1.2.12 | N/A | Fail | Pass | Pass | Pass |
| Add Non-US - 1.1.2.16 | N/A | Pass | Pass | Pass | Pass |
| Add Non-US - 1.1.2.17 | N/A | Pass | Pass | Pass | Pass |
| Add Non-US - 1.1.2.18 | N/A | Pass | Pass | Pass | Pass |
| Add Non-US - 1.1.2.22 | N/A | Pass | Pass | Pass | Pass |
| Add Non-US - 1.1.2.23 | N/A | Fail | Pass | Fail | Pass |
| Add Non-US - 1.1.2.24 | N/A | Pass | Pass | Pass | Pass |
| Add Non-US - 1.1.2.28 | N/A | Pass | Pass | Pass | Pass |
| Add Non-US - 1.1.2.29 | N/A | Pass | Pass | Pass | Pass |
| Add Non-US - 1.1.2.30 | N/A | Pass | Pass | Pass | Pass |
| Add Non-US - 1.1.2.34 | N/A | Pass | Pass | Pass | Pass |
| Add Non-US - 1.1.2.35 | N/A | Pass | Pass | Pass | Pass |
| Add Non-US - 1.1.2.36 | N/A | Pass | Pass | Pass | Pass |
| Add Non-US - 1.1.2.40 | N/A | Pass | Pass | Pass | Pass |
| Add Non-US - 1.1.2.41 | N/A | Pass | Pass | Pass | Pass |
| Add Non-US - 1.1.2.42 | N/A | Pass | Pass | Pass | Pass |
| Add Non-US - 1.1.2.46 | N/A | Pass | Pass | Pass | Pass |
| Add Non-US - 1.1.2.47 | N/A | Pass | Pass | Pass | Pass |
| Add Non-US - 1.1.2.48 | N/A | Pass | Pass | Pass | Pass |
| Add Non-US - 1.1.2.52 | N/A | Pass | Pass | Pass | Pass |
| Add Non-US - 1.1.2.53 | N/A | Pass | Pass | Pass | Pass |
| Add Non-US - 1.1.2.54 | N/A | Fail | Pass | Fail | Fail |
| Add Non-US - 1.1.2.58 | N/A | Fail | Pass | Pass | Pass |
| Add Non-US - 1.1.2.59 | N/A | Fail | Pass | Pass | Pass |
| Add Non-US - 1.1.2.60 | N/A | Fail | Pass | Pass | Pass |
| Add Non-US - 1.1.2.64 | N/A | Fail | Pass | Pass | Pass |
| Add Non-US - 1.1.2.65 | N/A | Fail | Pass | Pass | Pass |
| Add Non-US - 1.1.2.66 | N/A | Fail | Pass | Pass | Pass |
| Add Non-US - 1.1.2.70 | N/A | Fail | Pass | Pass | Pass |
| Add Non-US - 1.1.2.71 | N/A | Fail | Pass | Fail | Pass |
| Add Non-US - 1.1.2.72 | N/A | Fail | Pass | Fail | Pass |
| Add Non-US - 1.1.2.76 | N/A | Fail | Fail | Fail | Pass |
| Add Non-US - 1.1.2.77 | N/A | Fail | Pass | Pass | Pass |
| Add Non-US - 1.1.2.78 | N/A | Fail | Fail | Pass | Pass |
| Add Non-US - 1.1.2.82 | N/A | Fail | Fail | Fail | Fail |
| Add Non-US - 1.1.2.83 | N/A | Fail | Fail | Fail | Fail |
| Add Non-US - 1.1.2.84 | N/A | Pass | Pass | Pass | Pass |
| Add Non-US - 1.1.2.88 | N/A | Fail | Fail | Fail | Fail |
| Add Non-US - 1.1.2.89 | N/A | Fail | Fail | Fail | Fail |
| Add Non-US - 1.1.2.90 | N/A | Fail | Fail | Fail | Fail |
| Add Non-US - 1.1.2.94 | N/A | Pass | Pass | Pass | Pass |
| Add Non-US - 1.1.2.95 | N/A | Pass | Pass | Pass | Pass |
| Add Non-US - 1.1.2.96 | N/A | Pass | Pass | Pass | Pass |
| Add Non-US - 1.1.2.100 | N/A | Pass | Pass | Pass | Pass |
| Add Non-US - 1.1.2.101 | N/A | Pass | Pass | Pass | Pass |
| Add Non-US - 1.1.2.102 | N/A | Pass | Pass | Pass | Pass |
| Find Employee 1.2.2.2 | N/A | Fail | Pass | Pass | Pass |
| Update US 1.3.1.1 | N/A | Fail | Pass | Pass | Fail |
| Update Non-US 1.3.2.1 | N/A | Fail | Pass | Pass | Pass |
| Add US - 1.1.1.2 | N/A | Pass | Pass | Pass | Pass |
| Add US - 1.1.1.6 | N/A | Pass | Pass | Pass | Pass |
| Add US - 1.1.1.9 | N/A | Pass | Pass | Pass | Pass |
| Add US - 1.1.1.13 | N/A | Pass | Pass | Pass | Pass |
| Add US - 1.1.1.15 | N/A | Pass | Pass | Pass | Pass |
| Add US - 1.1.1.19 | N/A | Pass | Pass | Pass | Pass |
| Add US - 1.1.1.21 | N/A | Pass | Pass | Pass | Pass |
| Add US - 1.1.1.25 | N/A | Pass | Pass | Pass | Pass |
| Add US - 1.1.1.27 | N/A | Pass | Pass | Pass | Pass |
| Add US - 1.1.1.31 | N/A | Pass | Pass | Pass | Pass |
| Add US - 1.1.1.33 | N/A | Pass | Pass | Pass | Pass |
| Add US - 1.1.1.37 | N/A | Pass | Pass | Pass | Pass |
| Add US - 1.1.1.39 | N/A | Pass | Pass | Pass | Pass |
| Add US - 1.1.1.43 | N/A | Pass | Pass | Pass | Pass |
| Add US - 1.1.1.45 | N/A | Pass | Pass | Pass | Pass |
| Add US - 1.1.1.49 | N/A | Pass | Pass | Pass | Pass |
| Add US - 1.1.1.51 | N/A | Pass | Pass | Pass | Pass |
| Add US - 1.1.1.55 | N/A | Pass | Pass | Pass | Pass |
| Add US - 1.1.1.57 | N/A | Pass | Pass | Pass | Pass |
| Add US - 1.1.1.61 | N/A | Pass | Pass | Pass | Pass |
| Add US - 1.1.1.63 | N/A | Pass | Pass | Pass | Pass |
| Add US - 1.1.1.67 | N/A | Pass | Pass | Pass | Pass |
| Add US - 1.1.1.69 | N/A | Pass | Pass | Pass | Pass |
| Add US - 1.1.1.73 | N/A | Pass | Pass | Pass | Pass |
| Add US - 1.1.1.75 | N/A | Pass | Pass | Pass | Pass |
| Add US - 1.1.1.79 | N/A | Pass | Pass | Pass | Pass |
| Add US - 1.1.1.81 | N/A | Pass | Pass | Pass | Pass |
| Add US - 1.1.1.85 | N/A | Pass | Pass | Pass | Pass |
| Add US - 1.1.1.87 | N/A | Pass | Pass | Pass | Pass |
| Add US - 1.1.1.91 | N/A | Pass | Pass | Pass | Pass |
| Add US - 1.1.1.93 | N/A | Pass | Pass | Pass | Pass |
| Add US - 1.1.1.97 | N/A | Pass | Pass | Pass | Pass |
| Add US - 1.1.1.99 | N/A | Pass | Pass | Pass | Pass |
| Add US - 1.1.1.103 | N/A | Pass | Pass | Pass | Pass |
| Add US - 1.1.1.105 | N/A | Pass | Pass | Pass | Pass |
| Add Non-US - 1.1.2.2 | N/A | Fail | Fail | Fail | Fail |
| Add Non-US - 1.1.2.6 | N/A | Fail | Fail | Fail | Fail |
| Add Non-US - 1.1.2.9 | N/A | Fail | Fail | Fail | Pass |
| Add Non-US - 1.1.2.13 | N/A | Fail | Fail | Fail | Pass |
| Add Non-US - 1.1.2.15 | N/A | Fail | Fail | Pass | Pass |
| Add Non-US - 1.1.2.19 | N/A | Fail | Fail | Pass | Pass |
| Add Non-US - 1.1.2.21 | N/A | Fail | Fail | Pass | Pass |
| Add Non-US - 1.1.2.25 | N/A | Fail | Fail | Pass | Pass |
| Add Non-US - 1.1.2.27 | N/A | Fail | Pass | Pass | Pass |
| Add Non-US - 1.1.2.31 | N/A | Fail | Pass | Pass | Pass |
| Add Non-US - 1.1.2.33 | N/A | Fail | Pass | Pass | Pass |
| Add Non-US - 1.1.2.37 | N/A | Fail | Pass | Pass | Pass |
| Add Non-US - 1.1.2.39 | N/A | Fail | Pass | Pass | Pass |
| Add Non-US - 1.1.2.43 | N/A | Fail | Pass | Pass | Pass |
| Add Non-US - 1.1.2.45 | N/A | Fail | Pass | Pass | Pass |
| Add Non-US - 1.1.2.49 | N/A | Fail | Pass | Pass | Pass |
| Add Non-US - 1.1.2.51 | N/A | Fail | Pass | Pass | Pass |
| Add Non-US - 1.1.2.55 | N/A | Fail | Pass | Pass | Pass |
| Add Non-US - 1.1.2.57 | N/A | Fail | Pass | Pass | Pass |
| Add Non-US - 1.1.2.61 | N/A | Fail | Pass | Pass | Pass |
| Add Non-US - 1.1.2.63 | N/A | Fail | Pass | Pass | Pass |
| Add Non-US - 1.1.2.67 | N/A | Fail | Pass | Pass | Pass |
| Add Non-US - 1.1.2.69 | N/A | Fail | Pass | Pass | Pass |
| Add Non-US - 1.1.2.73 | N/A | Fail | Pass | Pass | Pass |
| Add Non-US - 1.1.2.75 | N/A | Fail | Pass | Pass | Pass |
| Add Non-US - 1.1.2.79 | N/A | Fail | Pass | Pass | Pass |
| Add Non-US - 1.1.2.81 | N/A | Fail | Pass | Pass | Pass |
| Add Non-US - 1.1.2.85 | N/A | Fail | Pass | Pass | Pass |
| Add Non-US - 1.1.2.87 | N/A | Fail | Pass | Pass | Pass |
| Add Non-US - 1.1.2.91 | N/A | Fail | Pass | Pass | Pass |
| Add Non-US - 1.1.2.93 | N/A | Fail | Pass | Pass | Pass |
| Add Non-US - 1.1.2.97 | N/A | Fail | Pass | Pass | Pass |
| Add Non-US - 1.1.2.99 | N/A | Fail | Pass | Pass | Pass |
| Add Non-US - 1.1.2.103 | N/A | Fail | Pass | Pass | Pass |
| Add Non-US - 1.1.2.105 | N/A | Fail | Fail | Pass | Pass |
| Update US 1.3.1.4 | N/A | Fail | Fail | Fail | Pass |
| Update Non-US 1.3.2.4 | N/A | Fail | Fail | Fail | Fail |
| Del Single US 1.4.1.1 | N/A | Pass | Pass | Fail | Pass |
| Del Single Non-US 1.4.1.2 | N/A | Pass | Pass | Fail | Fail |
| Find Employee 1.2.1.1 | N/A | Fail | Fail | Pass | Pass |
| Update US 1.3.1.2 | N/A | Pass | Pass | Pass | Pass |
| Update US 1.3.1.3 | N/A | Pass | Pass | Pass | Pass |
| Update Non-US 1.3.2.2 | N/A | Fail | Fail | Fail | Pass |
| Update Non-US 1.3.2.3 | N/A | Fail | Fail | Pass | Pass |
| Add US - 1.1.1.1 | N/A | Pass | Pass | Pass | Pass |
| Add US - 1.1.1.8 | N/A | Pass | Pass | Pass | Pass |
| Add US - 1.1.1.14 | N/A | Pass | Pass | Pass | Pass |

-continued

| Test Case ID | Test Run 1 | Test Run 2 | Test Run 3 | Test Run 4 | Test Run 5 |
|---|---|---|---|---|---|
| Add US - 1.1.1.20 | N/A | Pass | Pass | Pass | Pass |
| Add US - 1.1.1.26 | N/A | Pass | Pass | Pass | Pass |
| Add US - 1.1.1.32 | N/A | Pass | Pass | Pass | Pass |
| Add US - 1.1.1.38 | N/A | Pass | Pass | Pass | Pass |
| Add US - 1.1.1.44 | N/A | Pass | Pass | Pass | Pass |
| Add US - 1.1.1.50 | N/A | Pass | Pass | Pass | Pass |
| Add US - 1.1.1.56 | N/A | Pass | Pass | Pass | Pass |
| Add US - 1.1.1.62 | N/A | Pass | Pass | Pass | Pass |
| Add US - 1.1.1.68 | N/A | Pass | Pass | Pass | Pass |
| Add US - 1.1.1.74 | N/A | Pass | Pass | Pass | Pass |
| Add US - 1.1.1.80 | N/A | Pass | Pass | Pass | Pass |
| Add US - 1.1.1.86 | N/A | Pass | Pass | Pass | Pass |
| Add US - 1.1.1.92 | N/A | Pass | Pass | Pass | Pass |
| Add US - 1.1.1.98 | N/A | Pass | Pass | Pass | Pass |
| Add US - 1.1.1.104 | N/A | Pass | Pass | Pass | Pass |
| Add Non-US - 1.1.2.1 | N/A | Pass | Pass | Pass | Pass |
| Add Non-US - 1.1.2.8 | N/A | Pass | Pass | Pass | Pass |
| Add Non-US - 1.1.2.14 | N/A | Pass | Pass | Pass | Pass |
| Add Non-US - 1.1.2.20 | N/A | Pass | Pass | Pass | Pass |
| Add Non-US - 1.1.2.26 | N/A | Pass | Pass | Pass | Pass |
| Add Non-US - 1.1.2.32 | N/A | Pass | Pass | Pass | Pass |
| Add Non-US - 1.1.2.38 | N/A | Pass | Pass | Pass | Pass |
| Add Non-US - 1.1.2.44 | N/A | Pass | Pass | Pass | Pass |
| Add Non-US - 1.1.2.50 | N/A | Pass | Pass | Pass | Pass |
| Add Non-US - 1.1.2.56 | N/A | Pass | Pass | Pass | Pass |
| Add Non-US - 1.1.2.62 | N/A | Pass | Pass | Pass | Pass |
| Add Non-US - 1.1.2.68 | N/A | Pass | Pass | Pass | Pass |
| Add Non-US - 1.1.2.74 | N/A | Pass | Pass | Pass | Pass |
| Add Non-US - 1.1.2.80 | N/A | Pass | Pass | Pass | Pass |
| Add Non-US - 1.1.2.86 | N/A | Pass | Pass | Pass | Pass |
| Add Non-US - 1.1.2.92 | N/A | Pass | Pass | Pass | Pass |
| Add Non-US - 1.1.2.98 | N/A | Pass | Pass | Pass | Pass |
| Add Non-US - 1.1.2.104 | N/A | Pass | Pass | Pass | Pass |
| Update US 1.3.1.5 | N/A | Fail | Pass | Pass | Pass |
| Update US 1.3.1.6 | N/A | Pass | Fail | Fail | Pass |
| Update Non-US 1.3.2.5 | N/A | Fail | Fail | Pass | Pass |
| Update Non-US 1.3.2.6 | N/A | Fail | Pass | Pass | Pass |
| Update US 1.3.1.7 | N/A | Fail | Fail | Pass | Fail |
| Update Non-US 1.3.2.7 | N/A | Fail | Fail | Fail | Pass |
| Test Exection Statisics | | | | | |
| Number of Test Cases Passed | 1 | 157 | 203 | 206 | 216 |
| Number of Test Cases Failed | 49 | 74 | 28 | 25 | 15 |
| Number of Business Reqs Covered | 1 | 1 | 1 | 1 | 1 |
| Number of Test Cases Executed | 50 | 231 | 231 | 231 | 231 |

EXAMPLE 8

Application Readiness Report for Payroll Project

APPLICATION READINESS REPORT

ABC HARDWARE—PAYROLL 1.0 PROJECT

TABLE OF CONTENTS

EXECUTIVE SUMMARY 2
TEST COVERAGE MEASUREMENT 2
ERROR DISCOVERY RATE MEASUREMENT 3
TESTING ACTIVITY MEASUREMENT 3
SUCCESS STATUS MEASUREMENT 3
SPECIFIC RISK MEASUREMENT 3
OTHER TEST MEASUREMENTS 4
PROJECT SUMMARY 4
  COSTS 4
  OUTSTANDING ISSUES 4
  RISKS 4
CONCLUSION 4

APPLICATION READINESS REPORT

ABC HARDWARE—PAYROLL 1.0 PROJECT

Executive Summary

This report will summarize the testing activities that have taken place over the last 13 months on the Payroll Project. The basis for our go/no go recommendation can be substantiated by the data contained within this report and its supporting documents.

It is the recommendation of the test team that the Payroll application NOT be released into production at this time. We are further recommending that the release date be pushed back a minimum of two months.

The primary reason for this decision is the lack of test coverage. Only one of the six business requirements has been fully tested. Current testing is on budget and needs to continue through the remaining business requirements before we will have a full understanding as to whether or not the application is ready for production.

Test Coverage Measurement

This measurement shows how many of the business requirements that were represented in the test plan have actually been tested to this date.

There were a total of six business requirements identified. Of those six, only one has been fully tested. This represents only a 16.6% test coverage measurement. The following chart graphically shows this information:

| | Tested | |
|---|---|---|
| Test Requirements | Yes | No |
| Business | | |
| Employee Processing | X | |
| Payroll Calculation | | X |
| Payroll Disbursement | | X |
| Payroll Reporting | | X |
| Technical | | |
| Graphical User Interface | | X |
| System Performance | | X |
| Total Test Coverage | 16.6% | 83.4% |

One of the acceptance criteria for the test effort was 100% Business Requirement Coverage. As you can tell from the chart, only 16.6% of the business requirements were tested; therefore, an acceptance criterion was not met in this area.

APPLICATION READINESS REPORT

ABC HARDWARE—PAYROLL 1.0 PROJECT

Error Discovery Rate Measurement

The error discovery number shows how many open defects there are for the application at a given point in time. This discovery rate trend should be on a downward slope as the release of the software approaches. Our trend demonstrated that the testing was effective because the number of defects did in fact decrease each month.

The following chart graphically depicts the number of open defects over the life of the Payroll project.

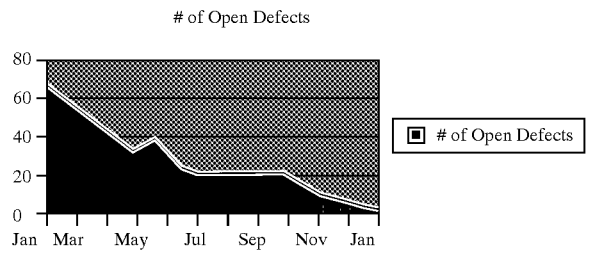

# of Open Defects

Testing Activity Measurement

There were a total of 231 test cases for this effort. The test team was able to successfully execute all 231 test cases. Therefore, our total activity was 100%.

This number represents an improvement over the last test effort where we were only able to complete 78% of the test cases.

Success Status Measurement

Out of the 231 test cases, 216 were successful. That represents a 93.5% success ration. Therefore, we can be certain that the results we analyze for Employee Processing are comprehensive enough to make an accurate business decision regarding the readiness of that module.

Specific Risk Management

The following chart will show what specific areas of the application will be at risk if the software is released without any further development or testing.

APPLICATION READINESS REPORT

ABC HARDWARE—PAYROLL 1.0 PROJECT

|  | Open Defects | | |
|---|---|---|---|
| Test Requirements | Severity 1 | Severity 2 | Severity 3 |
| Business | | | |
| Employee Processing | | 2 | 3 |
| Payroll Calculation | | | |
| Payroll Disbursement | | | |
| Payroll Reporting | | | |
| Technical | | | |
| Graphical User Interface | | | |
| System Performance | | | |

As the chart shows, there are no open defects for any business requirement except for Employee Processing. But, this is because the test team has not begun to test the other areas of the application yet. Therefore, there is a huge risk in these areas of the Payroll application.

Other Test Measurements

No other test measurements are being utilized at this time.

Project Summary

Costs

Testing costs to date total $102,000 of the budgeted $240,000. The remaining $138,000 will be used for testing the remainder of the business requirements.

Outstanding Issues

Business requirements 2, 3, 4, 5, and 6 still need to be tested.

Risks

There is a major risk in releasing the Payroll application in its current state. The risk involves the unknowns associated with not having tested over 83% of the application in this effort. The test team cannot reliably predict the problems we could face in the following business areas: payroll calcuation, payroll disbursement, payroll reporting, the applications graphical user interface, and system performance.

Conclusion

Overall, this test effort has been a very positive experience. For the first time in our company's history we have an objective way of determining if an application is ready to be released into production. We have also put measures in place to better control future testing projects and their associated costs.

All of the hard work and effort has demonstrated, unanimously, that the Payroll application is not ready to be released into production.

The main reason for this recommendation is the tact that only 16.6% of the application has been tested to this date. Our further recommendation is to push the release back a minimum of two months. This will allow enough time to finish the development work that is necessary and to thoroughly test the remaining modules of the application.

EXAMPLE 1

Test Plan for Payroll

ABC HARDWARE, INC.

"YOUR NEIGHBORHOOD HARDWARE STORE"

TEST PLAN FOR THE PAYROLL PROJECT

I. Test Plan Identifier

This is a comprehensive test plan for the Payroll project.

II. Introduction

A. Application Description

The Payroll Project ("project") has been created to establish a Payroll Processing system ("application") that will support the growth plans of the Company. In the initial release, the application will process the entire Payroll processing for the company. This includes the following:

Definition and maintenance of employee information.
Calculation of payroll values.
Disbursement of payroll.
Reporting on payroll processing.
Graphical User Interface operation.
Performance validation.

Functionality to support additional Human Resources and Payroll processes will be added during subsequent releases of the application.

An independent software vendor (ISV), Payroll System, Inc., specializing in creating customized Payroll solutions for companies in the retail industry is developing the application. ABC HR specialists working in conjunction with analyst personnel from the ISV will define the both the Application and Technical requirements for the application.

The application will be operate from a Windows 95 workstation. The technical structure of the application will be determined in the Application Functional Specification document produced by the ISV.

III. Goals of the Software Test Effort

This overall goal of this test effort is to adequately test the new Payroll software to determine its ability to support the employee growth expected as part of the Company's Business Plan. In support of this goal, there are five (5) specific goals that will be used.

1. Quantify the degree to which the application supports the Business Requirements that drove its development.
2. Provide recommendations for a release decision based on the quantified results.
3. Provide a baseline measurement system for all software testing processes at the Company. This will be done so that a continuous process improvement program can begin to increase the efficiency of software testing efforts at the company.
4. Complete Software Testing Activity on within project schedule parameters.
5. Complete Software Testing Activity within project cost parameters.

IV. Test Scope

The scope of the effort is the implementation of new software and the deployment of that software to multiple sites.

Since this is a new software implementation, program fixes are not applicable. Since this is a new software implementation, regression testing of existing functions is not applicable.

A. Business Requirements to be validated:

Validate that the Payroll system will be able to do the following:

Add new employees, both US and Non-US citizens

Update the Name, Insurance, Salary, Department, and Benefits fields in the employee record Delete both individual employee records as well as purge all employee records from the database.

Display employee records in detailed and list views.

Find individual employee records in the database using an ID number or the employee name.

The system should be available at all stores.

B. Business Requirements not to be validated:

Since this is an initial release of the application, all Business Requirements will be validated.

C. Business Requirements which cannot be validated:

Year end billing report. This specifications for this report have not been defined yet.

Addition of contractors. This procedure has not been defined yet.

V. Test Approach

ABC HARDWARE, INC.

"YOUR NEIGHBORHOOD HARDWARE STORE"

Test Environment
Test Server Requirements
Quantity
    Single, dedicated server
Hardware Configuration

| | |
|---|---|
| Model | Compaq ProLiant 6500R or equivalent |
| Processor | Two Intel Pentium II processor, 450 MHz, 512 KB Cache |
| Memory | 256 MB SDRAM |
| Operating System | Windows NT 4.0 Server |
| Keyboard | Required - no preference |
| Monitor | Minimum 15" |
| Video Card | 4 MB PCI or AGP |
| Hard Drive | Two 4.0 GB (operating system) |
| Floppy Drive | 1.44 MB |
| Mouse | Required - no preference |
| Network Card | 3COM PCI 10/100 twisted pair Ethernet |
| CD ROM Drive | Required - no preference |

Software
    Payroll Version 1.0
    Payroll GUI (front end) version 1.0 b
    Payroll server software (back end) version 1.0 b
Database
    Microsoft SQLServer 6.5
Disk Space/Storage
    Database Size and Space Requirements (need to ensure that enough server space is being allocated for rollbacks, table sizing, backups, etc.)
    Five 9.0 G Hard Drives

EXAMPLE 2

Test Cases for Payroll

| | |
|---|---|
| Date | 31 MAR 99 |
| Tester | Jake Swift |
| Test Case ID | Add US - 1.1.1.1 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Admin, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Doe, John in the Name field | Data - Valid condition |
| 5 | Enter 1000 for the Salary choice. | Data |
| 6 | Select the None radio button for the Insurance choice. | Data - None condition |
| 7 | Select Admin for the Department choice. | Data - Admin condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Doe is listed as an employee | Data |
| 14 | Select Doe, John. | |
| 15 | Select the View pull-down menu. | |
| 16 | Select Detail from the pull-down menu. | |
| 17 | Verify that John Doe's salary is 1000 | Data |
| 18 | Verify that John Doe's Insurance choice is None. | Data |
| 19 | Verify that John Doe's Department choice is Admin. | Data |
| 20 | Verify that John Doe's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.2 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Finance, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Doe, Jane in the Name field | Data - Valid condition |
| 5 | Enter 1000 for the Salary choice. | Data |
| 6 | Select the None radio button for the Insurance choice. | Data - None condition |
| 7 | Select Finance for the Department choice. | Data - Finance condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane Doe is listed as an employee | Data |
| 14 | Select Doe, Jane. | |
| 15 | Select the View pull-down menu. | |
| 16 | Select Detail from the pull-down menu. | |
| 17 | Verify that Jane Doe's salary is 1000 | Data |
| 18 | Verify that Jane Doe's Insurance choice is None. | Data |
| 19 | Verify that Jane Doe's Department choice is Finance. | Data |
| 20 | Verify that Jane Doe's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.3 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Marketing, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter DeBord, Jane in the Name field | Data - Valid condition |
| 5 | Enter 1000 for the Salary choice. | Data |
| 6 | Select the None radio button for the Insurance choice. | Data - None condition |
| 7 | Select Marketing for the Department choice. | Data - Marketing condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane DeBord is listed as an employee | Data |
| 14 | Select DeBord, Jane. | |
| 15 | Select the View pull-down menu. | |
| 16 | Select Detail from the pull-down menu. | |
| 17 | Verify that Jane DeBord's salary is 1000 | Data |
| 18 | Verify that Jane DeBord's Insurance choice is None. | Data |
| 19 | Verify that Jane DeBord's Department choice is Marketing. | Data |
| 20 | Verify that Jane DeBord's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.4 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - QA, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter DeBord, John in the Name field | Data - Valid condition |
| 5 | Enter 1000 for the Salary choice. | Data |
| 6 | Select the None radio button for the Insurance choice. | Data - None condition |
| 7 | Select QA for the Department choice. | Data - QA condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John DeBord is listed as an employee | Data |
| 14 | Select DeBord, John. | |
| 15 | Select the View pull-down menu. | |
| 16 | Select Detail from the pull-down menu. | |
| 17 | Verify that John DeBord's salary is 1000 | Data |
| 18 | Verify that John DeBord's Insurance choice is None. | Data |
| 19 | Verify that John DeBord's Department choice is QA. | Data |
| 20 | Verify that John DeBord's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.5 |
| Bus. Req. ID | Employee Processing |
| System | Pentium 233 w/MMX, 128 MB RAM |
| Function | Add Employees |

-continued

| | |
|---|---|
| Version | Payroll 1.0, Payroll GUI 1.0b. Payroll Server 1.0b |
| Environment | Windows NT 4.0 (Service Pack 4) |
| Conditions | Name - Valid, Insurance - None, Department - R&D, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Botz, John in the Name field | Data - Valid condition |
| 5 | Enter 1000 for the Salary choice. | Data |
| 6 | Select the None radio button for the Insurance choice. | Data - None condition |
| 7 | Select R&D for the Department choice. | Data - R&D condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Botz is listed as an employee | Data |
| 14 | Select Botz, John. | |
| 15 | Select the View pull-down menu. | |
| 16 | Select Detail from the pull-down menu. | |
| 17 | Verify that John Botz's salary is 1000 | Data |
| 18 | Verify that John Botz's Insurance choice is None. | Data |
| 19 | Verify that John Botz's Department choice is R&D. | Data |
| 20 | Verify that John Botz's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.6 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - None |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Botz, Jane in the Name field | Data - Valid condition |
| 5 | Enter 1000 for the Salary choice. | Data |
| 6 | Select the None radio button for the Insurance choice. | Data - None condition |
| 7 | Select Sales for the Department choice. | Data - Sales condition |
| 8 | Select None for the Benefits choice. | Data - None condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane Botz is listed as an employee | Data |
| 14 | Select Botz, Jane. | |
| 15 | Select the View pull-down menu. | |
| 16 | Select Detail from the pull-down menu. | |
| 17 | Verify that Jane Botz's salary is 1000 | Data |
| 18 | Verify that Jane Botz's Insurance choice is None. | Data |
| 19 | Verify that Jane Botz's Department choice is Sales. | Data |
| 20 | Verify that Jane Botz's Benefits choice is None. | Data |
| 21 | Return to the main payroll screen. | |

| | |
|---|---|
| Date | 31 MAR 99 |
| Tester | Jake Swift |
| Test Case ID | Add US - 1.1.1.7 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - Basic Plan |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Bradford, Jane in the Name field | Data - Valid condition |
| 5 | Enter 1000 for the Salary choice. | Data |
| 6 | Select the None radio button for the Insurance choice. | Data - None condition |
| 7 | Select Sales for the Department choice. | Data - Sales condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Jane Bradford is listed as an employee | Data |
| 14 | Select Bradford, Jane. | |
| 15 | Select the View pull-down menu. | |
| 16 | Select Detail from the pull-down menu. | |
| 17 | Verify that Jane Bradford's salary is 1000 | Data |
| 18 | Verify that Jane Bradford's Insurance choice is None. | Data |
| 19 | Verify that Jane Bradford's Department choice is Sales. | Data |
| 20 | Verify that Jane Bradford's Benefits choice is Basic Plan. | Data |
| 21 | Return to the main payroll screen. | |

| | |
|---|---|
| Date | 31 MAR 99 |
| Tester | Jake Swift |
| Test Case ID | Add US - 1.1.1.8 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Admin, Benefits - Basic Plan |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |

-continued

| | | |
|---|---|---|
| 4 | Enter Bradford, John in the Name field | Data - Valid condition |
| 5 | Enter 1000 for the Salary choice. | Data |
| 6 | Select the Self radio button for the Insurance choice. | Data - Self condition |
| 7 | Select Admin for the Department choice. | Data - Admin condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that John Bradford is listed as an employee | Data |
| 14 | Select Bradford, John. | |
| 15 | Select the View pull-down menu. | |
| 16 | Select Detail from the pull-down menu. | |
| 17 | Verify that John Bradford's salary is 1000 | Data |
| 18 | Verify that John Bradford's Insurance choice is Self. | Data |
| 19 | Verify that John Bradford's Department choice is Admin. | Data |
| 20 | Verify that John Bradford's Benefits choice is Basic Plan. | Data |
| 21 | Return to the main payroll screen. | |

| | |
|---|---|
| Date | 31 MAR 99 |
| Tester | Jake Swift |
| Test Case ID | Add US - 1.1.1.9 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Finance, Benefits - Basic Plan |

| Step # | Steps to Perform | Comment |
|---|---|---|
| 1 | Verify that the basic company employee data is loaded in the list view on the main payroll screen. | Data |
| 2 | Select the Employee pull-down menu. | |
| 3 | Select Add from the pull-down menu | |
| 4 | Enter Randall, Kate in the Name field | Data - Valid condition |
| 5 | Enter 1000 for the Salary choice. | Data |
| 6 | Select the Self radio button for the Insurance choice. | Data - Self condition |
| 7 | Select Finance for the Department choice. | Data - Finance condition |
| 8 | Select Basic Plan for the Benefits choice. | Data - Basic Plan condition |
| 9 | Select OK to Add the employee. | |
| 10 | Close the Payroll application. | |
| 11 | Reopen the Payroll application | |
| 12 | Verify that the basic company employee data is loaded in the list view on the main payroll screen. | |
| 13 | Verify that Kate Randall is listed as an employee | Data |
| 14 | Select Randall, Kate. | |
| 15 | Select the View pull-down menu. | |
| 16 | Select Detail from the pull-down menu. | |
| 17 | Verify that Kate Randall's salary is 1000 | Data |
| 18 | Verify that Kate Randall's Insurance choice is Self. | Data |
| 19 | Verify that Kate Randall's Department choice is Finance. | Data |
| 20 | Verify that Kate Randall's Benefits choice is Basic Plan. | Data |
| 21 | Return to the main payroll screen. | |

EXAMPLE 3

Test Environment Description for Payroll

ABC HARDWARE, INC.

"YOUR NEIGHBORHOOD HARDWARE STORE"

Test Environment
Test Server Requirements
Quantity
   Single, dedicated server
Hardware Configuration

| | |
|---|---|
| Model | Compaq ProLiant 6500R or equivalent |
| Processor | Two Intel Pentium II processor, 450 MHz, 512 KB Cache |
| Memory | 256 MB SDRAM |
| Operating System | Windows NT 4.0 Server |
| Keyboard | Required - no preference |
| Monitor | Minimum 15" |
| Video Card | 4 MB PCI or AGP |
| Hard Drive | Two 4.0 GB (operating system) |
| Floppy Drive | 1.44 MB |
| Mouse | Required - no preference |
| Network Card | 3COM PCI 10/100 twisted pair Ethernet |
| CD ROM Drive | Required - no preference |

Software
   Payroll Version 1.0
   Payroll GUI (front end) version 1.0 b
   Payroll server software (back end) version 1.0 b
Database
   Microsoft SQLServer 6.5
Disk Space/Storage
   Database Size and Space Requirements (need to ensure that enough server space is being allocated for rollbacks, table sizing, backups, etc.)
   Five 9.0 G Hard Drives
   Hardware RAID compatible
Communications
   10 MB Network Connection, minimum.
   TCP/IP protocol
Protection
   Uninterruptible Power Supply
Tape Backup
   DLT 35/70 (Digital Linear Tape)
Test Client Workstation Requirements
Quantity
   5 Windows NT Users
   15 Windows 95 Users

| | |
|---|---|
| Processor | Intel Pentium II processor, 350 MHz, 512 KB Cache |
| Memory | 64 MB SDRAM |
| Operating System | Windows NT 4.0 or Windows 95 |
| Keyboard | Required - no preference |
| Monitor | Minimum 17" |
| Video Card | 8 MB AGP |

-continued

| | |
|---|---|
| Hard Drive | 8.0 GB or greater |
| Floppy Drive | 1.44 MB |
| Mouse | Required - no preference |
| Network Card | 10/100 twisted pair Ethernet |
| Modem | Minimum 56k v.90 3COM USR modem for remote access |
| CD ROM Drive | Required - no preference |
| Sound Card | Required - no preference |

Software
  Payroll version 1.0
  Microsoft Excel 8.0 or greater

EXAMPLE 4

Test Environment Backup and Restore Procedures

Microsoft Word 8.0 or greater
  Internet Explorer 4.0
Communications
  10 MB Network Connection, minimum.
  TCP/IP protocol
Peripheral Requirements
  Printing Device: Laser Printer
Physical Access
  Servers located in a controlled-access environment.
  Access limited to systems support personnel.
Naming Convention
  Server(s): Unique computer name, with a test identifier, within its own domain, i.e.,
QPTEST
  Database(s): Systems and Acceptance Test Database:
STAT

ABC HARDWARE, INC.

"YOUR NEIGHBORHOOD HARDWARE STORE"

General Environment Preparation Process
  The initial STAT database will be a copy of the 'vanilla' payroll application.
  Before testing begins, approved changes from the development database will be migrated and duplicated within the STAT database. The systems administrator may perform either a selective upgrade or a full upgrade between the development database and the STAT database. A selective upgrade incorporates only those files, tables, etc. that have changed; a full upgrade is a complete copy of the development environment to the STAT environment.
  Before each test cycle, a backup of STAT is taken.
  The test team then executes the test cases per the schedule for that particular test cycle.
  At the end of each testing cycle, a backup of STAT is taken.
  Before each test cycle, a decision is made to restore from a backup or to reload the entire database.
Environment Preparation Procedures to be defined and documented:
  Performing a selective upgrade between the source (i.e., development) and the target (i.e., STAT) database.
  Performing a full upgrade between the source and the target database.

Security Requirements
Access and Privileges
  Access to the test database name, a login identification number, and a password.
  Each login identification number is unique.
  The password must be alphanumeric, and contain 6–10 characters.
  The STAT's systems administrator is responsible for setting up an employee's initial access to the system; however, the employee is responsible for changing their password and maintaining the confidentiality of their access information.
Audit and Traceability
  Log access and system performance.
Hardware Protection Requirements
  Both surge protectors and uninterruptible power supplies (UPS) are installed on the servers to manage power failures, fluctuations, surges, etc.
  Security protection requiring both a login identification code and a password are required to access the servers, login to the STAT database, and login to the associated network. The site and systems administrators are responsible for setting up the accounts with the applicable access privileges
  AntiVirus software programs are setup to run at a time that minimizes the impact to the server's performance. If a virus is identified, both an e-mail and a page are sent to the systems administrator, notifying them of the virus.
Backup Process
Identify and Document Backup Procedures
  Initiate, complete, and validate a normal backup of the STAT Database
  Initiate, complete, and validate an incremental backup of the STAT Database
Security
  The systems administrator and an appointed backup have the access and control privileges required to backup the database as well as to restore the database.
Backup Method(s)
  The following backups will be taken throughout test execution:
    Normal: A backup of the entire system, to include all selected drives, directories, and files, regardless of whether or not they have been changed.
    Incremental: Backup of only the files that have been created or changed since the last Normal or Incremental backup.
Media Rotation Scheme
  Incremental backups will be done for every day of the workweek except the last day. On the last day, a normal backup is done. On the last day of the month, a disaster recover backup is done, but these media are kept offsite. The incremental backup media is reused each week. The normal backups are not reused until after completion of the implementation.
Backup Chart
  Each time a backup is completed, the person making the backup must complete the information associated with the test environment's backup chart. The data that must be input includes the date, time and the contents of each backup media, who initiated the backup, and who verified that the backup was acceptable.
Location of Backup Media
  Incremental backups and normal, weekly backups are kept in a secured area, within the project's computer lab; the systems administrator and their appointed backup have access to the backups.

Backups are stored away from magnetic fields and electronic devices such a video monitors, analog telephone, etc.

Remote Backup Administrator

Backup processes can only be done onsite, at the location at the application's server.

Restoration Processes

Security

The systems administrator and an appointment backup have the access and control privileges required to initiate and validate a restoration.

Restoration Procedures

Restoring data to its original location

Identify Data State to be Restored

Select appropriate Media containing most recent backup of the requested Data State Restore the STAT database to the desired Data State Validate the restored Date State Notify Test Team of valid Date State Restoration Archiving Processes Security The systems administrator and an appointed backup have the access and control privileges required to initiate and validate any test data archive.

Identify and Document Restoration Procedures

Identify and document data archiving procedures.

Identify and document how archives are verified.

EXAMPLE 5

Test Execution Schedule for Payroll

See FIGS. 8–20

EXAMPLE 6

Test Results for Payroll Test Cases

| Date | 31 MAR 99 | Execution Date | 08 JUN 99 | Test Run # | 5 |
|---|---|---|---|---|---|

| Tester | Jake Swift |
|---|---|
| Test Case ID | Add US - 1.1.1.1 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Admin, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Doe, John in the Name field | Y | | | |
| 5 | Enter 1000 for the Salary choice. | Y | | | |
| 6 | Select the None radio button for the Insurance choice. | Y | | | |
| 7 | Select Admin for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John Doe is listed as an employee | Y | | | |
| 14 | Select Doe, John. | Y | | | |
| 15 | Select the View pull-down menu. | Y | | | |
| 16 | Select Detail from the pull-down menu. | Y | | | |
| 17 | Verify that John Doe's salary is 1000 | Y | | | |
| 18 | Verify that John Doe's Insurance choice is None. | Y | | | |
| 19 | Verify that John Doe's Department choice is Admin. | Y | | | |
| 20 | Verify that John Doe's Benefits choice is None. | Y | | | |
| 21 | Return to the main payroll screen. | Y | | | |

Summary:

| Are the test case results Valid? | Yes/No |
|---|---|
| If not, | |
| Is there a Test Case Error? | Yes/No |
| Is there a Test Execution Context Error? | Yes/No |
| Is there a Software (AUT) Error: | Yes/No |
| If yes, | |
| Has the defect been logged? | Yes/No |
| Has the Test Case be flagged for re-execution? | Yes/No |
| Has the Test Manager been notified? | Yes/No |
| Have the Metrics been logged? | Yes/No |

| Date | Execution Date | Test Run # |
|---|---|---|
| 31 MAR. 1999 | 08 JUN. 1999 | 5 |

| Tester | Jake Swift |
|---|---|
| Test Case ID | Add US - 1.1.1.2 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Finance, Benefits - None |

| Step # | Steps to Perform | Valid | Test error | Context text | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Doe, Jane in the Name field | Y | | | |
| 5 | Enter 1000 for the Salary choice. | Y | | | |
| 6 | Select the None radio button for the Insurance choice. | Y | | | |
| 7 | Select Finance for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |

-continued

| | | Valid | Test error | Con-text | Soft-ware Error |
|---|---|---|---|---|---|
| 12 | Verify that the basic company employee data is loaded in the list view on the main payroll screen. | Y | | | |
| 13 | Verify that Jane Doe is listed as an employee | Y | | | |
| 14 | Select Doe, Jane. | Y | | | |
| 15 | Select the View pull-down menu. | Y | | | |
| 16 | Select Detail from the pull-down menu. | Y | | | |
| 17 | Verify that Jane Doe's salary is 1000 | Y | | | |
| 18 | Verify that Jane Doe's Insurance choice is None. | Y | | | |
| 19 | Verify that Jane Doe's Department choice is Finance. | Y | | | |
| 20 | Verify that Jane Doe's Benefits choice is None. | Y | | | |
| 21 | Return to the main payroll screen. | Y | | | |

Summary:
| | |
|---|---|
| Are the test case results Valid? | Yes/No |
| If not, | |
|   Is there a Test Case Error? | Yes/No |
|   Is there a Test Execution Context Error? | Yes/No |
|   Is there a Software (AUT) Error: | Yes/No |
|     If yes, | |
|       Has the defect been logged? | Yes/No |
|       Has the Test Case be flagged for re-execution? | Yes/No |
|       Has the Test Manager been notified? | Yes/No |
| Have the Metrics been logged? | Yes/No |

| Date | 31 MAR 99 | Execution Date | 08 JUN 99 | Test Run # | 5 |
|---|---|---|---|---|---|

Tester    Jake Swift
Test Case ID    Add US - 1.1.1.3
Bus. Req. ID    Employee Processing
System    Pentium 233 w/MMX, 128 MB RAM
Function    Add Employees
Version    Payroll 1.0, Payroll GUI 1.0b, Payroll Server 1.0b
Environment    Windows NT 4.0 (Service Pack 4)
Conditions    Name - Valid, Insurance - None, Department - Marketing, Benefits - None

| Step # | Steps to Perform | Valid | Test error | Con-text | Soft-ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter DeBord, Jane in the Name field | Y | | | |
| 5 | Enter 1000 for the Salary choice. | Y | | | |
| 6 | Select the None radio button for the Insurance choice. | Y | | | |
| 7 | Select Marketing for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane DeBord is listed as an employee | Y | | | |
| 14 | Select DeBord, Jane. | Y | | | |
| 15 | Select the View pull-down menu. | Y | | | |
| 16 | Select Detail from the pull-down menu. | Y | | | |
| 17 | Verify that Jane DeBord's salary is 1000 | Y | | | |
| 18 | Verify that Jane DeBord's Insurance choice is None. | Y | | | |
| 19 | Verify that Jane DeBord's Department choice is Marketing. | Y | | | |
| 20 | Verify that Jane DeBord's Benefits choice is None. | Y | | | |
| 21 | Return to the main payroll screen. | Y | | | |

Summary:
| | |
|---|---|
| Are the test case results Valid? | Yes/No |
| If not, | |
|   Is there a Test Case Error? | Yes/No |
|   Is there a Test Execution Context Error? | Yes/No |
|   Is there a Software (AUT) Error: | Yes/No |
|     If yes, | |
|       Has the defect been logged? | Yes/No |
|       Has the Test Case be flagged for re-execution? | Yes/No |
|       Has the Test Manager been notified? | Yes/No |
| Have the Metrics been logged? | Yes/No |

| Date | 31 MAR 99 | Execution Date | 08 JUN 99 | Test Run # | 5 |
|---|---|---|---|---|---|

Tester    Jake Swift
Test Case ID    Add US - 1.1.1.4
Bus. Req. ID    Employee Processing
System    Pentium 233 w/MMX, 128 MB RAM
Function    Add Employees
Version    Payroll 1.0, Payroll GUI 1.0b, Payroll Server 1.0b
Environment    Windows NT 4.0 (Service Pack 4)
Conditions    Name - Valid, Insurance - None, Department - QA, Benefits - None

| Step # | Steps to Perform | Valid | Test error | Con-text | Soft-ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter DeBord, John in the Name field | Y | | | |
| 5 | Enter 1000 for the Salary choice. | Y | | | |
| 6 | Select the None radio button for the Insurance choice. | Y | | | |
| 7 | Select QA for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John DeBord is listed as an employee | N | N | N | Y |
| 14 | Select DeBord, John. | Y | | | |
| 15 | Select the View pull-down menu. | Y | | | |
| 16 | Select Detail from the pull-down menu. | Y | | | |
| 17 | Verify that John DeBord's salary is 1000 | Y | | | |
| 18 | Verify that John DeBord's Insurance choice is None. | Y | | | |
| 19 | Verify that John DeBord's Department choice is QA. | Y | | | |
| 20 | Verify that John DeBord's Benefits choice is None. | Y | | | |
| 21 | Return to the main payroll screen. | Y | | | |

-continued

Summary:

| | |
|---|---|
| Are the test case results Valid? | Yes/No |
| If not, | |
|     Is there a Test Case Error? | Yes/No |
|     Is there a Test Execution Context Error? | Yes/No |
|     Is there a Software (AUT) Error: | Yes/No |
|         If yes, | |
|             Has the defect been logged? | Yes/No |
|             Has the Test Case be flagged for re-execution? | Yes/No |
|             Has the Test Manager been notified? | Yes/No |
| Have the Metrics been logged? | Yes/No |

---

| | | | | | |
|---|---|---|---|---|---|
| Date | 31 MAR 99 | Execution Date | 08 JUN 99 | Test Run # | 5 |

| | |
|---|---|
| Tester | Jake Swift |
| Test Case ID | Add US - 1.1.1.5 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - R&D, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Botz, John in the Name field | Y | | | |
| 5 | Enter 1000 for the Salary choice. | Y | | | |
| 6 | Select the None radio button for the Insurance choice. | Y | | | |
| 7 | Select R&D for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John Botz is listed as an employee | Y | | | |
| 14 | Select Botz, John. | Y | | | |
| 15 | Select the View pull-down menu. | Y | | | |
| 16 | Select Detail from the pull-down menu. | Y | | | |
| 17 | Verify that John Botz's salary is 1000 | Y | | | |
| 18 | Verify that John Botz's Insurance choice is None. | Y | | | |
| 19 | Verify that John Botz's Department choice is R&D. | Y | | | |
| 20 | Verify that John Botz's Benefits choice is None. | Y | | | |
| 21 | Return to the main payroll screen. | Y | | | |

Summary:

| | |
|---|---|
| Are the test case results Valid? | Yes/No |
| If not, | |
|     Is there a Test Case Error? | Yes/No |
|     Is there a Test Execution Context Error? | Yes/No |
|     Is there a Software (AUT) Error: | Yes/No |
|         If yes, | |
|             Has the defect been logged? | Yes/No |
|             Has the Test Case be flagged for re-execution? | Yes/No |
|             Has the Test Manager been notified? | Yes/No |
| Have the Metrics been logged? | Yes/No |

---

| | | | | | |
|---|---|---|---|---|---|
| Date | 31 MAR 99 | Execution Date | 08 JUN 99 | Test Run # | 5 |

| | |
|---|---|
| Tester | Jake Swift |
| Test Case ID | Add US - 1.1.1.6 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - None, Department - Sales, Benefits - None |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Botz, Jane in the Name field | Y | | | |
| 5 | Enter 1000 for the Salary choice. | Y | | | |
| 6 | Select the None radio button for the Insurance choice. | Y | | | |
| 7 | Select Sales for the Department choice. | Y | | | |
| 8 | Select None for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane Botz is listed as an employee | Y | | | |
| 14 | Select Botz, Jane. | Y | | | |
| 15 | Select the View pull-down menu. | Y | | | |
| 16 | Select Detail from the pull-down menu. | Y | | | |
| 17 | Verify that Jane Botz's salary is 1000 | Y | | | |
| 18 | Verify that Jane Botz's Insurance choice is None. | Y | | | |
| 19 | Verify that Jane Botz's Department choice is Sales. | Y | | | |
| 20 | Verify that Jane Botz's Benefits choice is None. | Y | | | |
| 21 | Return to the main payroll screen. | Y | | | |

Summary:

| | |
|---|---|
| Are the test case results Valid? | Yes/No |
| If not, | |
|     Is there a Test Case Error? | Yes/No |
|     Is there a Test Execution Context Error? | Yes/No |
|     Is there a Software (AUT) Error: | Yes/No |
|         If yes, | |
|             Has the defect been logged? | Yes/No |
|             Has the Test Case be flagged for re-execution? | Yes/No |
|             Has the Test Manager been notified? | Yes/No |
| Have the Metrics been logged? | Yes/No |

| | |
|---|---|
| Date | 31 MAR 99   Execution 08 JUN 99   Test Run # 5 Date |
| Tester | Jake Swift |
| Test Case ID | Add US - 1.1.1.7 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | None - Valid, Insurance - None, Department - Sales, Benefits - Basic Plan |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Bradford, Jane in the Name field | Y | | | |
| 5 | Enter 1000 for the Salary choice. | Y | | | |
| 6 | Select the None radio button for the Insurance choice. | Y | | | |
| 7 | Select Sales for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Jane Bradford is listed as an employee | Y | | | |
| 14 | Select Bradford, Jane. | Y | | | |
| 15 | Select the View pull-down menu. | Y | | | |
| 16 | Select Detail from the pull-down menu. | Y | | | |
| 17 | Verify that Jane Bradford's salary is 1000 | Y | | | |
| 18 | Verify that Jane Bradford's Insurance choice is None. | Y | | | |
| 19 | Verify that Jane Bradford's Department choice is Sales. | Y | | | |
| 20 | Verify that Jane Bradford's Benefits choice is Basic Plan. | Y | | | |
| 21 | Return to the main payroll screen. | Y | | | |

Summary:

| | |
|---|---|
| Are the test case results Valid? | Yes/No |
| If not, | |
| Is there a Test Case Error? | Yes/No |
| Is there a Test Execution Context Error? | Yes/No |
| Is there a Software (AUT) Error: | Yes/No |
| If yes, | |
| Has the defect been logged? | Yes/No |
| Has the Test Case be flagged for re-execution? | Yes/No |
| Has the Test Manager been notified? | Yes/No |
| Have the Metrics been logged? | Yes/No |

| | |
|---|---|
| Date | 31 MAR 99   Execution 08 JUN 99   Test Run # 5 Date |
| Tester | Jake Swift |
| Test Case ID | Add US - 1.1.1.8 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Admin, Benefits - Basic Plan |

| Step # | Steps to Perform | Valid | Test error | Context | Software Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Bradford, John in the Name field | Y | | | |
| 5 | Enter 1000 for the Salary choice. | Y | | | |
| 6 | Select the Self radio button for the Insurance choice. | Y | | | |
| 7 | Select Admin for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that John Bradford is listed as an employee | Y | | | |
| 14 | Select Bradford, John. | Y | | | |
| 15 | Select the View pull-down menu. | Y | | | |
| 16 | Select Detail from the pull-down menu. | Y | | | |
| 17 | Verify that John Bradford's salary is 1000 | Y | | | |
| 18 | Verify that John Bradford's Insurance choice is Self. | Y | | | |
| 19 | Verify that John Bradford's Department choice is Admin. | Y | | | |
| 20 | Verify that John Bradford's Benefits choice is Basic Plan. | Y | | | |
| 21 | Return to the main payroll screen. | Y | | | |

Summary:

| | |
|---|---|
| Are the test case results Valid? | Yes/No |
| If not, | |
| Is there a Test Case Error? | Yes/No |
| Is there a Test Execution Context Error? | Yes/No |
| Is there a Software (AUT) Error: | Yes/No |
| If yes, | |
| Has the defect been logged? | Yes/No |
| Has the Test Case be flagged for re-execution? | Yes/No |
| Has the Test Manager been notified? | Yes/No |
| Have the Metrics been logged? | Yes/No |

| | |
|---|---|
| Date | 31 MAR 99   Execution 08 JUN 99   Test Run # 5 Date |
| Tester | Jake Swift |
| Test Case ID | Add US - 1.1.1.9 |
| Bus. Req. ID | Employee Processing |
| System | Pentium 233 w/MMX, 128 MB RAM |
| Function | Add Employees |
| Version | Payroll 1.0, Payroll GUI 1.0b, Payroll Server 1.0b |
| Environment | Windows NT 4.0 (Service Pack 4) |
| Conditions | Name - Valid, Insurance - Self, Department - Finance, Benefits - Basic Plan |

-continued

| Step # | Steps to Perform | Valid | Test error | Con-text | Soft-ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Randall, Kate in the Name field | Y | | | |
| 5 | Enter 1000 for the Salary choice. | Y | | | |
| 6 | Select the Self radio button for the Insurance choice. | Y | | | |
| 7 | Select Finance for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Kate Randall is listed as an employee | Y | | | |
| 14 | Select Randall, Kate. | Y | | | |
| 15 | Select the View pull-down menu. | Y | | | |
| 16 | Select Detail from the pull-down menu. | Y | | | |
| 17 | Verify that Kate Randall's salary is 1000 | Y | | | |
| 18 | Verify that Kate Randall's Insurance choice is Self. | Y | | | |
| 19 | Verify that Kate Randall's Department choice is Finance. | Y | | | |
| 20 | Verify that Kate Randall's Benefits choice is Basic Plan. | Y | | | |
| 21 | Return to the main payroll screen. | Y | | | |

Summary:

| | |
|---|---|
| Are the test case results Valid? | Yes/No |
| If not, | |
| Is there a Test Case Error? | Yes/No |
| Is there a Test Execution Context Error? | Yes/No |
| Is there a Software (AUT) Error: | Yes/No |
| If yes, | |
| Has the defect been logged? | Yes/No |
| Has the Test Case be flagged for re-execution? | Yes/No |
| Has the Test Manager been notified? | Yes/No |
| Have the Metrics been logged? | Yes/No |

| | | | | |
|---|---|---|---|---|
| Date | 31 MAR 99 | Execution Date | 08 JUN 99 | Test Run # 5 |
| Tester | Jake Swift | | | |
| Test Case ID | Add US - 1.1.1.10 | | | |
| Bus. Req. ID | Employee Processing | | | |
| System | Pentium 233 w/MMX, 128 MB RAM | | | |
| Function | Add Employees | | | |
| Version | Payroll 1.0, Payroll GUI 1.0b, Payroll Server 1.0b | | | |
| Environment | Windows NT 4.0 (Service Pack 4) | | | |
| Conditions | Name - Valid, Insurance - Self, Department - Marketing, Benefits - Basic Plan | | | |

| Step # | Steps to Perform | Valid | Test error | Con-text | Soft-ware Error |
|---|---|---|---|---|---|
| 1 | Verify that the basic company employee data is loaded in the list view on the main payroll screen. | Y | | | |
| 2 | Select the Employee pull-down menu. | Y | | | |
| 3 | Select Add from the pull-down menu | Y | | | |
| 4 | Enter Randall, Robert in the Name field | Y | | | |
| 5 | Enter 1000 for the Salary choice. | Y | | | |
| 6 | Select the Self radio button for the Insurance choice. | Y | | | |
| 7 | Select Marketing for the Department choice. | Y | | | |
| 8 | Select Basic Plan for the Benefits choice. | Y | | | |
| 9 | Select OK to Add the employee. | Y | | | |
| 10 | Close the Payroll application. | Y | | | |
| 11 | Reopen the Payroll application | Y | | | |
| 12 | Verify that the basic company employee data is loaded in the list view on the main payroll screen. | Y | | | |
| 13 | Verify that Robert Randall is listed as an employee | Y | | | |
| 14 | Select Randall, Robert. | Y | | | |
| 15 | Select the View pull-down menu. | Y | | | |
| 16 | Select Detail from the pull-down menu. | Y | | | |
| 17 | Verify that Robert Randall's salary is 1000 | Y | | | |
| 18 | Verify that Robert Randall's Insurance choice is Self. | Y | | | |
| 19 | Verify that Robert Randall's Department choice is Marketing. | Y | | | |
| 20 | Verify that Robert Randall's Benefits choice is Basic Plan. | Y | | | |
| 21 | Return to the main payroll screen. | Y | | | |

Summary:

| | |
|---|---|
| Are the test case results Valid? | Yes/No |
| If not, | |
| Is there a Test Case Error? | Yes/No |
| Is there a Test Execution Context Error? | Yes/No |
| Is there a Software (AUT) Error: | Yes/No |
| If yes, | |
| Has the defect been logged? | Yes/No |
| Has the Test Case be flagged for re-execution? | Yes/No |
| Has the Test Manager been notified? | Yes/No |
| Have the Metrics been logged? | Yes/No |

EXAMPLE 7

Summarized Metrics from Payroll Execution

| Test Case ID | Test Run 1 | Test Run 2 | Test Run 3 | Test Run 4 | Test Run 5 |
|---|---|---|---|---|---|
| Add US - 1.1.1.7 | Fail | Fail | Fail | Pass | Pass |
| Add Non-US - 1.1.2.7 | Fail | Pass | Pass | Pass | Pass |
| Find Employee 1.2.2.1 | Fail | Pass | Pass | Pass | Pass |
| Find Employee 1.2.1.2 | Fail | Pass | Pass | Pass | Pass |
| Del. All Employees 1.4.2.1 | Pass | Pass | Pass | Pass | Pass |
| Add US - 1.1.1.3 | Fail | Pass | Pass | Pass | Pass |
| Add US - 1.1.1.4 | Fail | Pass | Pass | Fail | Fail |
| Add US - 1.1.1.5 | Fail | Pass | Pass | Pass | Pass |
| Add US - 1.1.1.10 | Fail | Pass | Pass | Pass | Pass |
| Add US - 1.1.1.11 | Fail | Pass | Pass | Pass | Pass |
| Add US - 1.1.1.12 | Fail | Pass | Pass | Pass | Pass |
| Add US - 1.1.1.16 | Fail | Pass | Pass | Pass | Pass |
| Add US - 1.1.1.17 | Fail | Pass | Pass | Pass | Pass |
| Add US - 1.1.1.18 | Fail | Pass | Pass | Pass | Pass |
| Add US - 1.1.1.22 | Fail | Pass | Pass | Pass | Pass |
| Add US - 1.1.1.23 | Fail | Pass | Pass | Pass | Pass |
| Add US - 1.1.1.24 | Fail | Pass | Pass | Pass | Pass |

-continued

| Test Case ID | Test Run 1 | Test Run 2 | Test Run 3 | Test Run 4 | Test Run 5 |
|---|---|---|---|---|---|
| Add US - 1.1.1.28 | Fail | Pass | Pass | Pass | Pass |
| Add US - 1.1.1.29 | Fail | Pass | Pass | Pass | Pass |
| Add US - 1.1.1.30 | Fail | Pass | Pass | Pass | Pass |
| Add US - 1.1.1.34 | Fail | Pass | Pass | Pass | Pass |
| Add US - 1.1.1.35 | Fail | Pass | Pass | Pass | Pass |
| Add US - 1.1.1.36 | Fail | Pass | Pass | Pass | Pass |
| Add US - 1.1.1.40 | Fail | Pass | Pass | Pass | Pass |
| Add US - 1.1.1.41 | Fail | Pass | Pass | Pass | Pass |
| Add US - 1.1.1.42 | Fail | Pass | Pass | Pass | Pass |
| Add US - 1.1.1.46 | Fail | Pass | Pass | Pass | Pass |
| Add US - 1.1.1.47 | Fail | Pass | Pass | Pass | Pass |
| Add US - 1.1.1.48 | Fail | Pass | Pass | Pass | Pass |
| Add US - 1.1.1.52 | Fail | Pass | Pass | Pass | Pass |
| Add US - 1.1.1.53 | Fail | Pass | Pass | Pass | Pass |
| Add US - 1.1.1.54 | Fail | Pass | Pass | Pass | Pass |
| Add US - 1.1.1.58 | Fail | Pass | Pass | Pass | Pass |
| Add US - 1.1.1.59 | Fail | Pass | Pass | Pass | Pass |
| Add US - 1.1.1.60 | Fail | Pass | Pass | Pass | Pass |
| Add US - 1.1.1.64 | Fail | Pass | Pass | Pass | Pass |
| Add US - 1.1.1.65 | Fail | Pass | Pass | Pass | Pass |
| Add US - 1.1.1.66 | Fail | Pass | Pass | Pass | Pass |
| Add US - 1.1.1.70 | Fail | Pass | Pass | Pass | Pass |
| Add US - 1.1.1.71 | Fail | Pass | Pass | Pass | Pass |
| Add US - 1.1.1.72 | Fail | Pass | Pass | Pass | Pass |
| Add US - 1.1.1.76 | Fail | Pass | Pass | Pass | Pass |
| Add US - 1.1.1.77 | Fail | Pass | Pass | Pass | Pass |
| Add US - 1.1.1.78 | Fail | Pass | Pass | Pass | Pass |
| Add US - 1.1.1.82 | Fail | Pass | Pass | Pass | Pass |
| Add US - 1.1.1.83 | Fail | Pass | Pass | Pass | Pass |
| Add US - 1.1.1.84 | Fail | Pass | Pass | Pass | Pass |
| Add US - 1.1.1.88 | Fail | Pass | Pass | Pass | Pass |
| Add US - 1.1.1.89 | Fail | Pass | Pass | Pass | Pass |
| Add US - 1.1.1.90 | Fail | Pass | Pass | Pass | Pass |
| Add US - 1.1.1.94 | N/A | Pass | Pass | Pass | Pass |
| Add US - 1.1.1.95 | N/A | Pass | Pass | Pass | Pass |
| Add US - 1.1.1.96 | N/A | Pass | Pass | Pass | Pass |
| Add US - 1.1.1.100 | N/A | Pass | Pass | Pass | Pass |
| Add US - 1.1.1.101 | N/A | Pass | Pass | Pass | Pass |
| Add US - 1.1.1.102 | N/A | Pass | Pass | Pass | Pass |
| Add Non-US - 1.1.2.3 | N/A | Fail | Fail | Fail | Fail |
| Add Non-US - 1.1.2.4 | N/A | Fail | Fail | Fail | Fail |
| Add Non-US - 1.1.2.5 | N/A | Fail | Pass | Fail | Pass |
| Add Non-US - 1.1.2.10 | N/A | Fail | Fail | Pass | Fail |
| Add Non-US - 1.1.2.11 | N/A | Fail | Fail | Fail | Pass |
| Add Non-US - 1.1.2.12 | N/A | Fail | Pass | Pass | Pass |
| Add Non-US - 1.1.2.16 | N/A | Pass | Pass | Pass | Pass |
| Add Non-US - 1.1.2.17 | N/A | Pass | Pass | Pass | Pass |
| Add Non-US - 1.1.2.18 | N/A | Pass | Pass | Pass | Pass |
| Add Non-US - 1.1.2.22 | N/A | Pass | Pass | Pass | Pass |
| Add Non-US - 1.1.2.23 | N/A | Fail | Pass | Fail | Pass |
| Add Non-US - 1.1.2.24 | N/A | Pass | Pass | Pass | Pass |
| Add Non-US - 1.1.2.28 | N/A | Pass | Pass | Pass | Pass |
| Add Non-US - 1.1.2.29 | N/A | Pass | Pass | Pass | Pass |
| Add Non-US - 1.1.2.30 | N/A | Pass | Pass | Pass | Pass |
| Add Non-US - 1.1.2.34 | N/A | Pass | Pass | Pass | Pass |
| Add Non-US - 1.1.2.35 | N/A | Pass | Pass | Pass | Pass |
| Add Non-US - 1.1.2.36 | N/A | Pass | Pass | Pass | Pass |
| Add Non-US - 1.1.2.40 | N/A | Pass | Pass | Pass | Pass |
| Add Non-US - 1.1.2.41 | N/A | Pass | Pass | Pass | Pass |
| Add Non-US - 1.1.2.42 | N/A | Pass | Pass | Pass | Pass |
| Add Non-US - 1.1.2.46 | N/A | Pass | Pass | Pass | Pass |
| Add Non-US - 1.1.2.47 | N/A | Pass | Pass | Pass | Pass |
| Add Non-US - 1.1.2.48 | N/A | Pass | Pass | Pass | Pass |
| Add Non-US - 1.1.2.52 | N/A | Pass | Pass | Pass | Pass |
| Add Non-US - 1.1.2.53 | N/A | Pass | Pass | Pass | Pass |
| Add Non-US - 1.1.2.54 | N/A | Fail | Pass | Fail | Fail |
| Add Non-US - 1.1.2.58 | N/A | Fail | Pass | Pass | Pass |
| Add Non-US - 1.1.2.59 | N/A | Fail | Pass | Pass | Pass |
| Add Non-US - 1.1.2.60 | N/A | Fail | Pass | Pass | Pass |
| Add Non-US - 1.1.2.64 | N/A | Fail | Pass | Pass | Pass |
| Add Non-US - 1.1.2.65 | N/A | Fail | Pass | Pass | Pass |
| Add Non-US - 1.1.2.66 | N/A | Fail | Pass | Pass | Pass |
| Add Non-US - 1.1.2.70 | N/A | Fail | Pass | Pass | Pass |
| Add Non-US - 1.1.2.71 | N/A | Fail | Pass | Fail | Pass |
| Add Non-US - 1.1.2.72 | N/A | Fail | Pass | Fail | Pass |

-continued

| Test Case ID | Test Run 1 | Test Run 2 | Test Run 3 | Test Run 4 | Test Run 5 |
|---|---|---|---|---|---|
| Add Non-US - 1.1.2.76 | N/A | Fail | Fail | Fail | Pass |
| Add Non-US - 1.1.2.77 | N/A | Fail | Pass | Pass | Pass |
| Add Non-US - 1.1.2.78 | N/A | Fail | Fail | Pass | Pass |
| Add Non-US - 1.1.2.82 | N/A | Fail | Fail | Fail | Fail |
| Add Non-US - 1.1.2.83 | N/A | Fail | Fail | Fail | Fail |
| Add Non-US - 1.1.2.84 | N/A | Pass | Pass | Pass | Pass |
| Add Non-US - 1.1.2.88 | N/A | Fail | Fail | Fail | Fail |
| Add Non-US - 1.1.2.89 | N/A | Fail | Pass | Pass | Fail |
| Add Non-US - 1.1.2.90 | N/A | Fail | Fail | Fail | Fail |
| Add Non-US - 1.1.2.94 | N/A | Pass | Pass | Pass | Pass |
| Add Non-US - 1.1.2.95 | N/A | Pass | Pass | Pass | Pass |
| Add Non-US - 1.1.2.96 | N/A | Pass | Pass | Pass | Pass |
| Add Non-US - 1.1.2.100 | N/A | Pass | Pass | Pass | Pass |
| Add Non-US - 1.1.2.101 | N/A | Pass | Pass | Pass | Pass |
| Add Non-US - 1.1.2.102 | N/A | Pass | Pass | Pass | Pass |
| Find Employee 1.2.2.2 | N/A | Fail | Pass | Pass | Pass |
| Update US 1.3.1.1 | N/A | Fail | Pass | Pass | Fail |
| Update Non-US 1.3.2.1 | N/A | Fail | Pass | Pass | Pass |
| Add US - 1.1.1.2 | N/A | Pass | Pass | Pass | Pass |
| Add US - 1.1.1.6 | N/A | Pass | Pass | Pass | Pass |
| Add US - 1.1.1.9 | N/A | Pass | Pass | Pass | Pass |
| Add US - 1.1.1.13 | N/A | Pass | Pass | Pass | Pass |
| Add US - 1.1.1.15 | N/A | Pass | Pass | Pass | Pass |
| Add US - 1.1.1.19 | N/A | Pass | Pass | Pass | Pass |
| Add US - 1.1.1.21 | N/A | Pass | Pass | Pass | Pass |
| Add US - 1.1.1.25 | N/A | Pass | Pass | Pass | Pass |
| Add US - 1.1.1.27 | N/A | Pass | Pass | Pass | Pass |
| Add US - 1.1.1.31 | N/A | Pass | Pass | Pass | Pass |
| Add US - 1.1.1.33 | N/A | Pass | Pass | Pass | Pass |
| Add US - 1.1.1.37 | N/A | Pass | Pass | Pass | Pass |
| Add US - 1.1.1.39 | N/A | Pass | Pass | Pass | Pass |
| Add US - 1.1.1.43 | N/A | Pass | Pass | Pass | Pass |
| Add US - 1.1.1.45 | N/A | Pass | Pass | Pass | Pass |
| Add US - 1.1.1.49 | N/A | Pass | Pass | Pass | Pass |
| Add US - 1.1.1.51 | N/A | Pass | Pass | Pass | Pass |
| Add US - 1.1.1.55 | N/A | Pass | Pass | Pass | Pass |
| Add US - 1.1.1.57 | N/A | Pass | Pass | Pass | Pass |
| Add US - 1.1.1.61 | N/A | Pass | Pass | Pass | Pass |
| Add US - 1.1.1.63 | N/A | Pass | Pass | Pass | Pass |
| Add US - 1.1.1.67 | N/A | Pass | Pass | Pass | Pass |
| Add US - 1.1.1.69 | N/A | Pass | Pass | Pass | Pass |
| Add US - 1.1.1.73 | N/A | Pass | Pass | Pass | Pass |
| Add US - 1.1.1.75 | N/A | Pass | Pass | Pass | Pass |
| Add US - 1.1.1.79 | N/A | Pass | Pass | Pass | Pass |
| Add US - 1.1.1.81 | N/A | Pass | Pass | Pass | Pass |
| Add US - 1.1.1.85 | N/A | Pass | Pass | Pass | Pass |
| Add US - 1.1.1.87 | N/A | Pass | Pass | Pass | Pass |
| Add US - 1.1.1.91 | N/A | Pass | Pass | Pass | Pass |
| Add US - 1.1.1.93 | N/A | Pass | Pass | Pass | Pass |
| Add US - 1.1.1.97 | N/A | Pass | Pass | Pass | Pass |
| Add US - 1.1.1.99 | N/A | Pass | Pass | Pass | Pass |
| Add US - 1.1.1.103 | N/A | Pass | Pass | Pass | Pass |
| Add US - 1.1.1.105 | N/A | Pass | Pass | Pass | Pass |
| Add Non-US - 1.1.2.2 | N/A | Fail | Fail | Fail | Fail |
| Add Non-US - 1.1.2.6 | N/A | Fail | Fail | Fail | Fail |
| Add Non-US - 1.1.2.9 | N/A | Fail | Fail | Fail | Pass |
| Add Non-US - 1.1.2.13 | N/A | Fail | Fail | Fail | Pass |
| Add Non-US - 1.1.2.15 | N/A | Fail | Fail | Pass | Pass |
| Add Non-US - 1.1.2.19 | N/A | Fail | Fail | Pass | Pass |
| Add Non-US - 1.1.2.21 | N/A | Fail | Fail | Pass | Pass |
| Add Non-US - 1.1.2.25 | N/A | Fail | Fail | Pass | Pass |
| Add Non-US - 1.1.2.27 | N/A | Fail | Pass | Pass | Pass |
| Add Non-US - 1.1.2.31 | N/A | Fail | Pass | Pass | Pass |
| Add Non-US - 1.1.2.33 | N/A | Fail | Pass | Pass | Pass |
| Add Non-US - 1.1.2.37 | N/A | Fail | Pass | Pass | Pass |
| Add Non-US - 1.1.2.39 | N/A | Fail | Pass | Pass | Pass |
| Add Non-US - 1.1.2.43 | N/A | Fail | Pass | Pass | Pass |
| Add Non-US - 1.1.2.45 | N/A | Fail | Pass | Pass | Pass |
| Add Non-US - 1.1.2.49 | N/A | Fail | Pass | Pass | Pass |
| Add Non-US - 1.1.2.51 | N/A | Fail | Pass | Pass | Pass |
| Add Non-US - 1.1.2.55 | N/A | Fail | Pass | Pass | Pass |
| Add Non-US - 1.1.2.57 | N/A | Fail | Pass | Pass | Pass |
| Add Non-US - 1.1.2.61 | N/A | Fail | Pass | Pass | Pass |
| Add Non-US - 1.1.2.63 | N/A | Fail | Pass | Pass | Pass |
| Add Non-US - 1.1.2.67 | N/A | Fail | Pass | Pass | Pass |

-continued

| Test Case ID | Test Run 1 | Test Run 2 | Test Run 3 | Test Run 4 | Test Run 5 |
|---|---|---|---|---|---|
| Add Non-US - 1.1.2.69 | N/A | Fail | Pass | Pass | Pass |
| Add Non-US - 1.1.2.73 | N/A | Fail | Pass | Pass | Pass |
| Add Non-US - 1.1.2.75 | N/A | Fail | Pass | Pass | Pass |
| Add Non-US - 1.1.2.79 | N/A | Fail | Pass | Pass | Pass |
| Add Non-US - 1.1.2.81 | N/A | Fail | Pass | Pass | Pass |
| Add Non-US - 1.1.2.85 | N/A | Fail | Pass | Pass | Pass |
| Add Non-US - 1.1.2.87 | N/A | Fail | Pass | Pass | Pass |
| Add Non-US - 1.1.2.91 | N/A | Fail | Pass | Pass | Pass |
| Add Non-US - 1.1.2.93 | N/A | Fail | Pass | Pass | Pass |
| Add Non-US - 1.1.2.97 | N/A | Fail | Pass | Pass | Pass |
| Add Non-US - 1.1.2.99 | N/A | Fail | Pass | Pass | Pass |
| Add Non-US - 1.1.2.103 | N/A | Fail | Pass | Pass | Pass |
| Add Non-US - 1.1.2.105 | N/A | Fail | Fail | Pass | Pass |
| Update US 1.3.1.4 | N/A | Fail | Fail | Fail | Pass |
| Update Non-US 1.3.2.4 | N/A | Fail | Fail | Fail | Fail |
| Del Single US 1.4.1.1 | N/A | Pass | Pass | Fail | Pass |
| Del Single Non-US 1.4.1.2 | N/A | Pass | Pass | Fail | Fail |
| Find Employee 1.2.1.1 | N/A | Fail | Fail | Pass | Pass |
| Update US 1.3.1.2 | N/A | Pass | Pass | Pass | Pass |
| Update US 1.3.1.3 | N/A | Pass | Pass | Pass | Pass |
| Update Non-US 1.3.2.2 | N/A | Fail | Fail | Fail | Pass |
| Update Non-US 1.3.2.3 | N/A | Fail | Fail | Pass | Pass |
| Add US - 1.1.1.1 | N/A | Pass | Pass | Pass | Pass |
| Add US - 1.1.1.8 | N/A | Pass | Pass | Pass | Pass |
| Add US - 1.1.1.14 | N/A | Pass | Pass | Pass | Pass |
| Add US - 1.1.1.20 | N/A | Pass | Pass | Pass | Pass |
| Add US - 1.1.1.26 | N/A | Pass | Pass | Pass | Pass |
| Add US - 1.1.1.32 | N/A | Pass | Pass | Pass | Pass |
| Add US - 1.1.1.38 | N/A | Pass | Pass | Pass | Pass |
| Add US - 1.1.1.44 | N/A | Pass | Pass | Pass | Pass |
| Add US - 1.1.1.50 | N/A | Pass | Pass | Pass | Pass |
| Add US - 1.1.1.56 | N/A | Pass | Pass | Pass | Pass |
| Add US - 1.1.1.62 | N/A | Pass | Pass | Pass | Pass |
| Add US - 1.1.1.68 | N/A | Pass | Pass | Pass | Pass |
| Add US - 1.1.1.74 | N/A | Pass | Pass | Pass | Pass |
| Add US - 1.1.1.80 | N/A | Pass | Pass | Pass | Pass |
| Add US - 1.1.1.86 | N/A | Pass | Pass | Pass | Pass |
| Add US - 1.1.1.92 | N/A | Pass | Pass | Pass | Pass |
| Add US - 1.1.1.98 | N/A | Pass | Pass | Pass | Pass |
| Add US - 1.1.1.104 | N/A | Pass | Pass | Pass | Pass |
| Add Non-US - 1.1.2.1 | N/A | Pass | Pass | Pass | Pass |
| Add Non-US - 1.1.2.8 | N/A | Pass | Pass | Pass | Pass |
| Add Non-US - 1.1.2.14 | N/A | Pass | Pass | Pass | Pass |
| Add Non-US - 1.1.2.20 | N/A | Pass | Pass | Pass | Pass |
| Add Non-US - 1.1.2.26 | N/A | Pass | Pass | Pass | Pass |
| Add Non-US - 1.1.2.32 | N/A | Pass | Pass | Pass | Pass |
| Add Non-US - 1.1.2.38 | N/A | Pass | Pass | Pass | Pass |
| Add Non-US - 1.1.2.44 | N/A | Pass | Pass | Pass | Pass |
| Add Non-US - 1.1.2.50 | N/A | Pass | Pass | Pass | Pass |
| Add Non-US - 1.1.2.56 | N/A | Pass | Pass | Pass | Pass |
| Add Non-US - 1.1.2.62 | N/A | Pass | Pass | Pass | Pass |
| Add Non-US - 1.1.2.68 | N/A | Pass | Pass | Pass | Pass |
| Add Non-US - 1.1.2.74 | N/A | Pass | Pass | Pass | Pass |
| Add Non-US - 1.1.2.80 | N/A | Pass | Pass | Pass | Pass |
| Add Non-US - 1.1.2.86 | N/A | Pass | Pass | Pass | Pass |
| Add Non-US - 1.1.2.92 | N/A | Pass | Pass | Pass | Pass |
| Add Non-US - 1.1.2.98 | N/A | Pass | Pass | Pass | Pass |
| Add Non-US - 1.1.2.104 | N/A | Pass | Pass | Pass | Pass |
| Update US 1.3.1.5 | N/A | Pass | Pass | Pass | Pass |
| Update US 1.3.1.6 | N/A | Pass | Fail | Fail | Pass |
| Update Non-US 1.3.2.5 | N/A | Fail | Fail | Pass | Pass |
| Update Non-US 1.3.2.6 | N/A | Fail | Pass | Pass | Pass |
| Update US 1.3.1.7 | N/A | Fail | Fail | Pass | Fail |
| Update Non-US 1.3.2.7 | N/A | Fail | Fail | Fail | Pass |
| Test Exection Statisics | | | | | |
| Number of Test Cases Passed | 1 | 157 | 203 | 206 | 216 |
| Number of Test Cases Failed | 49 | 74 | 28 | 25 | 15 |
| Number of Business Reqs Covered | 1 | 1 | 1 | 1 | 1 |
| Number of Test Cases Executed | 50 | 231 | 231 | 231 | 231 |

EXAMPLE 8

Application Readiness Report for Payroll Project

APPLICATION READINESS REPORT

ABC HARDWARE-PAYROLL 1.0 PROJECT

TABLE OF CONTENTS

EXECUTIVE SUMMARY. . . . . . . . 2
TEST COVERAGE MEASUREMENT. . . . 2
ERROR DISCOVERY RATE MEASUREMENT.3
TESTING ACTIVITY MEASUREMENT. . .3
SUCCESS STATUS MEASUREMENT. . . .3
SPECIFIC RISK MEASUREMENT. . . . 3
OTHER TEST MEASUREMENTS. . . . . 4
PROJECT SUMMARY. . . . . . . . . 4
   COSTS. . . . . . . . . . . . . . 4
   OUTSTANDING ISSUES . . . . . . . 4
   RISKS . . . . . . . . . . . . . 4
CONCLUSION . . . . . . . . . . . 5

APPLICATION READINESS REPORT

ABC HARDWARE-PAYROLL 1.0 PROJECT
Executive Summary

This report will summarize the testing activities that have taken place over the last 13 months on the Payroll Project. The basis for out go/no go recommendation can be substantiated by the data contained within this report and its supporting documents.

It is the recommendation of the test team that the Payroll application NOT be released into production at this time. We are further recommending that the release data be pushed back a minimum of two months.

The primary reason for this decision is the lack of test coverage. Only one of the six business requirements has been fully tested. Current testing is on budget and needs to continue through the remaining business requirements before we will have a full understanding as to whether or not the application is ready for production.
Test Coverage Measurement This measurement shows how many of the business requirements that were represented in the test plan have actually been tested to this date.

There were a total of six business requirements identified. Of those six, only one has been fully tested. This represents only a 16.6% test coverage measurement. The following chart graphically shows this information:

|  | Tested | |
|---|---|---|
| Test Requirements | Yes | No |
| Business | | |
| Employee Processing | X | |
| Payroll Calculation | | X |
| Payroll Disbursement | | X |
| Payroll Reporting | | X |
| Technical | | |
| Graphical User Interface | | X |
| System Performance | | X |
| Total Test Coverage | 16.6% | 83.4% |

One of the acceptance criteria for the test effort was 100% Business Requirement Coverage. As you can tell from the chart, only 16.6% of the business requirements were tested; therefore, an acceptance criterion was not met in this area.

APPLICATION READINESS REPORT

ABC HARDWARE-PAYROLL 1.0 PROJECT

Error Discovery Rate Management

The error discovery number shows how many open defects there are for the application at a given point in time. This discovery rate trend should be on a downward slope as the release of the software approaches. Our trend demonstrated that the testing was effective because the number of defects did in fact decrease each month.

The following chart graphically depicts the number of open defects over the life of the Payroll project.

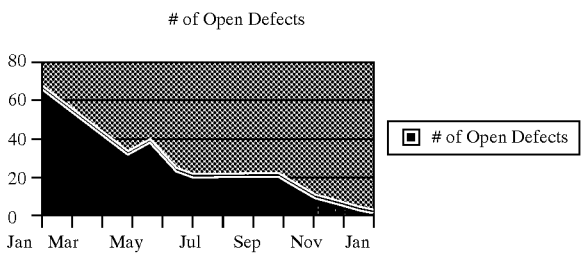

Testing Activity Measurement

There were a total of 231 test cases for this effort. The test team was able to successfully execute all 231 test cases. Therefore, our total activity was 100%.

This number represents an improvement over the last test effort where we wre only able to complete 78% of the test cases.

Success Status Measurement

Out of the 231 test cases, 216 were successful. That represents a 93.5% success ratio. Therefore, we can be certain that the results we analyze for Employee Processing are comprehensive enough to make an accurate business decision regarding the readiness of that module.

Specific Risk Measurement

The following chart will show what specific areas of the application will be at risk if the software is released without any further development or testing.

|  | Open Defects | | |
| --- | --- | --- | --- |
| Test Requirements | Severity 1 | Severity 2 | Severity 3 |
| Business | | | |
| Employee Processing | | 2 | 3 |
| Payroll Calculation | | | |
| Payroll Disbursement | | | |
| Payroll Reporting | | | |
| Technical | | | |
| Graphical User Interface | | | |
| System Performance | | | |

As the chart shows, there are no open defects for any business requirement except for Employee Processing. But, this is because the test team has not begun to test the other areas of the application yet. Therefore, there is a huge risk in these areas of the Payroll application.

Other Test Measurements

No other test measurements are being utilized at this time.

Project Summary

Costs

Testing costs to date total $102,000 of the budgeted $240,000. The remaining $138,000 will be used for testing the remainder of the business requirements.

Outstanding Issues

Business requirements 2, 3, 4, 5 and 6 still need to be tested.

Risks

There is major risk in releasing the Payroll application in this current state. The risk involves the unknowns associated with not having tested over 83% of the application in this effort. The test team cannot reliably predict the problems we could face in the following business areas: payroll calculation, payroll disbursement, payroll reporting, the applications graphical user interface, and system performance.

Conclusion

Overall, this test effort has been a very positive experience. For the first time in our company's history we have an objective way of determining if an application is ready to be released into production. We have also put measures in place to better control future testing projects and their associated costs.

All of the hard work and effort has demonstrated, unanimously, that the Payroll application is not ready to be released in production.

The main reason for his recommendation is the fact that only 16.6% of the application has been tested to this date. Our further recommendation is to push the release back a minimum of two months. This will allow enough time to finish the development work that is necessary and to thoroughly test the remaining modules of the application.

In summary, a method for requirements based computer software testing has been discovered in which a computer software system designed for a specific purpose can be tested on the specific requirements of an end user to determine whether it will perform within acceptable limits. Testing the software system for specific requirements in a specific environment, according to this invention, requires the application of six key process areas.

In the first key process area a test plan is created which defines the scope of the software test, the approach to complete the test, resources required and the acceptance criteria for the test.

The second key process area is test case development wherein in test cases that support the plan are created to validate software functions.

The third key process area is test environment preparation in which a controlled technical environment for the application of the test cases is constructed. The controlled environment stimulates the business environment in which the application programs will operate.

The fourth key process area, then, is test execution wherein the test cases defined in the second key process area are executed in the technical environments defined in the third key process area.

After test execution, the fifth key process area involves analysis wherein the results are compiled and the metrics used to measure the software system's readiness as defined in the test plan are collected.

Finally, the sixth key process area is a management reporting function, wherein not only the readiness of the software system as measured by the metrics is compiled, but areas which require further testing or correction are outlined and identified.

Upon completion, the process of this invention, then, should provide the end user with a complete analysis as to whether the software system is suitable for normal production runs. This invention, then, is intended to adapt a requirements based test for a computer program to determine whether the program will perform within acceptable limits under the specific conditions required by the end user.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. A requirements based method for determining the proficiency with which a computer program will perform specific functions under specific environmental conditions, the method comprising:

providing computer software containing a program to perform a specific set of predetermined functions and identifying predetermined actual environmental conditions under which those functions are to be performed;

providing a test plan defining tests to be conducted on said program to simulate said actual environmental conditions;

creating test cases to support the test plan;

preparing a test environment that provides a controlled technical environment for application of the test cases, the test environment incorporating a set of transaction test data generated based upon the actual environmental conditions, whereby test results from application of the test cases reflect expected behavior under the actual environmental conditions;

executing said test cases and recording the results;

analyzing the test results using a pass/fail criteria and error identification and evaluation to determine test case defects, application context defect and application defects, if any; and preparing a management report based upon the analyzed test results to identify a readiness of the program for performance under the actual environmental conditions.

2. The method of claim 1 wherein the test plan includes at least one test selected from the group consisting of Function test, System test, Performance test, Acceptance test, Regression test, Unit and Integration test.

3. The method of claim 2 wherein the Function test demonstrates availability of predetermined functions under the specific conditions.

4. The method of claim 2 wherein the Systems test tests the availability of a testing configuration of functions expected under the actual environmental conditions.

5. The method of claim 2 wherein the Performance test determines runtime performance expected under the actual environmental conditions.

6. The method of claim 2 wherein the Acceptance test determines whether acceptance criteria validating requirements have been met.

7. The method of claim 2 wherein the Regression test tests whether adverse changes are introduced during Maintenance changes and upgrades.

8. The method of claim 1 wherein said program is subjected to Unit and Integration tests prior to executing said test cases and recording the results.

9. The method of claim 1 wherein the test plan includes program requirements to be validated, requirements not to be evaluated, and requirements which can not be validated.

* * * * *